United States Patent
Tarvainen et al.

(10) Patent No.: US 9,760,267 B2
(45) Date of Patent: Sep. 12, 2017

(54) METHOD AND APPARATUS FOR A SLIDER INTERFACE ELEMENT

(71) Applicant: Nokia Technologies Oy, Espoo (FI)

(72) Inventors: Tomi Petri Tarvainen, Espoo (FI); Janne Pekko Kaasalainen, Espoo (FI); Tero Tapio Tiittanen, Vantaa (FI); Jung Chen Hung, Espoo (FI); Shahil Soni, Espoo (FI); Ari Pekka Liusaari, Helsinki (FI); Marcus Carl Johan Olsson, Espoo (FI); Juha Heikki Alakarhu, Helsinki (FI); Sami Pekka Laakso, Masala (FI)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 14/168,837

(22) Filed: Jan. 30, 2014

(65) Prior Publication Data
US 2014/0223376 A1   Aug. 7, 2014

Related U.S. Application Data

(60) Provisional application No. 61/760,776, filed on Feb. 5, 2013.

(51) Int. Cl.
*G06F 3/0482* (2013.01)
*G06F 3/0486* (2013.01)
(Continued)

(52) U.S. Cl.
CPC ........ *G06F 3/04847* (2013.01); *G06F 3/0482* (2013.01); *G06F 3/0486* (2013.01);
(Continued)

(58) Field of Classification Search
CPC ............ G06F 3/04847; H04N 5/232–5/23296
(Continued)

(56) References Cited

U.S. PATENT DOCUMENTS 5,524,196 A  *  6/1996  Blades ................. G06F 3/0482
                                                              715/834
5,786,805 A       7/1998  Barry
(Continued)

FOREIGN PATENT DOCUMENTS

EP       1589409 A2    10/2005
EP       2017707 A1     1/2009
(Continued)

OTHER PUBLICATIONS

International Search Report and Written Opinion of the International Searching Authority for Patent Cooperation Treaty Application No. PCT/FI2014/050593, dated Nov. 28, 2014, 9 pages.

*Primary Examiner* — Weilun Lo
*Assistant Examiner* — David S Posigian
(74) *Attorney, Agent, or Firm* — Harrington & Smith

(57) ABSTRACT

A method comprising determining to provide for adjustment of a first setting, causing display of a first curvilinear slider interface element that relates to a value of the first setting, receiving an indication of a drag input associated with the first curvilinear slider interface element, causing adjustment movement of the selection point relative to the curvilinear slider interface element in proportion to the drag input, and determining a value of the first setting is based, at least in part, on a position of the first selection point relative to curvilinear slider interface element is disclosed.

20 Claims, 40 Drawing Sheets

(51) Int. Cl.
   *G06F 3/0488* (2013.01)
   *H04N 5/232* (2006.01)
   *G06F 3/0484* (2013.01)

(52) U.S. Cl.
   CPC ....... *G06F 3/0488* (2013.01); *H04N 5/23216* (2013.01); *H04N 5/23293* (2013.01)

(58) Field of Classification Search
   USPC .................................................. 715/833, 974
   See application file for complete search history.

(56) References Cited

U.S. PATENT DOCUMENTS

| | | | |
|---|---|---|---|
| 2001/0043198 A1 | 11/2001 | Ludtke | |
| 2004/0212605 A1 | 10/2004 | Fitzmaurice et al. | |
| 2005/0012723 A1 | 1/2005 | Pallakoff | |
| 2005/0060659 A1* | 3/2005 | Verdun | G06F 3/04847 715/772 |
| 2006/0146167 A1 | 7/2006 | Aizawa | 348/333.01 |
| 2007/0008300 A1 | 1/2007 | Yang | 345/173 |
| 2008/0192021 A1 | 8/2008 | Lim | 345/173 |
| 2008/0204402 A1 | 8/2008 | Hirata et al. | |
| 2008/0250312 A1* | 10/2008 | Curtis | G06Q 10/00 715/700 |
| 2009/0040332 A1 | 2/2009 | Yoshino | |
| 2009/0187860 A1 | 7/2009 | Fleck | 715/834 |
| 2009/0237548 A1 | 9/2009 | Watanabe | 348/333.02 |
| 2010/0005420 A1 | 1/2010 | Schneider | |
| 2010/0185983 A1 | 7/2010 | Szoczei | 715/833 |
| 2010/0192104 A1 | 7/2010 | Lee | |
| 2010/0251181 A1 | 9/2010 | Lal | 715/834 |
| 2011/0019058 A1 | 1/2011 | Sakai et al. | |
| 2011/0063491 A1 | 3/2011 | Kim et al. | |
| 2011/0095993 A1 | 4/2011 | Zuverink | |
| 2011/0249139 A1 | 10/2011 | Iwase | 348/223.1 |
| 2012/0086846 A1 | 4/2012 | Fuh | 348/333.01 |
| 2012/0137236 A1 | 5/2012 | Abe | 715/763 |
| 2012/0274796 A1* | 11/2012 | Choi | H04N 5/232 348/220.1 |
| 2013/0088455 A1* | 4/2013 | Jeong | G06F 3/04883 345/173 |
| 2013/0127911 A1 | 5/2013 | Brown | 345/649 |
| 2013/0141362 A1 | 6/2013 | Asanuma | 345/173 |
| 2013/0155308 A1 | 6/2013 | Wu | 348/333.05 |
| 2017/0041527 A1* | 2/2017 | Pettersson | G06F 3/04847 |
| 2017/0064213 A1* | 3/2017 | Windmark | H04N 5/265 |

FOREIGN PATENT DOCUMENTS

| | | |
|---|---|---|
| EP | 2020633 A1 | 2/2009 |
| EP | 2163972 A2 | 3/2010 |
| EP | 2451178 A2 | 5/2012 |
| WO | WO-2008/115638 A1 | 9/2008 |

* cited by examiner

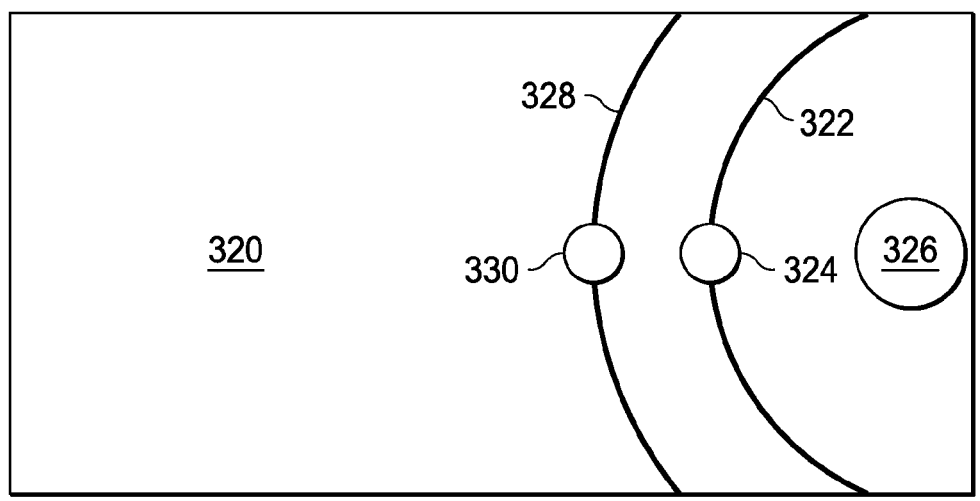
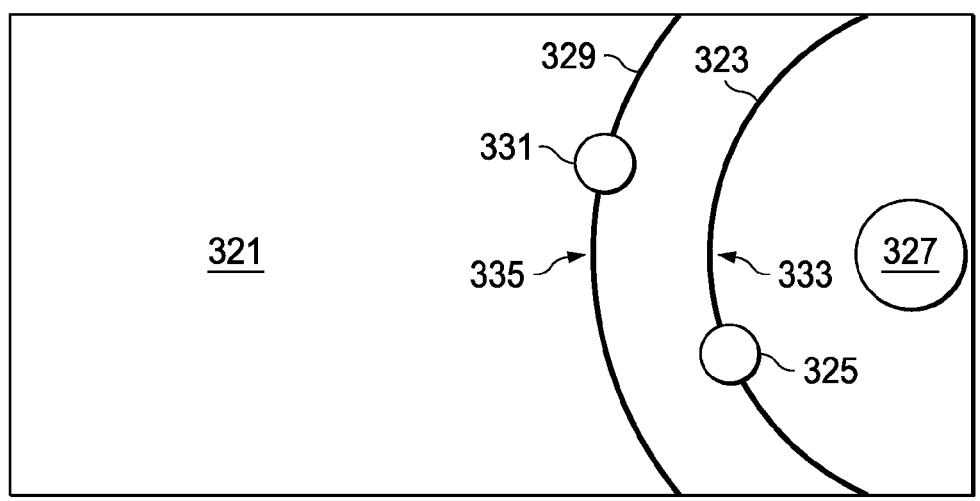

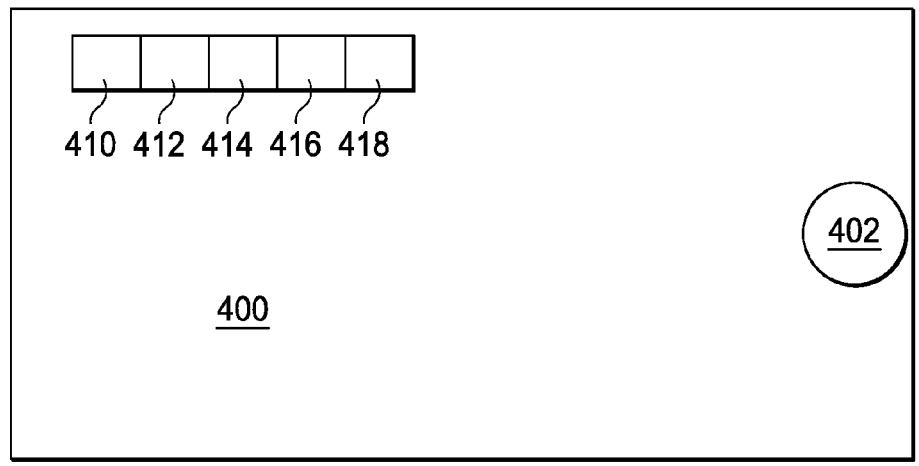
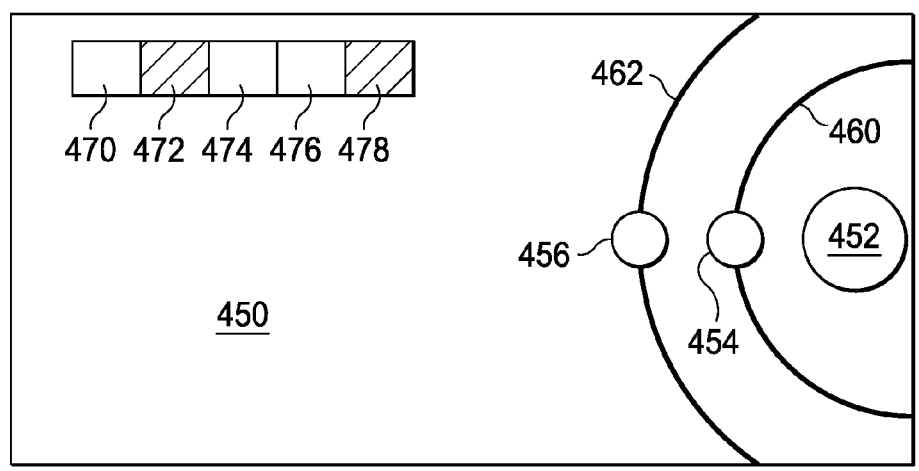

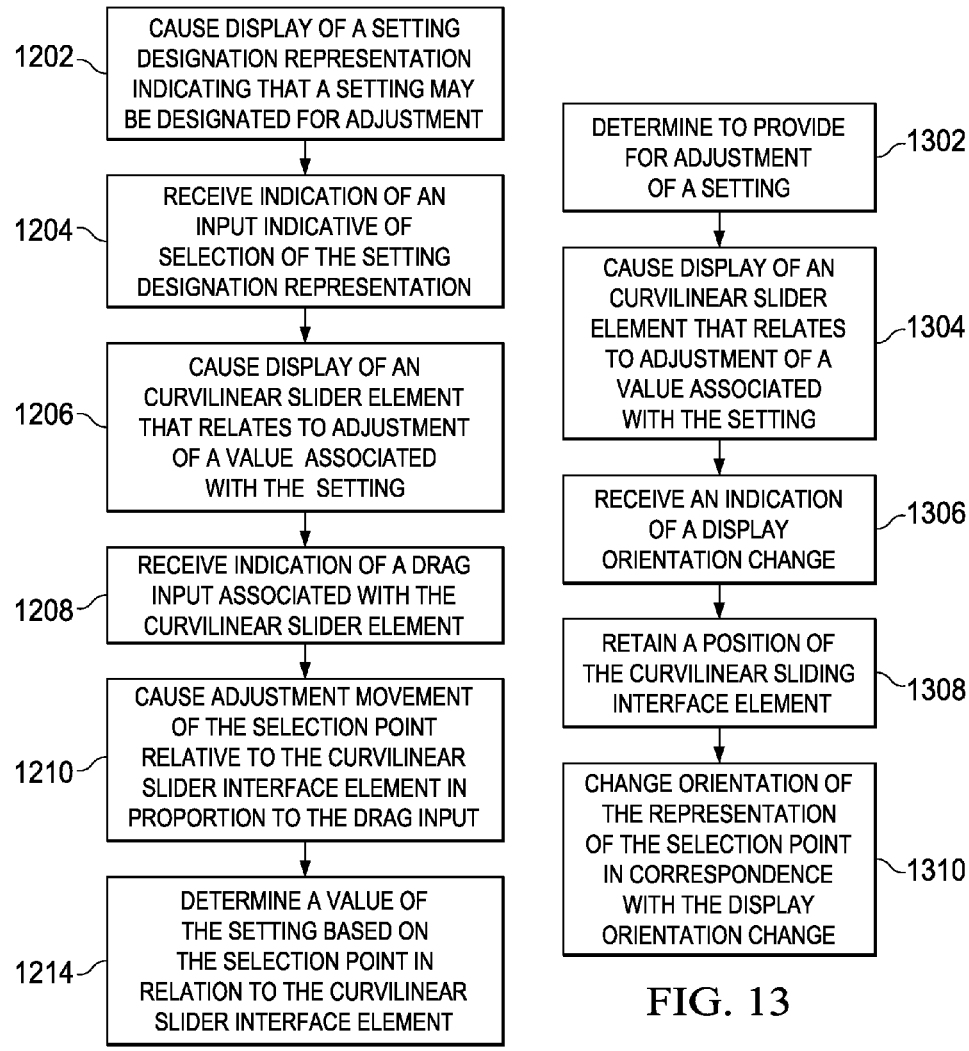

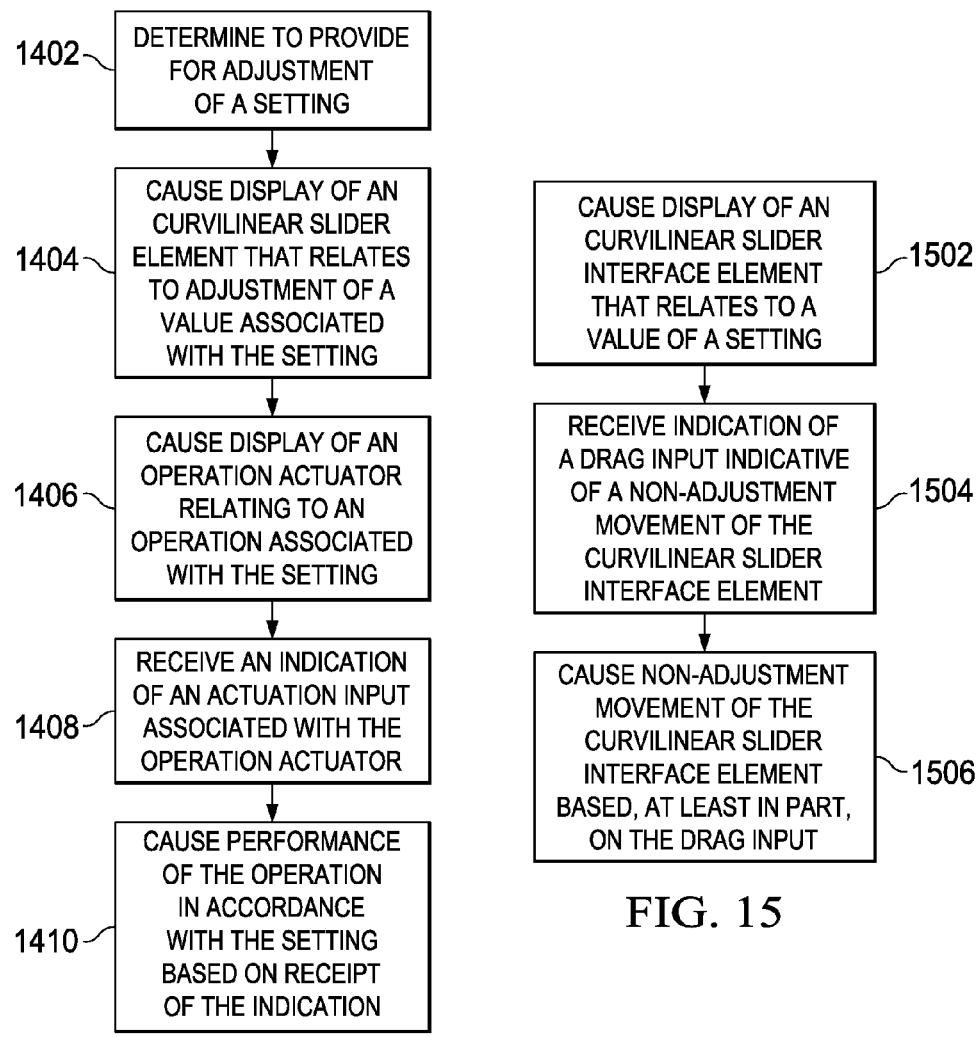

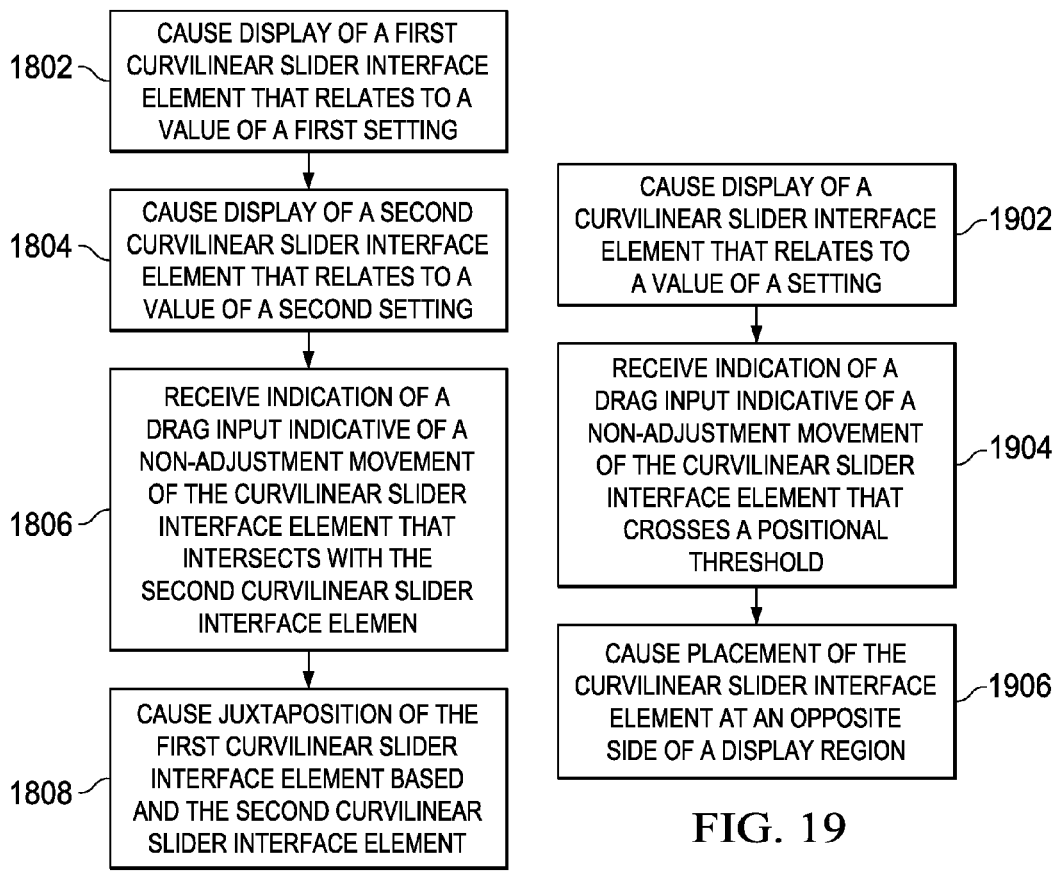

METHOD AND APPARATUS FOR A SLIDER INTERFACE ELEMENT

RELATED APPLICATIONS

This application claims priority to U.S. Provisional Application No. 61/760,776 filed Feb. 5, 2013, entitled, "Method and Apparatus for a Slider Interface Element," which is incorporated herein by reference in its entirety.

TECHNICAL FIELD

The present application relates generally to a user interface.

BACKGROUND

As electronic apparatuses have expanded their capabilities, as well as the number and types of operations they perform, interaction has become increasingly complex and time consuming. For example, apparatus interaction may be prone to errors, confusion, and delay. In some circumstances, a user may miss an opportunity to do something, such as capture an image of an event, due to delays associated with interaction. In other circumstances, a user may avoid utilizing an apparatus capability due to a desire to avoid errors, confusion, or delay. These problems may be more pronounced with regard to a user controlling assignment of values to settings. Under such circumstances, it may be desirable for a user to be able to assign values to settings in a simple, quick, and intuitive manner.

SUMMARY

Various aspects of examples of the invention are set out in the claims.

One or more embodiments may provide an apparatus, a computer readable medium, a non-transitory computer readable medium, and a method for determining to provide for adjustment of a first setting, causing display of a first curvilinear slider interface element that relates to a value of the first setting, receiving an indication of a drag input associated with the first curvilinear slider interface element, causing adjustment movement of the selection point relative to the curvilinear slider interface element in proportion to the drag input, and determining a value of the first setting is based, at least in part, on a position of the first selection point relative to curvilinear slider interface element.

One or more example embodiments further cause display of a representation of the first selection point that identifies the first selection point.

In at least one example embodiment, the representation of the first selection point identifies the first setting.

One or more example embodiments further cause display of a representation of the value of the first setting, the representation being proximate to the first selection point.

One or more example embodiments further determine to provide for adjustment of a second setting and cause display of a second curvilinear slider interface element that relates to a value of the second setting.

In at least one example embodiment, the first curvilinear slider interface element and the second curvilinear slider interface element are concave towards a common region, such that the first curvilinear slider interface element and the second curvilinear slider interface element are concentrically curvilinear.

One or more example embodiments further cause display of an operation actuator relating to an operation associated with the first setting.

One or more example embodiments further receive an indication of an actuation input associated with the operation actuator, and cause performance of the operation based, at least in part, on receipt of the indication, the operation being performed in accordance with the value of the first setting.

In at least one example embodiment, the operation actuator is positioned in a region surrounded by the curvilinear slider interface element.

In at least one example embodiment, the operation actuator is positioned along a line that corresponds with an axis of a display.

In at least one example embodiment, the operation actuator is positioned along a line that corresponds with an axis of a display at a midpoint along a perpendicular axis of the display.

In at least one example embodiment, the first selection point is positioned along a line that corresponds with an axis of a display.

In at least one example embodiment, the first selection point is positioned along a line that corresponds with an axis of a display at a midpoint along a perpendicular axis of the display.

In at least one example embodiment, determination to provide for adjustment of a first setting is based, at least in part, on a user designation of the first setting.

One or more example embodiments further cause display of a setting designation representation indicating that the first setting may be designated for adjustment, wherein the user designation of the first setting comprises receiving an indication of an input indicative of selection of the setting designation representation.

In at least one example embodiment, the setting designation representation is distinct from the first slider interface element.

One or more example embodiments further differ the setting designation representation concurrent with display of a first curvilinear slider interface element.

One or more example embodiments further receive an indication of a display orientation change, retain a position of the first curvilinear sliding interface element, and change orientation of the representation of the selection point in correspondence with the display orientation change.

One or more example embodiments further retain orientation of non-selected value information along the contour of the curvilinear slider interface element.

One or more embodiments may further provide an apparatus, a computer readable medium, a non-transitory computer readable medium, and a method for causing display of at least a subpart of, a first curvilinear slider interface element that relates to a value of a first setting.

One or more embodiments may further receive an indication of a drag input indicative of a non-adjustment movement of the curvilinear slider interface element.

One or more embodiments may further cause non-adjustment movement of the first curvilinear slider interface element based, at least in part on the drag input.

One or more embodiments may further cause display of a first selection point positioned along the contour of the curvilinear slider interface element to indicate a selected value associated with the curvilinear slider interface element, wherein the drag input is associated with the first selection point.

One or more embodiments may further cause display of a second curvilinear slider interface element curvilinear slider interface element that relates to a value of a second setting.

In at least one example embodiment, the non-adjustment movement causes at least one of: an increase in distance between the first curvilinear slider interface element and the second curvilinear slider interface element, or a decrease in distance between the first curvilinear slider interface element and the second curvilinear slider interface element.

One or more embodiments may further cause non-adjustment movement of the second curvilinear slider interface element in correspondence with the non-adjustment movement of the first curvilinear slider interface element In at least one example embodiment, the non-adjustment movement of the first curvilinear slider interface element may be performed such that a distance between the first curvilinear slider interface element and the second curvilinear slider interface element is retained.

One or more embodiments may further cause the second curvilinear slider interface element to retain a position without regard for the non-adjustment movement of the first curvilinear slider interface element.

In at least one example embodiment, the drag input intersects with the second curvilinear slider interface element, and the non-adjustment movement of the first curvilinear slider interface element comprises juxtaposition of the first curvilinear slider interface element and the second curvilinear slider interface element.

In at least one example embodiment, the drag input crosses a positional threshold, and wherein the non-adjustment movement relates to placement of the first curvilinear slider interface element being positioned at an opposite side of a display region.

In at least one example embodiment, the non-adjustment movement relates to at least one of: curvilinear expansion, or curvilinear contraction.

One or more embodiments may provide an apparatus, a computer readable medium, a non-transitory computer readable medium, and a method for causing display of at least a subpart of a first curvilinear slider interface element that relates to a value of the first setting, causing display of an operation actuator relating to an operation associated with the first setting, receiving an indication of a drag input associated with the operation actuator, causing non-adjustment movement of the first curvilinear slider interface element and the operation actuator based, at least in part, on the drag input.

In at least one example embodiment, the drag input crosses a positional threshold and the non-adjustment movement relates to placement of the first curvilinear slider interface element and the operation actuator being positioned at an opposite side of a display region.

In at least one example embodiment, prior to the non-adjustment movement, the first curvilinear slider interface element is at a first position in relation to a side of a display region, and wherein after the non-adjustment movement, the first curvilinear slider interface element is at a second position, relative to an opposite side of the display region, that is symmetrical to the first position relative to the side of the display region.

In at least one example embodiment, prior to the non-adjustment movement, the first curvilinear slider interface element is at a first orientation relative to a side of a display region, and wherein after the non-adjustment movement, the first curvilinear slider interface element is at a second orientation, relative to an opposite side of the display region, that is symmetrical to the first orientation relative to the side of the display region.

In at least one example embodiment, prior to the non-adjustment movement, the operation actuator is at a first position relative to a side of a display region, and wherein after the non-adjustment movement, the operation actuator is at a second position, relative to an opposite side of the display region, that is symmetrical to the first position relative to the side of the display region.

In at least one example embodiment, the threshold relates to a delineation that is parallel to the side of the display region.

In at least one example embodiment, the delineation relates to a midpoint between the side of the display region and the opposite side of the display region.

One or more embodiments may provide an apparatus, a computer readable medium, a non-transitory computer readable medium, and a method for causing display of an operation actuator relating to an operation that is associated with one or more settings, receiving an indication of a drag input associated with the operation actuator, the drag input having a terminus within a default setting zone, and causing the one or more settings to be set to default values based, at least in part, on the drag input.

In at least one example embodiment, the default setting zone is confined to a half of a display region that comprises the operation actuator.

One or more embodiments may further provide an indication of the default setting zone.

One or more embodiments may provide an apparatus, a computer readable medium, a non-transitory computer readable medium, and a method for causing display of at least a subpart of a first curvilinear slider interface element that relates to a value of a first setting, causing display of an operation actuator relating to an operation associated with the first setting, receiving an indication that a different operation has been selected, the different operation being associated with a second setting, causing replacement of the operation actuator with a different operation actuator relating to the different operation, and causing replacement of the first curvilinear slider interface element with a second curvilinear slider interface element.

In at least one example embodiment, the operation relates to at least one of an image capture operation, a video capture operation, or a HDD image capture operation.

In at least one example embodiment, the different operation relates to at least one of an image capture operation, a video capture operation, or a HDD image capture operation, such that the different operation is different than the operation.

One or more embodiments may further cause display of a representation of the different operation, wherein the receipt of the indication that the different operation has been selected is in succession to receiving a selection input associated with the representation of the different operation.

One or more embodiments may provide an apparatus, a computer readable medium, a non-transitory computer readable medium, and a method for causing display of at least a subpart of a first curvilinear slider interface element that relates to a value of a first setting, causing display of a first selection point of the first curvilinear slider interface element, determining that the value of the first setting has changed, and causing rotation the first curvilinear slider interface element such that a position associated with the changed value aligns with the first selection point.

In at least one example embodiment, the change in value is caused by automatic settings adjustment.

One or more embodiments may further cause display of an indicator that the setting is subject to automatic adjustment.

In at least one example embodiment, the first curvilinear slider interface element comprises a demarcation of an automatic adjustment selection.

One or more embodiments may further receive an indication of a drag input associated with causing the first curvilinear drag input element to align the demarcation of the automatic adjustment selection with the selection point, wherein invocation of the automatic settings adjustment is based at least in part on the alignment of the alignment of the demarcation.

One or more embodiments may provide an apparatus, a computer readable medium, a non-transitory computer readable medium, and a method for causing display of a slider interface element comprising at least one continuous region and at least one indexed region such that the slider interface element comprises a plurality of value positions along the contour of the slider interface element, the value positions corresponding with values associated with a setting, receiving an indication of a first drag input associated with adjustment of the slider interface element, the first drag input comprising a first movement input and a first release input, causing adjustment movement of a selection point relative to the value positions of the slider interface element, the adjustment movement corresponding to the first movement input, determining that the first release input relates to the selection point being within the continuous region, determining the value associated with the setting based, at least in part, on the value position associated with the first release input, receiving an indication of a second drag input associated with adjustment of the slider interface element, the second drag input comprising a second movement input and a second release input, causing adjustment movement of the selection point relative to the value positions of the slider interface element, the adjustment movement corresponding to the second movement input, determining that the second release input relates to the selection point being within the indexed region, determining that the selection point is unaligned with an index, causing adjustment movement of the selection point relative to the value positions of the slider interface element such that the selection point becomes aligned with an index, and determining the value associated with the setting based, at least in part, on the value position associated with the index.

In at least one example embodiment, the slider interface element is a curvilinear slider interface element.

In at least one example embodiment, the setting relates to a visual capture setting.

In at least one example embodiment, the setting relates to a focus setting.

In at least one example embodiment, the continuous region relates to a manual focus setting.

In at least one example embodiment, the indexed region comprises at least one index that corresponds with a value indicative of at least one of: automatic focus, hyper focus, or infinite focus.

In at least one example embodiment, the continuous region and the indexed region are positioned along the slider interface element such that overlap between the continuous region and the indexed region is precluded.

In at least one example embodiment, the slider interface element comprises an indication of the continuous region.

In at least one example embodiment, the slider interface element comprises at least one demarcation signifying at least one index of the indexed region.

One or more embodiments may provide an apparatus, a computer readable medium, a non-transitory computer readable medium, and a method for causing display of a first slider interface element associated with a first setting and a second slider interface element associated with a second setting, receiving an indication of a contact input associated with adjustment of the first slider interface element, causing a reduction of visibility of the second slider interface element based, at least in part, on the receipt of the contact input, receiving an indication of a release input associated with the contact input, causing a restoration of visibility of the second slider interface element based, at least in part, on the release input.

One or more embodiments may further determine that the contact input is associated with adjustment of the first slider interface element.

One or more embodiments may further receive an indication of a movement input such that the contact input, the movement input, and the release input are comprised by a drag input.

In at least one example embodiment, the slider interface element is at a first position in relation to a display region. One or more embodiments may further determine that, at least part of, the movement input is indicative of non-adjustment movement of the first slider interface element. One or more embodiments may further cause non-adjustment movement of the slider input element in proportion to the movement input, such that the slider interface element is at a second position in relation to the display region.

One or more embodiments may further cause the first slider interface element to be positioned at the first position based, at least in part, on the release input.

One or more embodiments may further determine that, at least part of, the movement input is indicative of adjustment of the first slider interface element, and cause adjustment movement of the selection point relative to the slider interface element in proportion to the movement input.

In at least one example embodiment, causing reduction of visibility of the second slider interface element comprises increasing opacity of the second slider interface element, and wherein restoration of visibility of the second slider interface element comprises decreasing opacity of the second slider interface element in proportion to the increase in opacity of the second slider interface element.

In at least one example embodiment, causing reduction of visibility of the second slider interface element comprises termination of display of the second slider interface element, and wherein causing restoration of visibility of the second slider interface element comprises causing display of the second slider interface element.

In at least one example embodiment, the first slider interface element and the second slider interface element are curvilinear slider interface elements.

One or more embodiments may provide an apparatus, a computer readable medium, a non-transitory computer readable medium, and a method for causing display of an operation actuator associated with an operation, the display of the operation actuator being associated with a first position in relation to a display region, receiving an indication of a drag input associated with the operation actuator, causing display of at least one curvilinear slider interface element, based, at least in part, on the drag input.

One or more embodiments may further cause display of the operation actuator at a second position based, at least In part, on the drag input.

In at least one example embodiment, the second position is closer to the curvilinear slider interface elements than the first position.

In at least one example embodiment, the second position is along an axis with the first position, the axis being parallel to a side of the display region One or more embodiments may further determine that the drag input comprises a movement input having a distance beyond a distance threshold. In at least one example embodiment, causation of display of the at least one curvilinear slider interface element is based, at least in part on the determination that the drag input comprises a movement input having a distance beyond a distance threshold.

One or more embodiments may further determine that the drag input comprises a release input having a position within a setting adjustment region. In at least one example embodiment, causation of display of the at least one curvilinear slider interface element is based, at least in part on the determination that the drag input comprises a release input having a position within a setting adjustment region.

One or more embodiments may further receive an indication of an input associated with a position within a setting adjustment termination region, cause termination of display of the at least one curvilinear slider interface element, based, at least in part, on the drag input.

In at least one example embodiment, the input related to a tap input.

In at least one example embodiment, each curvilinear slider interface element is associated with a setting, the setting being associated with the actuator.

In at least one example embodiment, the at least one curvilinear slider interface elements is based on correspondence with a predetermined set of settings associated with the operation.

One or more embodiments may provide an apparatus, a computer readable medium, a non-transitory computer readable medium, and a method for causing display of an operation actuator associated with an operation, the operation actuator having a first representation, receiving an indication of an actuation input associated with the operation actuator, causing invocation of performance of the operation, determining a status associated with the performance of the operation, and causing change of the operation actuator to have a second representation, the second representation comprising an operation status indicator indicative of the status associated with the performance of the operation.

One or more embodiments may further determine that a performance of the operation has completed.

One or more embodiments may further cause change of the operation actuator to have the first representation absent the second representation based, at least in part, on the determination that the performance of the operation has completed.

In at least one example embodiment, the status relates to a duration associated with performance of the operation and the status indicator relates to a durational representation.

In at least one example embodiment, the durational representation comprises a textual duration indication.

In at least one example embodiment, the duration relates to a duration prior to execution of the operation and the textual duration information is indicative of a diminishing duration.

In at least one example embodiment, the duration relates to a duration after invocation of execution of the operation and the textual duration information is indicative of an increasing duration.

In at least one example embodiment, the durational indication comprises a graphical duration indication.

In at least one example embodiment, the graphical duration indication relates to a duration contour representation along an operation actuator contour.

In at least one example embodiment, the graphical duration indication provides an indication of duration relating to an amount of the operation actuator contour to which a graphical duration indication is applied.

One or more embodiments may further determine that the performance of the operation is associated with the status.

In at least one example embodiment, the operation relates to an extended exposure image capture operation.

In at least one example embodiment, the status relates to a duration since invocation of the extended exposure image capture operation.

In at least one example embodiment, the operation relates to an image capture operation associated with a delayed shutter setting.

In at least one example embodiment, the status relates to a duration prior to performance of the image capture operation.

BRIEF DESCRIPTION OF THE DRAWINGS

For a more complete understanding of embodiments of the invention, reference is now made to the following descriptions taken in connection with the accompanying drawings in which:

FIGS. 3A-3J are diagrams illustrating a curvilinear slider interface element according to at least one example embodiment;

FIGS. 4A-4B are diagrams illustrating a curvilinear slider interface element according to at least one example embodiment;

FIG. 12 is a flow diagram illustrating activities associated with determining a setting value by way of a curvilinear slider interface element according to at least one example embodiment;

FIG. 13 is a flow diagram illustrating activities associated with change in orientation in relation to a curvilinear slider interface element according to at least one example embodiment;

FIG. 14 is a flow diagram illustrating activities associated with performance of an operation in relation to a curvilinear slider interface element according to at least one example embodiment;

FIG. 15 is a flow diagram illustrating activities associated with non-adjustment movement of a curvilinear slider interface element according to at least one example embodiment;

FIG. 18 is a flow diagram illustrating activities associated with non-adjustment movement of a curvilinear slider interface element according to at least one example embodiment;

FIG. 19 is a flow diagram illustrating activities associated with non-adjustment movement of a curvilinear slider interface element according to at least one example embodiment;

FIG. 24 is a flow diagram illustrating activities associated with placement of a curvilinear slider interface element according to at least one example embodiment;

DETAILED DESCRIPTION OF THE DRAWINGS

Figure 1:
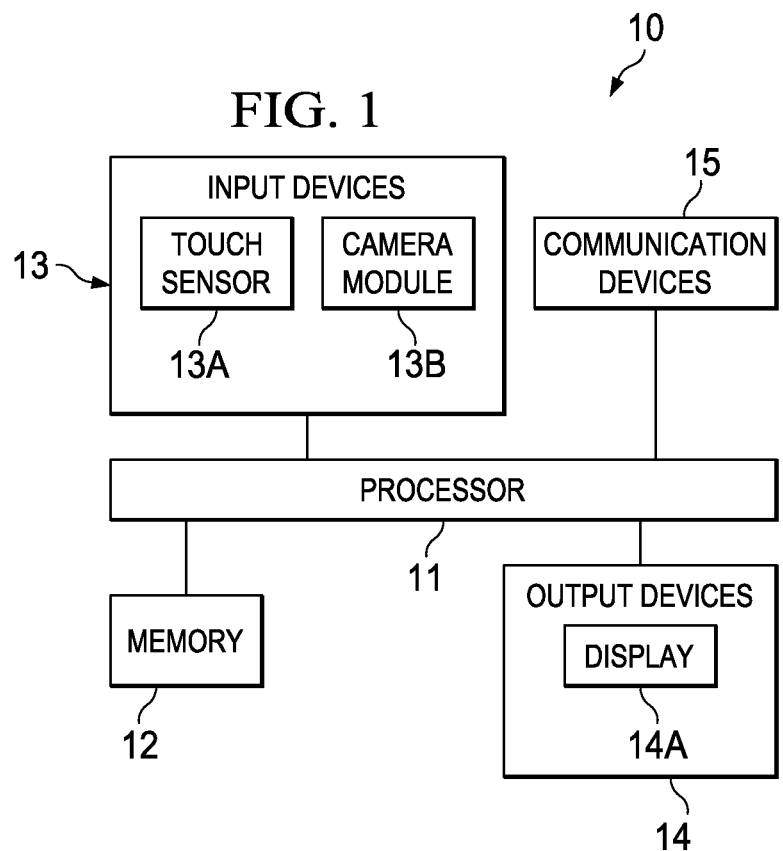
FIG. 1 is a block diagram showing an apparatus according to an example embodiment.

An embodiment of the invention and its potential advantages are understood by referring to FIGS. 1 through 25 of the drawings.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to an example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses, may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of an example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise output devices 14. In at least one example embodiment, output devices 14 comprise one or more output devices. Output devices 14 may comprise an audio output device, such as a ringer, an earphone, a speaker, and/or the like. Output devices 14 may comprise a tactile output device, such as a vibration transducer, an electronically deformable surface, an electronically deformable structure, and/or the like. Output devices 14 may comprise a visual output device, such as a display, a light, and/or the like. The electronic apparatus may comprise input devices 13. In at least one example embodiment, input devices 13 comprise one or more input devices. Input devices 13 may comprise a light sensor, a proximity sensor, a microphone, a touch sensor, a force sensor, a button, a keypad, a motion sensor, a magnetic field sensor, a camera, and/or the like. A touch sensor, such as touch sensor 13A, and a display, such as display 14A, may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input devices 13 may comprise a media capturing element. The media capturing element may be any means for capturing an image, video and/or audio for storage, display or transmission. For example, in an example embodiment in which the media capturing element is a camera module, such as camera module 13B, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In an example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2I are diagrams illustrating a curvilinear slider interface element according to at least one example embodiment. The examples of FIGS. 2A-2I are merely examples of a curvilinear slider interface element, and do not limit the scope of the claims. For example, eccentricity of the curvilinear slider interface element may vary, position of the curvilinear slider interface element may vary, and/or the like.

In at least one example embodiment, a slider interface element relates to an interface element that allows a user to adjust a setting. In at least one example embodiment, the slider interface element relates to a linear shape where values of the setting are associated with various positions along the contour of the linear shape. In at least one example embodiment, there is a selection point associated with the slider interface element. The selection point may be utilized in conjunction with the slider interface element such that position of the selection point along the contour of the slider interface element may identify a value associated with the setting. Therefore, a user may cause adjustment of a setting by way of causing a change in the position of a selection point relative to a slider interface element. In such circumstances, an apparatus may determine a value of the first setting is based, at least in part, on a position of the first selection point relative to the slider interface element. For example, the apparatus may correlate position of the selection point along the contour of the slider interface element with the arrangement of values along the contour of the slider interface element to determine the value.

In at least one example embodiment, a user may perform one or more inputs to manipulate a slider interface element displayed by an apparatus. The apparatus may receive an indication of an input indicating manipulation of a slider interface element, for example by way of touch sensor 13A. In at least one example embodiment, the indication of the input relates to any communication that the input occurred, such as a message, a function call, modification of a variable, and/or the like.

In at least one example embodiment, the apparatus receives an indication of a drag input associated with a slider interface element. In at least one example embodiment, a drag input relates to a combination of a contact input, a movement input, and a release input. In at least one example embodiment, a contact input may relate to contact with a touch display, an input indicating selection associated with a cursor, for example using a mouse, and/or the like. The contact input may serve as designation of an interface element to be associated with the drag input. For example, if the contact input has a position correlating to a position of a slider interface element selection point, the contact input may be interpreted to indicate that the movement input of the drag input is associated with the slider interface element selection point. In at least one example embodiment, the movement input relates to any movement input in association with the drag input. Movement input may relate to movement of a touch input across the surface of a touch display, movement of a cursor, for example by a mouse, and/or the like. In at least one example embodiment, the release input relates to an input indicating termination of the drag input. For example, the release input may relate to removal of contact with a touch display, a termination of a button press, and/or the like. Even though the movement input may relate to movement in relation to multiple degrees of freedom, the apparatus may utilize a subcomponent of the movement input to adjust a slider interface element. For example, the apparatus may determine a projection of the movement input along the contour of the slider interface element to determine an effect of the movement input regarding the slider interface element.

In at least one example embodiment, an apparatus may provide a slider interface element upon determination to provide for adjustment of a setting associated with the slider interface element. For example, the apparatus may determine to provide for adjustment of the setting, and cause display of the slider interface element to enable the adjustment. In at least one example embodiment, causing display relates to performing an operation that results in information, such as a slider interface element, being displayed. For example, if the apparatus comprises a display, causing display of information may comprise displaying the information. In another example, causing display of information may comprise sending the information to a separate apparatus for displaying, such as a separate display.

The contour of a slider interface element may vary. In at least one example embodiment, it may be desirable to provide for a curvilinear slider interface element. In at least one example embodiment, a curvilinear slider interface element has a terminus at each end. For example, the curvilinear slider interface element may be bounded by a boundary of a display region, for example, by the boundary of a window, by the boundary of a display, and/or the like, such that at least one terminus corresponds with a display region boundary. In another example, the curvilinear slider interface element may be unbounded by a boundary of a display region, such that at least one terminus is within the display boundary region.

In at least one example embodiment, a curvilinear slider interface element is an elliptical slider interface element. In at least one example embodiment, an elliptical slider interface element is a circular slider interface element. In at least one example embodiment, the elliptical slider interface element relates to a partial ellipse. For example, the elliptical slider interface element may relate to a segment of an ellipse. The segment may be less that the entirety of the ellipse. For example, the elliptical slider interface element may be bounded by a boundary of a display region, for example, by the boundary of a window, by the boundary of a display, and/or the like. In another example, the elliptical slider interface element may be unbounded by a boundary of a display region, but still relate to less than the entirety of an ellipse.

In at least one example embodiment, an elliptical slider interface element varies insubstantially from an ellipse. In at least one example embodiment, insubstantial variation relates to a variation that is not relevant to a user's ability to perceive similarity between the curvilinear slider interface element and an ellipse. For example, pixilation associated with display of the elliptical slider interface element may cause the curvilinear slider interface element to insubstantially vary from an ellipse. In at least one example embodiment, variation of a elliptical slider interface element from an ellipse is insubstantial if the elliptical slider interface element provides for perception of an elliptical property. In at least one example embodiment, an elliptical property relates to the elliptical slider interface element being perceived to have foci, to have a shape consistent with curvature around at least one point, and/or the like.

Without limiting the claims in any way, at least one technical effect associated with a curvilinear slider interface element is that the curvilinear contour allows for ergonomically simple utilization under many circumstances. For example, when using a touch display, the touch gestures being performed may be based, at least in part, on the movements of the user's body. The user's body movement may be based, at least in part, on articulation of an appendage around a joint. Such articulation may often be curvilinear. This effect may be strengthened for handheld apparatuses, such as apparatus 500 of FIG. 5A or apparatus 550 of FIG. 5B. Such apparatuses are often held by the fingers and hand so that touch input is performed by the thumbs of the user. Under such circumstances, the curvilinear contour may provide a more ergonomically sound contour for a user to perform a drag input associated with adjustment of a curvilinear slider interface element. Furthermore, under such circumstances, a curvilinear drag input may be a more cognitively simple than straight drag input in that the user may be able to perform a curvilinear drag by variation of angle absent substantial variation in extension of the thumb. For example, the user may be able to trace an ellipse with the user's thumb without contracting the thumb. In at least one example embodiment, at least several technical effects associated with lack of change in thumb extension during a drag input may be reduced user tendency to drop the apparatus during the drag input, improved speed of the input, and simplified user motor coordination associated with input.

Figure 2A:
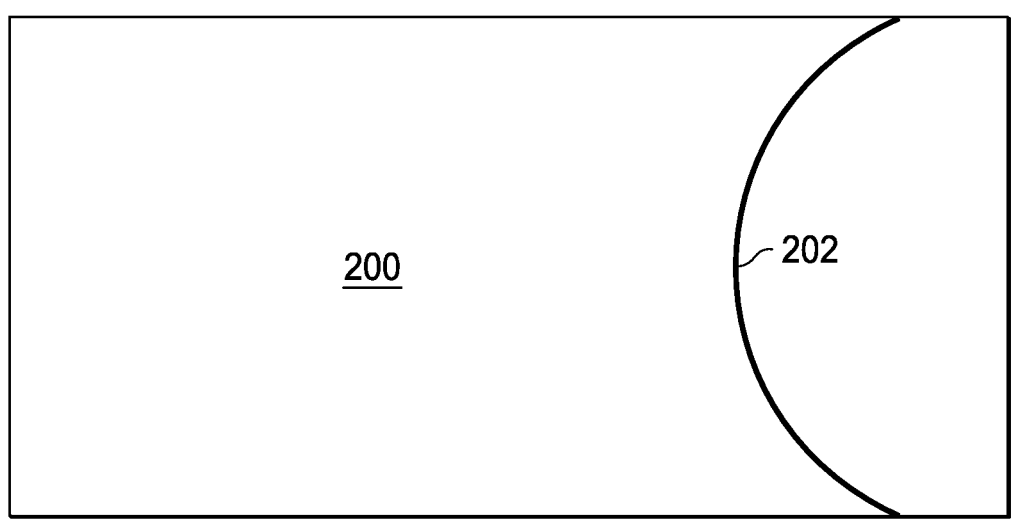
FIGS. 2A-2I are diagrams illustrating a curvilinear slider interface element according to at least one example embodiment.

FIG. 2A is a diagram illustrating curvilinear slider interface element 202 in relation to display region 200, according to at least one example embodiment. In the example of FIG. 2A, curvilinear slider interface element 202 is concave towards the right boundary of display region 200. In at least one example embodiment, interface element 202 is an elliptical slider interface element having a foci proximate to the right boundary of display region 200. However, position of the foci may vary. For example, the foci may be positioned within display region 200, may be positioned beyond the boundary of display region 200, may be positioned beyond the apparatus, etc. For example, the foci may be positioned at a point beyond the apparatus that corresponds with an average position of a thumb joint when the apparatus is held by a user. It can be seen that curvilinear slider interface element 202 extends from one boundary of display region 200 to another boundary of display region 200. However, curvilinear slider interface element may have at least one terminus within the boundary of display region 200.

Figure 2B:
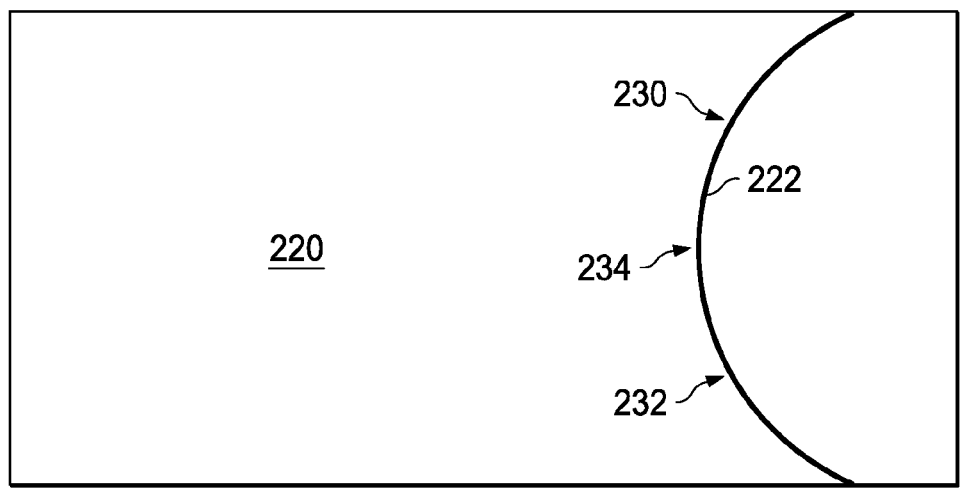

FIG. 2B is a diagram illustrating curvilinear slider interface element 222 in relation to display region 220, according to at least one example embodiment. In the example of FIG. 2B, indicators 230, 232, and 234 relate to representations indicating correlation of a position along the contour of the curvilinear slider interface element and a value represented by the indicator. In at least one example embodiment, a position along the contour of a slider interface element that is associated with a value may be referred to as a value position. Therefore, In at least one example embodiment, indicator 230 is caused to be displayed proximate to a value position associated with a value indicated by indicator 230, indicator 232 is caused to be displayed proximate to a value position associated with a value indicated by indicator 232, and indicator 234 is caused to be displayed proximate to a value position associated with a value indicated by indicator 234. In at least one example embodiment, indicators 230, 232, and 234 are oriented such that the base of the indicator aligns with the base of the display region. The base of the indicator relates to the bottom portion of the indicator when the indicator is shown in an upright representation. In at least one example embodiment, indicators 230, 232, and 234 are oriented such that the base of the indicator aligns with the contour of curvilinear slider interface element 222.

A value associated with a setting of a slider interface element may be a non-cardinal value. For example, the value may be a designation of a classification associated with the setting. In such an example, the value may indicate a classification such as automatic value determination, an algorithm associated with value determination, and/or the like, similar as described regarding FIG. 9. Therefore, at least one of representations 230, 232, and 234 may be a demarcation of an automatic adjustment selection.

Figure 2C:
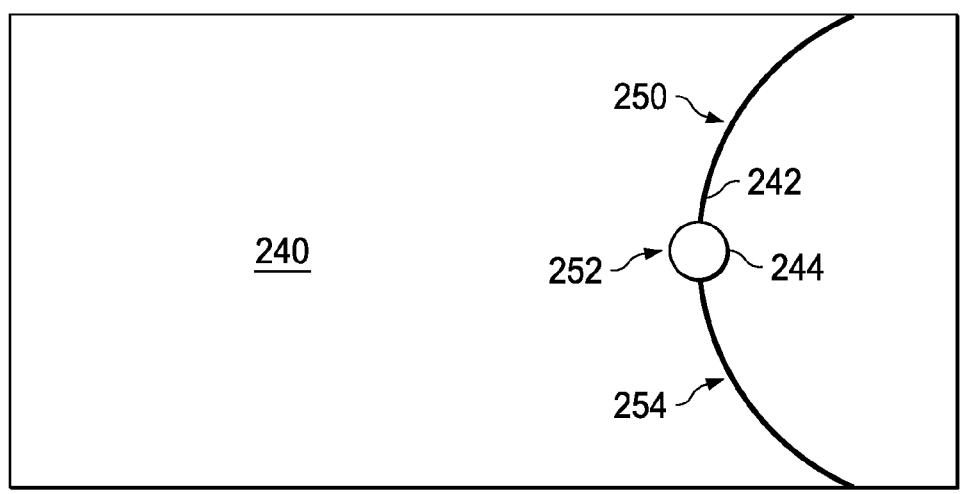

FIG. 2C is a diagram illustrating curvilinear slider interface element 242 in relation to display region 240, according to at least one example embodiment. The example of FIG. 2C illustrates selection point 244 associated with curvilinear slider interface element 242. In at least one example embodiment, a selection point relates to an indicator that identifies a position along the contour of a slider interface element that corresponds with a selected value position. In at least one example embodiment, an apparatus determines a value of the setting that is associated with a slider interface element, such as a curvilinear slider interface element, based, at least in part, on the position of the selection point relative to the slider interface element. For example, the apparatus may correlate position of the selection point with a value position of the slider interface element, and determine the value based, at least in part, on a value associated with the value position.

In the example of FIG. 2C, indicators 250, 252, and 254 relate to representations indicating values associated with value positions of curvilinear slider interface element 242, similar as described regarding FIG. 2B. It can be seen that the position of indicator 252 is proximate to selection point 244 by way of being adjacent to selection point 244. In at least one example embodiment, indicator 252 comprises a representation of the value of the setting associated with curvilinear slider interface element 242. For example, indicator 252 may be a representation of the value associated with a value position that corresponds with selection point 252. In at least one example embodiment, indicators 250 and 254 are referred to as non-selected value information and indicator 252 is referred to as selected value information. In at least one example embodiment, selected value information differs from non-selected value information. For example, such difference may emphasize selected value information beyond the emphasis of non-selected value information. For example, non-selected value information may be oriented such that the base of the indicator aligns with the contour of curvilinear slider interface element 242, and selected value information may be oriented such that the base of selected value information aligns with the base of display region 240. In another example, selected value information may vary from non-selected value information by size, by color, by font, and/or the like.

In at least one example embodiment, selected value information may comprise an indication that the setting associated with a curvilinear slider interface element is subject to automatic adjustment. In such circumstances, selected value information may further comprise a representation of the value of the setting, i.e. the automatically selected value.

Figure 2D:
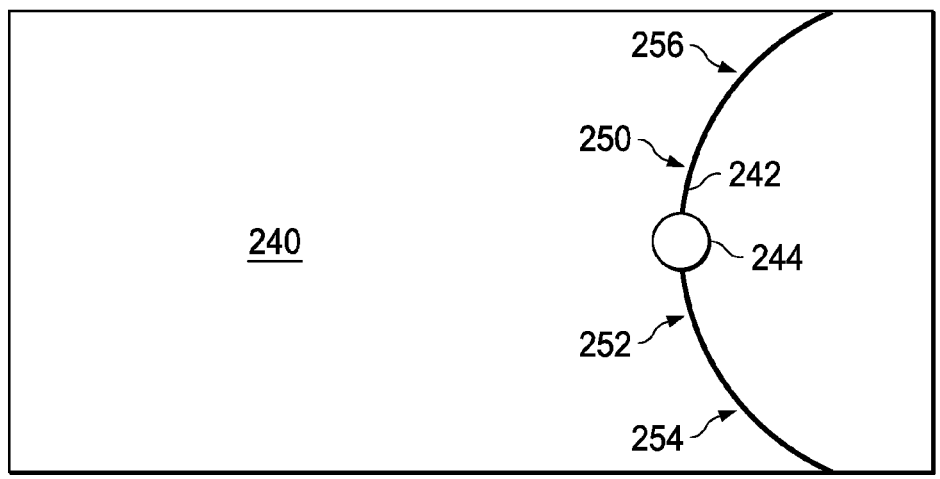

FIG. 2D is a diagram illustrating curvilinear slider interface element 242 in relation to display region 240, according to at least one example embodiment. In at least one example embodiment, an apparatus may cause movement of a selection point relative to a curvilinear slider interface element associated with the selection point. In at least one example embodiment, movement of a selection point relative to a curvilinear slider interface element associated with the selection point is referred to as adjustment movement. In at least one example embodiment, adjustment movement may be based, at least in part, on receipt of an indication of an input associated with the curvilinear slider interface element. For example, the input may be a drag input. In at least one example embodiment, the adjustment movement is based, at least in part, on receipt of an indication of a drag input. The drag input may comprise a contact input associated with the curvilinear slider interface element. In at least one example embodiment, the adjustment movement is in proportion to a movement input of the drag input. For example, the adjustment movement may be based, at least in part, on a projection of the movement input on the contour of the curvilinear slider interface element.

In at least one example embodiment, movement of the selection point relative to the curvilinear slider interface element relates to retaining position of a selection point associated with the curvilinear slider interface element. For example, the curvilinear slider interface element may move, and the selection point may be stationary. In at least one example embodiment, the movement of the selection point relative to the curvilinear slider interface element is characterized by rotating the first curvilinear slider interface element. For example, the curvilinear slider interface element may be rotated about a region that it is concave toward. In at least one example embodiment, rotation of the curvilinear slider interface element relates to movement of value positions along the contour of the curvilinear slider interface element.

The slider interface element may operate to provide an illusion of a continuous ellipse that is beyond the curvilinear slider interface element displayed to a user. For example, based, at least in part, on the movement of rotation of the curvilinear slider interface element, the curvilinear slider interface element may provide non-selected value information that was previously omitted. In another example, based, at least in part, on the movement of rotation of the curvilinear slider interface element, the curvilinear slider interface element may omit non-selected value information that was previously provided. The example of FIG. 2D illustrates curvilinear slider interface element 242 after adjustment movement from the representation illustrated in FIG. 2C. It can be seen that curvilinear slider interface element 242 has rotated counter clockwise, and selection point 244 has retained its position. Similarly, non-selected value information 250 has rotated in conjunction with the curvilinear slider interface element. It can be seen that indicator 252 has rotated in conjunction with curvilinear slider interface element 242. As such, indicator 252 fails to correlate with selection point 244, and is non-selected value information. It can be seen that, based, at least in part, on the movement of rotation of curvilinear slider interface element 242, curvilinear slider interface element 242 has provided non-selected value information 256, which was previously omitted.

In at least one example embodiment, the movement of the selection point relative to the curvilinear slider interface element associated with the selection point may be based, at least in part, on a determination that a value of the setting associated with the curvilinear slider interface element has changed. The value may have changed by way of automatic adjustment, by way of change by another program, by way of a directive to set the setting to a default value, and/or the like. Under such circumstances, the apparatus may cause the movement of the selection point relative to the curvilinear slider interface element associated with the selection point based, at least in part, on a determination that a value of the setting associated with the curvilinear slider interface element has changed. Such determination may be based, at least in part, on the apparatus performing the change, receiving a notification signifying the change, and/or the like. For example, the apparatus may be set to automatically adjust the setting. In such an example, the setting may relate to a focus setting, and the apparatus may be set to utilize automatic focus. In such an example, a change in focus associated with the automatic focus may be represented by an adjustment movement of the curvilinear slider interface element.

Without limiting the scope of the claims in any way, at least one technical effect associated with causing adjustment movement of the curvilinear slider interface element based, at least in part, on determination that the setting associated with the curvilinear slider interface element has changed may be to allow the user to perceive the change in the same manner as if the user had performed the change himself. This perception may be desirable to allow the user to better perceive the effect of a setting adjustment as the adjustment occurs without reading any indicator.

Figure 2E:
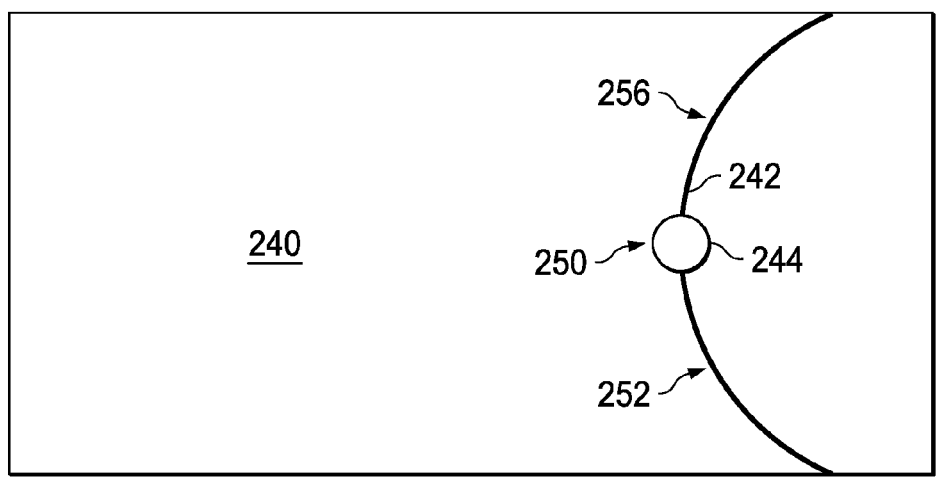

FIG. 2E is a diagram illustrating curvilinear slider interface element 242 in relation to display region 240, according to at least one example embodiment. The example of FIG. 2E illustrates curvilinear slider interface element 242 after adjustment movement from the representation illustrated in FIG. 2D. It can be seen that curvilinear slider interface element 242 has rotated counter clockwise, and selection point 244 has retained its position. Similarly, indicator 250 has rotated in conjunction with the curvilinear slider interface element. It can be seen that indicator 250 now correlates with selection point 244, and has become selected value information 250. It can be seen that, based, at least in part, on the adjustment movement of rotation of curvilinear slider interface element 242, curvilinear slider interface element 242 has omitted non-selected value information 254, which was previously provided.

Figure 2F:
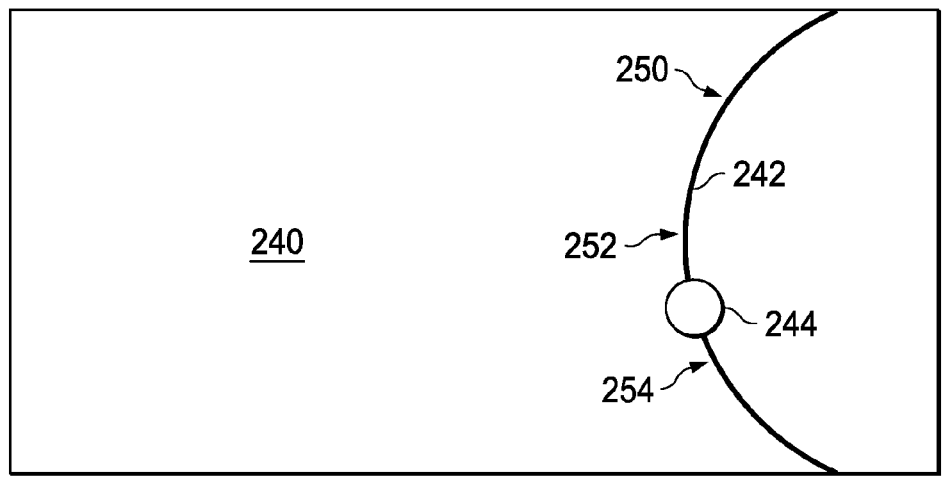

FIG. 2F is a diagram illustrating curvilinear slider interface element 242 in relation to display region 240, according to at least one example embodiment. In at least one example embodiment, movement of the selection point relative to the curvilinear slider interface element relates to retaining position of a curvilinear slider interface element associated with the selection point. For example, the selection point may move, and the curvilinear slider interface element may be stationary. In at least one example embodiment, the movement of the selection point relative to the curvilinear slider interface element is characterized by movement of the selection point along the contour of the curvilinear slider interface element.

The example of FIG. 2F illustrates curvilinear slider interface element 242 and selection point 244 after adjustment movement from the representation illustrated in FIG. 2C. It can be seen that selection point 244 has moved counter clockwise along the contour of curvilinear slider interface element 242, and curvilinear slider interface element 242 has retained its position. As such, indicator 252 fails to correlate with selection point 244, and is non-selected value information.

Figure 2G:
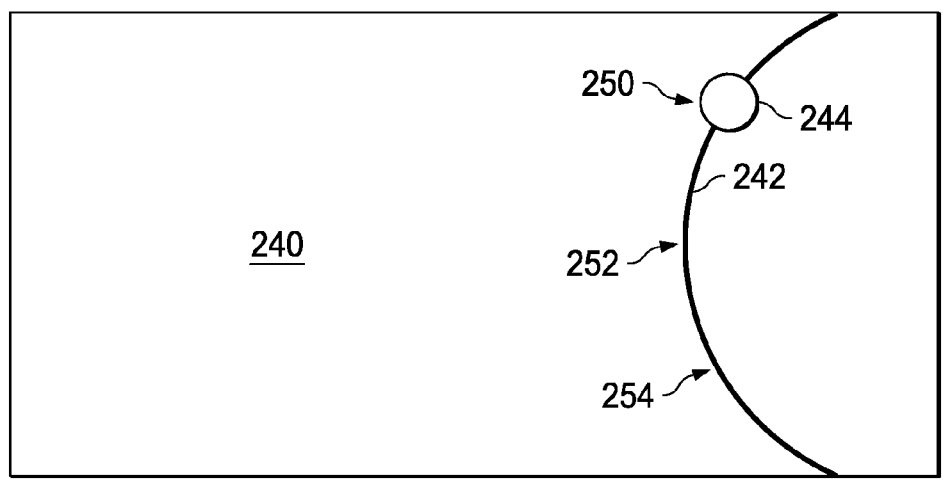

FIG. 2G is a diagram illustrating curvilinear slider interface element 242 in relation to display region 240, according to at least one example embodiment. The example of FIG. 2G illustrates curvilinear slider interface element 242 and selection point 244 after adjustment movement from the representation illustrated in FIG. 2F. It can be seen that selection point 244 has moved counter clockwise along the contour of curvilinear slider interface element 242, and curvilinear slider interface element 242 has retained its position. It can be seen that indicator 250 now correlates with selection point 244, and has become selected value information 250.

It may be desirable to provide selected value information associated with a curvilinear slider interface element at a position relative to the curvilinear slider interface element such that the position does not vary in correspondence with adjustment movement of the curvilinear slider interface element. In at least one example embodiment, the selected value information may be positioned in correspondence with a midpoint of the curvilinear slider interface element, at a midpoint on an axis of a display region, and/or the like. Without limiting the scope of the claims in any way, at least one technical effect of such position retention may be to provide a user with a consistent location to expect to see selected value information with respect to a curvilinear slider interface element.

Figure 2H:
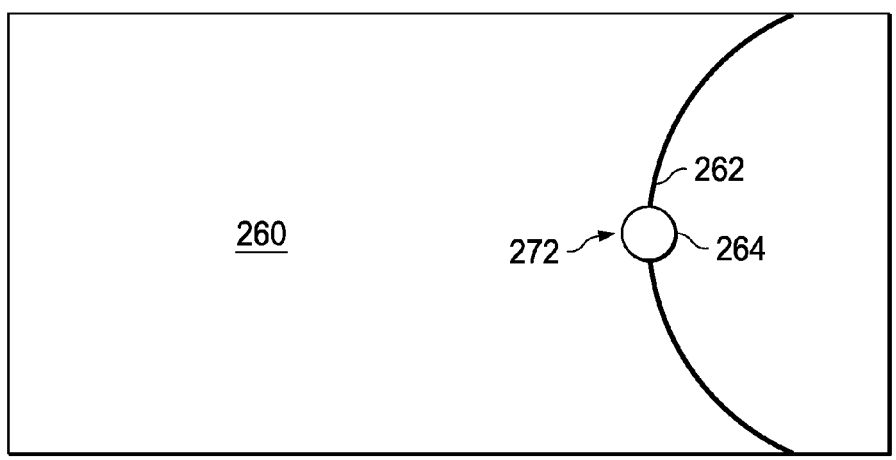

FIG. 2H is a diagram illustrating curvilinear slider interface element 262, selection point 264, and selected value information 272 in relation to display region 260, according to at least one example embodiment. The example of FIG. 2H selected value information 272 being adjacent to curvilinear slider interface element 262 at a midpoint of curvilinear slider interface element 262. It can be seen that selected value information 272 is at a midpoint of a vertical axis of display region 260.

Figure 2I:
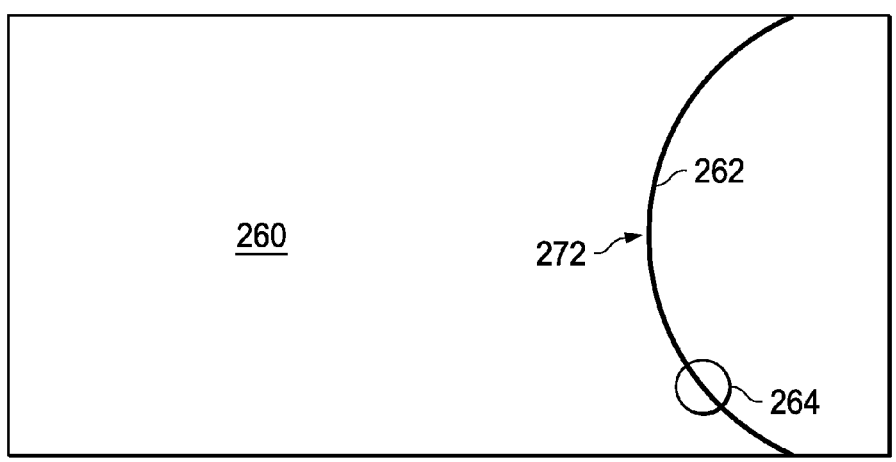

FIG. 2I is a diagram illustrating curvilinear slider interface element 262, selection point 264, and selected value information 272 in relation to display region 260, according to at least one example embodiment. The example of FIG. 2I relates to the example of FIG. 2H after an adjustment movement of curvilinear slider interface element 262. In the example of FIG. 2I, selected value information 272 has retained its position. For example, position of value information 272 did not vary in correspondence with the adjustment movement of curvilinear slider interface element 262 illustrated in the example of FIG. 2I.

FIGS. 3A-3J are diagrams illustrating a curvilinear slider interface element according to at least one example embodiment. The examples of FIGS. 3A-3J are merely examples of a curvilinear slider interface element, and do not limit the scope of the claims. For example, eccentricity of the curvilinear slider interface element may vary, position of the curvilinear slider interface element may vary, and/or the like.

Figure 3A:
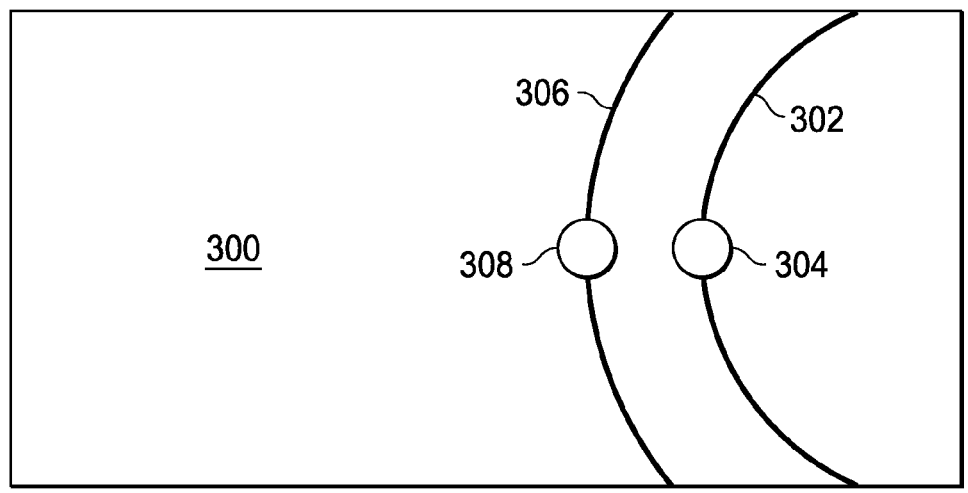

FIG. 3A is a diagram illustrating a plurality of curvilinear slider interface elements in relation to display area 300, according to at least one example embodiment. In at least one example embodiment, an apparatus causes display of a curvilinear slider interface element associated with a setting, and causes display of another curvilinear slider interface element associated with another setting. For example, curvilinear slider interface element 302 may be associated with one setting, and curvilinear slider interface element 306 may be associated with a different setting. In the example of FIG. 3A, selection point 308 is associated with curvilinear slider interface element 306, and selection point 304 is associated with curvilinear slider interface element 302.

In at least one example embodiment, a plurality of selection points are aligned along a common delineation. In at least one example embodiment, a plurality of selection points are aligned along an axis associated with a display region, such as a vertical axis, a horizontal axis, and/or the like. In at least one example embodiment, a plurality of selection points are aligned along an axis associated with a display region, such that the axis intersects a midpoint of the display region. In the example of FIG. 3A, selection points 304 and 308 are aligned along a horizontal axis associated with display region 300, such that the axis intersects the vertical midpoint of display region 300.

Without limiting the scope of the claims in any way, at least one technical effect associated with the plurality of selection points being aligned along a common delineation may be to allow the user to gaze across the selection points in a linear eye movement without directional changes. Without limiting the scope of the claims in any way, at least one technical effect associated with the plurality of selection points being aligned along a common delineation may be to allow the user to recognize that there is a relationship among the curvilinear slider interface elements. Without limiting the scope of the claims in any way, at least one technical effect associated with the plurality of selection points being aligned along an axis associated with a display region may be to allow the user to perceive the selection points as an extension of the geometry associated with the display region. Such perception may assist the user in locating and recognizing the selection points by way of extending the paradigm established by the geometry of the display area, so that the user interacts more quickly and/or makes fewer errors. Without limiting the scope of the claims in any way, at least one technical effect associated with the plurality of selection points being aligned along an axis associated with a display region, such that the axis intersects a midpoint of the display region may be to allow for similar visibility of the curvilinear slider interface element above and below the selection point. Such visibility may allow the user to perceive values indicators along the curvilinear slider interface element similarly in both directions, and thus may allow the user to perform input more quickly and/or with fewer errors.

In at least one example embodiment, a plurality of curvilinear slider interface elements have concavity towards a common region with differing distances from the region. In at least one example embodiment, a region extending from the curvilinear slider interface element in a direction towards which the curvilinear slider interface element is concave is referred to as a concavity region. In a least one example embodiment, curvilinear slider interface elements are referred to as being concentrically curvilinear if one curvilinear slider interface element is positioned such that another curvilinear slider interface element is within the concavity region of the curvilinear slider interface element.

In at least one example embodiment, a plurality of elliptical slider interface elements have common foci with differing distances from the foci are concentrically curvilinear. For example, one elliptical slider interface element may be based, at least in part, on an ellipse that has common foci with an ellipse which serves as the basis for another elliptical slider interface element. In other words, the plurality of elliptical slider interface elements may be concentrically elliptical. For example, the plurality of elliptical slider interface elements may be based, at least in part, on concentric ellipses.

Without limiting the scope of the claims in any way, at least one technical effect associated with the plurality of curvilinear slider interface elements being concentric may be to allow the user to recognize that there is a relationship among the curvilinear slider interface elements.

Figure 3B:
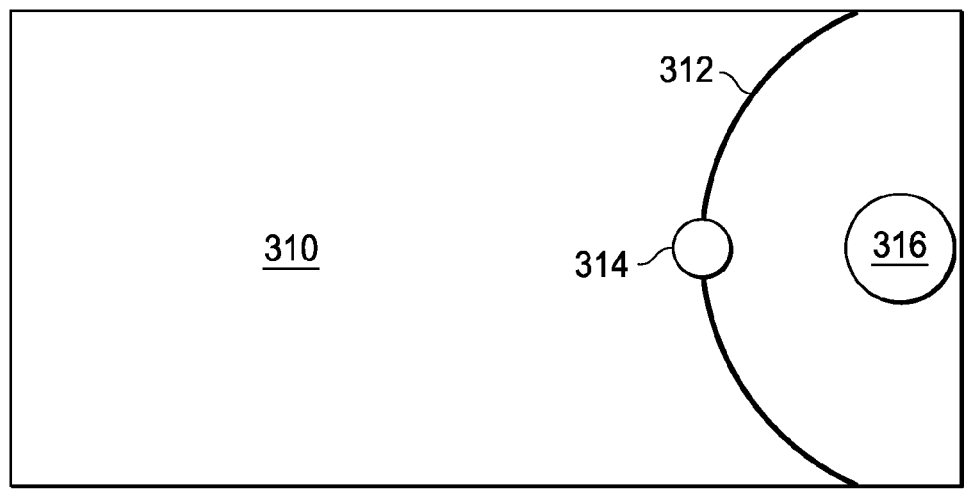

FIG. 3B is a diagram illustrating curvilinear slider interface element 312 and operation actuator 316 in relation to display region 310, according to at least one example embodiment.

In at least one example embodiment, a setting associated with a curvilinear slider interface element is associated with an operation. For example, the setting may be a setting that is utilized in association with performance of the operation. For example, the setting may influence performance of the operation in some way. For example, the operation may be an image capture operation and the setting may relate to a shutter speed setting.

In at least one example embodiment, an operation actuator, such as operation actuator 316, relates to a representation of the operation that allows the user to identify the operation. In at least one example embodiment, the operation actuator may relate to invocation of the operation associated with the operation actuator. For example, an apparatus may receive an input indicative of invocation of the operation, based, at least in part, on the input being related to the operation actuator. For example, the apparatus may determine to invoke an operation based, at least in part, on correlation between an input and the operation actuator. In at least one example embodiment, an input associated with causing invocation of an operation associated with an operation actuator is referred to as an actuation input. For example, a user tapping on a touch display at a position associated with an operation actuator may be an actuation input associated with the operation actuator. In at least one example embodiment, an apparatus may cause performance of the operation based, at least in part, on receipt of an indication of an actuation input associated with an operation actuator. In such an example, the operation may be performed in accordance with one or more settings associated with one or more curvilinear slider interface elements.

In the example of FIG. 3B, operation actuator 316 may be associated with an operation. In such an example, the operation may be associated with a setting. The setting may be associated with curvilinear slider interface element 312. In at least one example embodiment, performance of the operation associated with operation actuator 316 comprises performance of the operation in accordance with the setting associated with curvilinear slider interface element 312 having a value indicated by selection point 314.

In at least one example embodiment, an operation actuator is positioned within an ellipse associated with a curvilinear slider interface element. For example, operation actuator 316 is positioned within the ellipse of curvilinear slider interface element 312. Without limiting the claims in any way, at least one technical effect associated with an operation actuator being positioned within an ellipse associated with a curvilinear slider interface element may be to allow the user to recognize that there is a relationship between the curvilinear slider interface element and the operation actuator. For example, the user may be able to intuitively determine that a setting associated with curvilinear slider interface element 312 is associated with an operation indicated by operation actuator 316.

FIG. 3C is a diagram illustrating curvilinear slider interface elements 322 and 328 and operation actuator 326 in relation to display region 320, according to at least one example embodiment. In at least one example embodiment, an operation represented by an operation actuator has a plurality of associated settings. In such an embodiment, at least a portion of, the settings may relate to a plurality of curvilinear slider interface elements.

In the example of FIG. 3C, operation actuator 326 may be associated with an operation. In such an example, the operation may be associated with at least two (2) settings. One setting may be associated with curvilinear slider interface element 322, and another setting may be associated with curvilinear slider interface element 328. In at least one example embodiment, performance of the operation associated with operation actuator 326 comprises performance of the operation in accordance with the setting associated with curvilinear slider interface element 312 having a value indicated by selection point 314, and in accordance with the setting associated with curvilinear slider interface element 328 having a value indicated by selection point 330.

In at least one example embodiment, a plurality of selection points and an operation actuator are aligned along a common delineation. In at least one example embodiment, a plurality of selection points and an operation actuator are aligned along an axis associated with a display region, such as a vertical axis, a horizontal axis, and/or the like. In at least one example embodiment, a plurality of selection points and an operation actuator are aligned along an axis associated with a display region, such that the axis intersects a midpoint of the display region. In the example of FIG. 3C, selection points 324 and 330 and operation actuator 326 are aligned along a horizontal axis associated with display region 320, such that the axis intersects the vertical midpoint of display region 320.

Without limiting the scope of the claims in any way, at least one technical effect associated with the plurality of selection points and the operation actuator being aligned along a common delineation may be to allow the user to gaze across the selection points and the operation actuator in a linear eye movement without directional changes. Without limiting the scope of the claims in any way, at least one technical effect associated with the plurality of selection points and the operation actuator being aligned along a common delineation may be to allow the user to recognize that there is a relationship among the curvilinear slider interface elements and the operation actuator. Without limiting the scope of the claims in any way, at least one technical effect associated with the plurality of selection points and the operation actuator being aligned along an axis associated with a display region may be to allow the user to perceive the selection points and the operation actuator as an extension of the geometry associated with the display region. Such perception may assist the user in locating and recognizing the selection points and the operation actuator by way of extending the paradigm established by the geometry of the display area, so that the user interacts more quickly and/or makes fewer errors.

FIG. 3D is a diagram illustrating curvilinear slider interface elements 323 and 329 and operation actuator 327 in relation to display region 321, according to at least one example embodiment. In the example of FIG. 3D, operation actuator 327 may be associated with an operation. In such an example, the operation may be associated with at least two (2) settings. One setting may be associated with curvilinear slider interface element 323, and another setting may be associated with curvilinear slider interface element 329. In at least one example embodiment, performance of the operation associated with operation actuator 327 comprises performance of the operation in accordance with the setting associated with curvilinear slider interface element 313 having a value indicated by selection point 315, and in accordance with the setting associated with curvilinear slider interface element 329 having a value indicated by selection point 331. In the example of FIG. 3D, selected value information 333 indicates a value corresponding to selection point 325 in relation to curvilinear slider interface element 323, and selected value information 335 indicates a value corresponding to selection point 331 in relation to curvilinear slider interface element 329.

In at least one example embodiment, a plurality of selected value information and an operation actuator are aligned along a common delineation. In at least one example embodiment, a plurality of selected value information and an operation actuator are aligned along an axis associated with a display region, such as a vertical axis, a horizontal axis, and/or the like. In at least one example embodiment, a plurality of selected value information and an operation actuator are aligned along an axis associated with a display region, such that the axis intersects a midpoint of the display region. In the example of FIG. 3D, selected value information 333 and 335 and operation actuator 327 are aligned along a horizontal axis associated with display region 321, such that the axis intersects the vertical midpoint of display region 321.

Without limiting the scope of the claims in any way, at least one technical effect associated with the plurality of selected value information and the operation actuator being aligned along a common delineation may be to allow the user to gaze across the selected value information and the operation actuator in a linear eye movement without directional changes. Without limiting the scope of the claims in any way, at least one technical effect associated with the plurality of selected value information and the operation actuator being aligned along a common delineation may be to allow the user to recognize that there is a relationship among the curvilinear slider interface elements and the operation actuator. Without limiting the scope of the claims in any way, at least one technical effect associated with the plurality of selected value information and the operation actuator being aligned along an axis associated with a display region may be to allow the user to perceive the selected value information and the operation actuator as an extension of the geometry associated with the display region. Such perception may assist the user in locating and recognizing the selection points and the operation actuator by way of extending the paradigm established by the geometry of the display area, so that the user interacts more quickly and/or makes fewer errors.

Figure 3E:
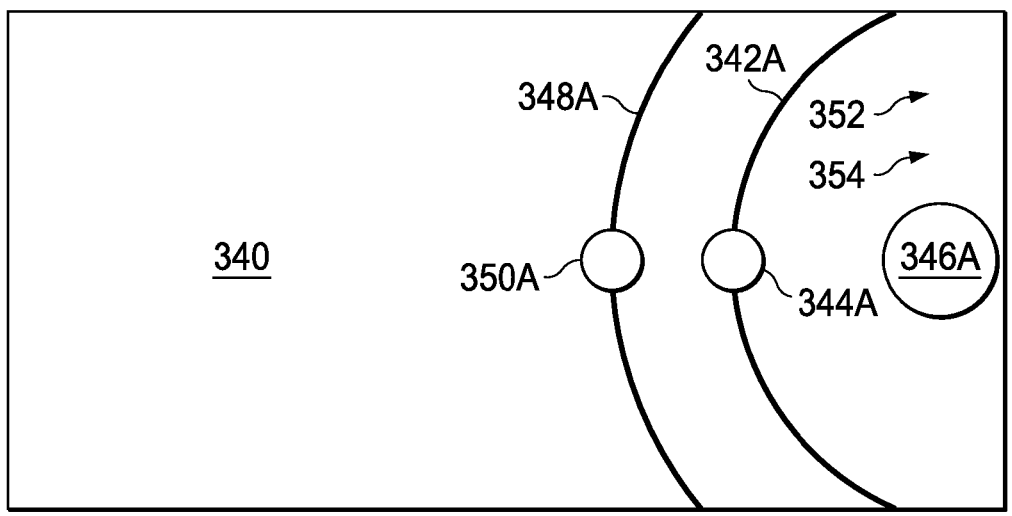

FIG. 3E is a diagram illustrating operation actuator 346A in relation to operation indicator 352 and 354 in relation to display region 340, according to at least one example embodiment. In at least one example embodiment, performance of the operation associated with operation actuator 346A comprises performance of the operation in accordance with the setting associated with curvilinear slider interface element 342A having a value indicated by selection point 344A, and in accordance with the setting associated with curvilinear slider interface element 348A having a value indicated by selection point 350A.

In at least one example embodiment, it may be desirable to allow a user to transition which operation is associated with an operation actuator. For example, a program associated with a display region may provide more than one operation, similar as described regarding FIG. 3G. A representation of an operation may be any information that identifies the operation, such as text information, an icon, and/or the like.

In at least one example embodiment, a user performs an input indicative of selection of an operation indicator. In such circumstances, an apparatus may receive an indication that an operation associated with the operation indicator has been selected. In such an example, the apparatus may cause replacement of the operation actuator with an operation actuator associated with the operation of the selected operation indicator.

Figure 3F:
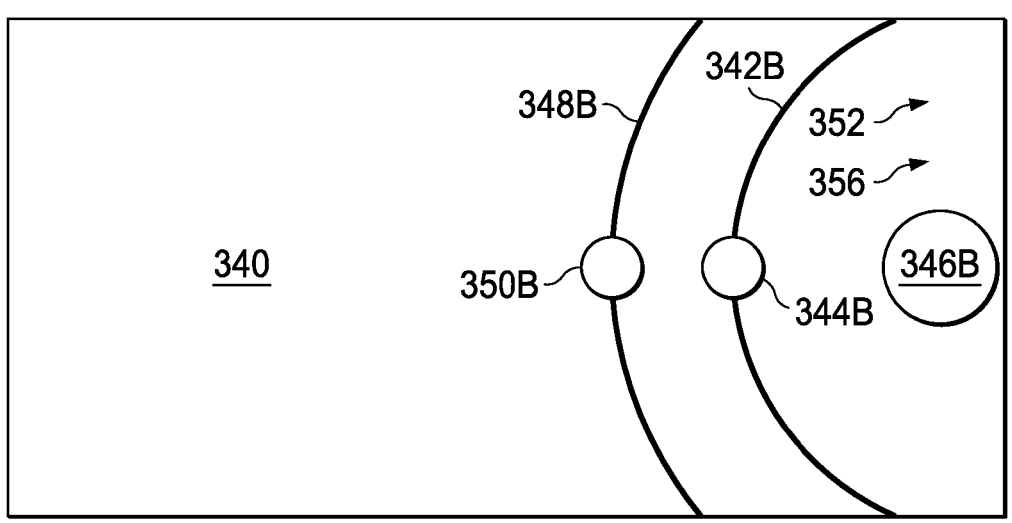

FIG. 3F is a diagram illustrating operation actuator 346B and operation indicators 352 and 356 in relation to display region 340, according to at least one example embodiment. The example of FIG. 3F may relate to circumstances associated with receiving an input indicative of a user selection of operation indicator 354 in the example of FIG. 3E. In the example of FIG. 3F, operation actuator 346A has been replaced by operation actuator 346B. Operation actuator 346B may be associated with the operation of operation indicator 354. In the example of FIG. 3F, curvilinear slider interface elements 342A and 348A have been replaced by curvilinear slider interface elements 342B and 348B. Similarly, selection points 344A and 335A have been replaced by selection points 344B and 350B. In at least one example embodiment, the apparatus may cause replacement of a curvilinear slider interface element based upon replacement of an operation actuator associated with the curvilinear slider interface element. For example, a setting associated with the replaced operation actuator may not be associated with the replacement operation actuator. In such an example, there may be a different setting associated with the replacement operation actuator. Therefore, it may be desirable to replace a curvilinear slider interface element associated with the setting with a curvilinear slider interface element associated with the different setting.

Without limiting the scope in any way, at least one technical effect associated with replacing a curvilinear slider interface element based, at least in part, on replacement of an operation actuator may be to preserve the associative relationship between a displayed operation actuator and a displayed curvilinear slider interface element.

Figure 3G:
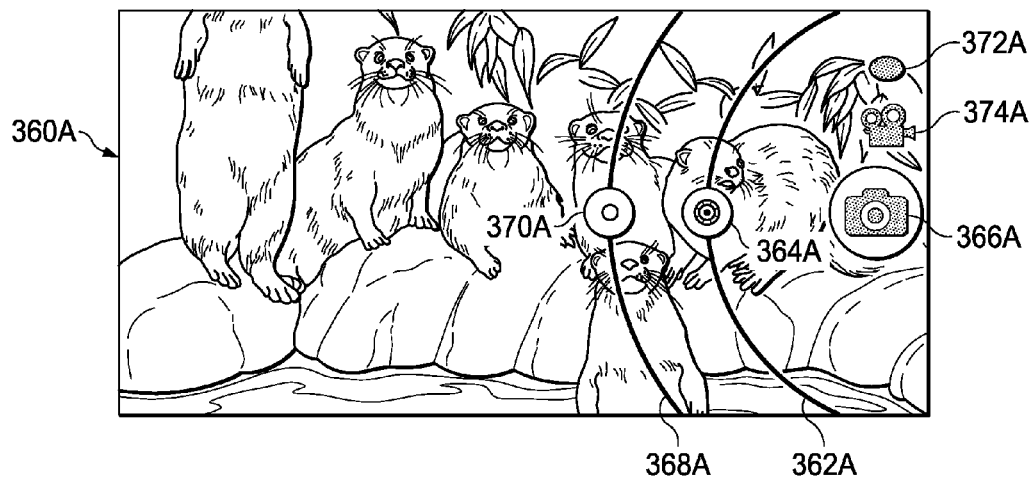

FIG. 3G is a diagram illustrating curvilinear slider interface elements 362A and 368A and operation actuator 366A in relation to display region 360A, according to at least one example embodiment associated with a visual capture program. In the example of FIG. 3G, operation actuator 366A relates to an image capture operation, and comprises an indication of the image capture operation, and operation indicator 374A relates to a video capture operation and operation indicator 372A may relate to a high dynamic range (HDR) image capture operation. In the example of FIG. 3G, curvilinear slider interface element 362A relates to a shutter speed setting and selection point 364A comprises a setting indicator representing the shutter speed setting. In the example of FIG. 3G, curvilinear slider interface element 368A relates to a focus setting and selection point 370A comprises a setting indicator representing the focus setting. It should be understood that FIG. 3G is merely an example, and that there may be additional or fewer visual capture settings associated with an image capture operation.

Figure 3H:
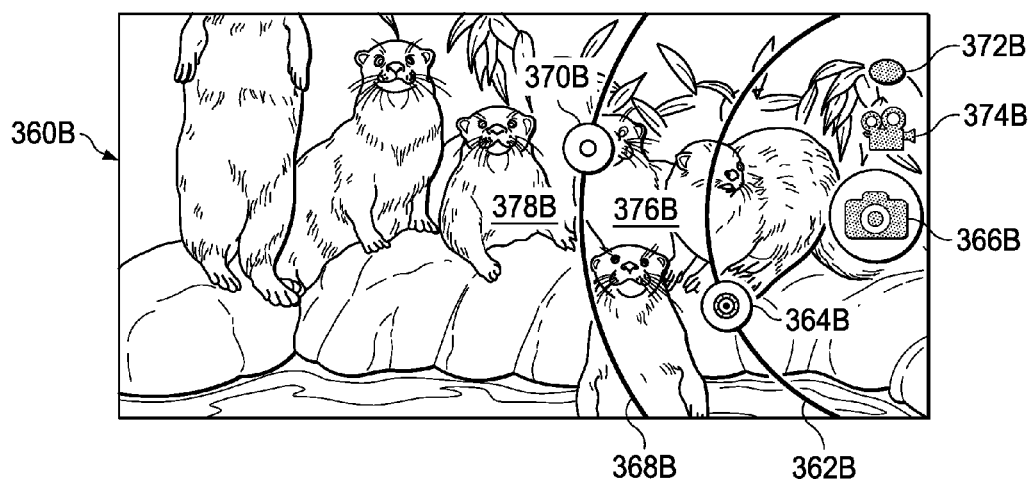

FIG. 3H is a diagram illustrating curvilinear slider interface elements 362B and 368B and operation actuator 366B in relation to display region 360B, according to at least one example embodiment associated with a visual capture program. In the example of FIG. 3H, operation actuator 366B relates to an image capture operation, and comprises an indication of the image capture operation, and operation indicator 374B relates to a video capture operation and operation indicator 372B may relate to a HDR image capture operation. In the example of FIG. 3H, curvilinear slider interface element 362B relates to a shutter speed setting and selection point 364B comprises a setting indicator representing the shutter speed setting. In the example of FIG. 3H, curvilinear slider interface element 368B relates to a focus setting and selection point 370B comprises a setting indicator representing the focus setting. It should be understood that FIG. 3H is merely an example, and that there may be additional or fewer visual capture settings associated with an image capture operation. In the example of FIG. 3H, selected value information 376B indicates a shutter speed value corresponding to selection point 364B in relation to curvilinear slider interface element 362B.

In the example of FIG. 3H, selected value information 378B indicates a focus value corresponding to selection point 370B in relation to curvilinear slider interface element 368B.

During a time when a user is performing an adjustment by way of a curvilinear slider interface element, it may be desirable to reduce the amount of adjustment related information provided to a user. For example, it may be desirable to reduce the number of interactions presented to a user to reduce the likelihood of the user becoming confused, to reduce the likelihood of the user performing an error, and/or the like. In addition, if the curvilinear slider interface element is overlaid on other visual information, similar as described regarding FIGS. 3G-3H, it may be desirable to reduce obscurance of the visual information attributable to the curvilinear slider interface elements.

In at least one example embodiment, when a user is performing an adjustment by way of a curvilinear slider interface element, the apparatus may reduce visibility of at least another curvilinear slider interface element. In at least one example embodiment, reduction of visibility of a curvilinear slider interface element comprises reduction of visibility of an associated selection point, an associated setting value information, and/or the like. In at least one example embodiment, reduction of visibility of a curvilinear slider interface element relates to increasing visibility of information overlain by the curvilinear slider interface element. For example, reduction of visibility of a curvilinear slider interface element may comprise increasing opacity of the curvilinear slider interface element, terminating display of the curvilinear slider interface element, reducing thickness of the curvilinear slider interface element, and/or the like.

In at least one example embodiment, when a user has completed performance of an adjustment by way of a curvilinear slider interface element, the apparatus may restore visibility of at least another curvilinear slider interface element. In at least one example embodiment, restoration of visibility of a curvilinear slider interface element comprises restoration of visibility of an associated selection point, an associated setting value information, and/or the like. In at least one example embodiment, restoration of visibility of a curvilinear slider interface element relates to decreasing visibility of information overlain by the curvilinear slider interface element to an extent to which the information was previously visible. For example, restoration of visibility of a curvilinear slider interface element may comprise decreasing opacity of the curvilinear slider interface element, causing display of the curvilinear slider interface element, restoring thickness of the curvilinear slider interface element, and/or the like.

Figure 3I:
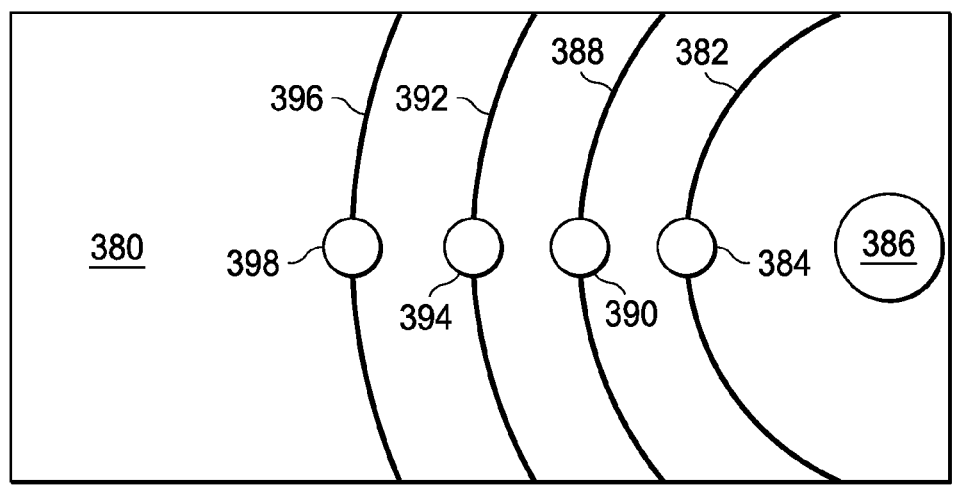

FIG. 3I illustrates curvilinear slider interface element 382 with associated selection point 384, curvilinear slider interface element 388 with associated selection point 390, curvilinear slider interface element 392 with associated selection point 394, curvilinear slider interface element 396 with associated selection point 398, and operation actuator 386 in relation to display region 380. The example of FIG. 3I may relate to a configuration for setting adjustment associated with a time that a user is not performing input associated with a curvilinear slider interface element.

Figure 3J:
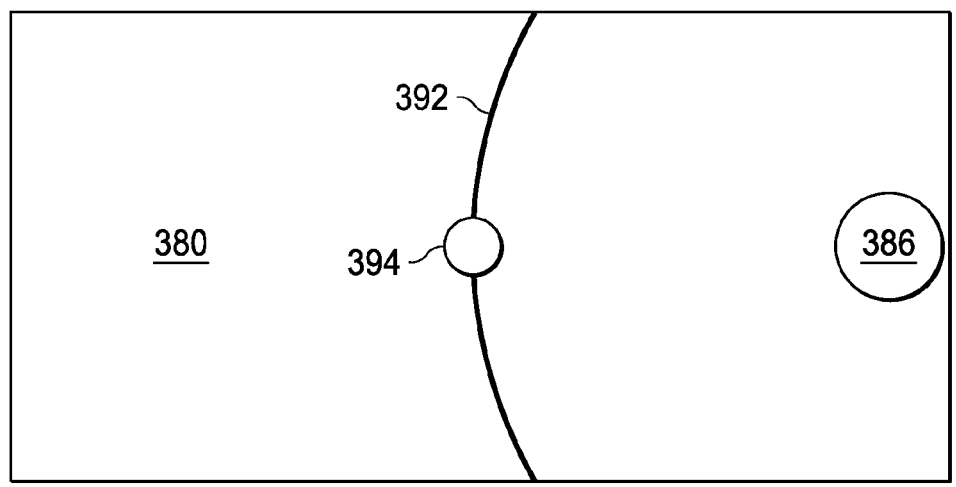

FIG. 3J illustrates curvilinear slider interface element 392 with associated selection point 394, and operation actuator 386 in relation to display region 380. The example of FIG. 3J may relate to a configuration for setting adjustment associated with a time that a user is performing input associated with a curvilinear slider interface element. It can be seen in the example that visibility of curvilinear slider interface elements 382, 388, and 396 has been reduced. It can further be seen that visibility of selection points 384, 390, and 398 has been reduced. In the example of FIG. 3J reduction of visibility may relate to termination of display of curvilinear slider interface elements 382, 388, and 396, and selection points 384, 390, and 398. In at least one example embodiment, when the user terminates input associated with curvilinear slider interface element 392, the apparatus may restore visibility of curvilinear slider interface elements 382, 388, and 396, and selection points 384, 390, and 398 to the extent provided in the example of FIG. 3I.

Even though the examples of FIGS. 3I and 3J describe curvilinear slider interface elements, it should be understood that other slider interface elements may be utilized instead of or in addition to the curvilinear slider interface elements described.

FIGS. 4A-4B are diagrams illustrating a curvilinear slider interface element according to at least one example embodiment. The examples of FIGS. 4A-4B are merely examples of a curvilinear slider interface element, and do not limit the scope of the claims. For example, eccentricity of the curvilinear slider interface element may vary, position of the curvilinear slider interface element may vary, and/or the like.

In at least one example embodiment, it may be desirable to allow a user to influence which settings are controllable by way of a curvilinear slider interface element. For example, there may be a user designation of a setting for which to provide a curvilinear slider interface element. The user directive may be based, at least in part, on a user selecting a setting for which to provide a curvilinear slider interface element.

In at least one example embodiment, a user may designate a setting for which to provide a curvilinear slider interface element by way of a setting designation representation. In at least one example embodiment, a setting designation representation relates to a representation that indicates one or more settings that may be designated for adjustment.

FIG. 4A is a diagram illustrating operation actuator 402 and setting designation representations 410, 412, 414, 416, and 418 in relation to display area 400, according to at least one example embodiment. In the example of FIG. 4A, setting designation representations 410, 412, 414, 416, and 418 each relate to a different setting associated with the operation to which operation actuator 402 is associated. In at least one example embodiment, a setting designation representation associated with a setting comprises a representation of a value associated with the setting. For example, a setting designation representation associated with a focus setting may comprise an indication of a setting of automatic focus.

FIG. 4B is a diagram illustrating a curvilinear slider interface element according to at least one example embodiment. In at least one example embodiment, a setting designation representation representing a setting may indicate whether a curvilinear slider interface element associated with the setting is being provided. For example, if curvilinear slider interface element associated with a setting is provided, a designation representation representing the setting may have a different representation characteristic than a setting designation representation representing a setting for which a curvilinear slider interface element associated with the setting is not being provided. The representation characteristic may relate to color, font, opacity, and/or the like. In the example of FIG. 4B, a representation characteristic of setting designation representations 472 and 478 differs from setting designation representations 470, 474, and 476. In the example of FIG. 4B, a setting associated with setting designation representation 472 may be associated with curvilinear slider interface element 460. In at least one example embodiment, setting designation representation 472 may provide an indication of the value indicated by position of selection point 454 in relation to curvilinear slider interface element 460. In the example of FIG. 4B, a setting associated with setting designation representation 478 may be associated with curvilinear slider interface element 462. In at least one example embodiment, setting designation representation 478 may provide an indication of the value indicated by position of selection point 456 in relation to curvilinear slider interface element 462. In at least one example embodiment, a setting designation representation is distinct from a slider interface element. In at least one example embodiment, a setting designation representation is distinct from a selection point. It can be seen that setting designation representation 410, 412, 414, 416, and 418 are distinct from curvilinear slider interface elements 460 and 462. It can be seen that setting designation representation 410, 412, 414, 416, and 418 are distinct from selection points 454 and 456.

Figure 5A:
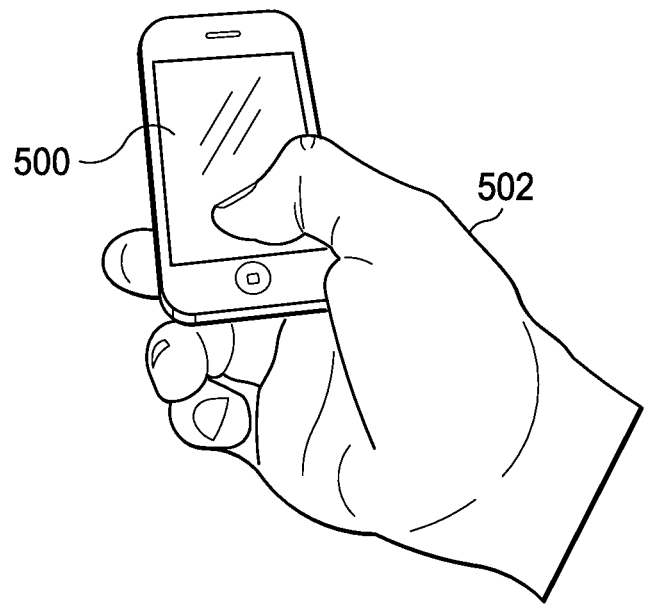
FIGS. 5A-5B are diagrams illustrating an orientation of an apparatus according to at least one example embodiment.
Figure 5B:
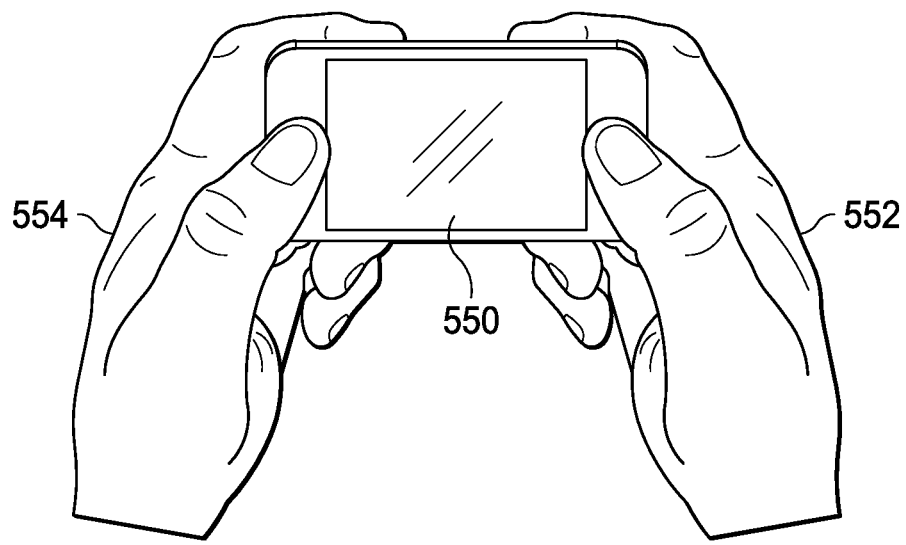

FIGS. 5A-5B are diagrams illustrating an orientation of an apparatus according to at least one example embodiment. The examples of FIGS. 5A-5B are merely examples of an orientation of an apparatus, and do not limit the scope of the claims. For example, angle of the apparatus with respect to the user may vary, hand position of user may vary, and/or the like.

In at least one example embodiment, an apparatus may provide information indicating orientation of a display to the user. For example, the apparatus may utilize accelerometer information indicating orientation of the apparatus with respect to gravity, touch sensor information indicating hand placement, and/or the like, to determine orientation of the display. In at least one example embodiment, an indication of display orientation may be received, for example from a sensor, from a program, and/or the like.

FIG. 5A is a diagram illustrating a portrait orientation of an apparatus 500 according to at least one example embodiment. It can be seen that the hand 502 holding apparatus 500 is positioned such that the user will likely utilize the thumb of hand 502 for performing touch input. It can also be seen that the thumb is near the bottom of the display.

FIG. 5B is a diagram illustrating a landscape orientation of an apparatus 550 according to at least one example embodiment. It can be seen that the left hand 554 holding apparatus 550 is positioned such that the user will likely utilize the thumb of hand 554 for performing touch input. It can also be seen that the thumb of the left hand 554 is near the left of the display. It can be seen that the right hand 552 holding the apparatus is positioned such that the user will likely utilize the thumb of right hand 552 for performing touch input. It can also be seen that the thumb of the right hand 552 is near the left of the display.

Figure 6A:
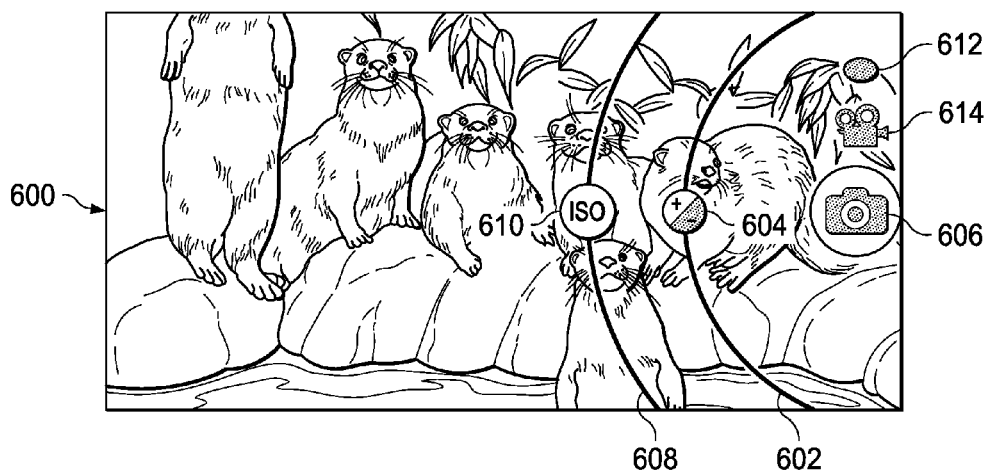
FIGS. 6A-6B are diagrams illustrating orientation of a curvilinear slider interface element according to at least one example embodiment.
Figure 6B:
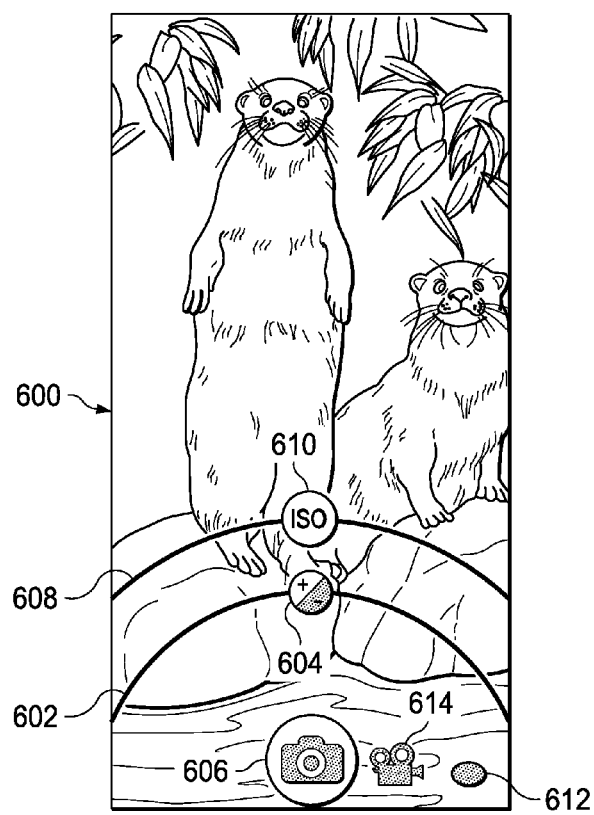

FIGS. 6A-6B are diagrams illustrating orientation of a curvilinear slider interface element according to at least one example embodiment. The examples of FIGS. 6A-6B are merely examples of orientation of a curvilinear slider interface element, and do not limit the scope of the claims. For example, eccentricity of the curvilinear slider interface element may vary, position of the curvilinear slider interface element may vary, and/or the like.

The examples of FIGS. 6A-6B illustrate operation actuator 606, operation indicators 612 and 614, curvilinear slider interface elements 602 and 608, and selection points 604 and 610 in relation to display region 600. In the example of FIGS. 6A-6B, operation actuator 606 comprises an operation representation. In the example of FIGS. 6A-6B, selection points 604 and 610 comprise setting indicators representing respective settings with which selection points 604 and 610 are associated.

FIG. 6A is a diagram illustrating a landscape orientation according to at least one example embodiment. In the example of FIG. 6A, it can be seen that operation indicators 612 and 614, the operation representation of operation actuator 606, and the setting indicators of selection points 604 and 610 are oriented to align with the orientation in an upright vertical manner.

FIG. 6B is a diagram illustrating a portrait orientation according to at least one example embodiment. In the example of FIG. 6B, it can be seen that operation indicators 612 and 614, the operation representation of operation actuator 606, and the setting indicators of selection points 604 and 610 are oriented to align with the orientation in an upright vertical manner.

The example of FIG. 6B may relate to the display associated with FIG. 6A being rotated counter-clockwise by 90 degrees. In FIG. 6B, it can be seen that the positions of curvilinear slider interface elements 602 and 608 have been retained. In FIG. 6B, it can be seen that the positions of selection points 604 and 610 have been retained. In FIG. 6B, it can be seen that the position of operation actuator 606 has been retained. In FIG. 6B, it can be seen that the positions of operation indicators 612 and 614 have been retained.

In FIG. 6B, it can be seen that the orientations of the setting indicators of selection points 604 and 610 have been changed in correspondence with the display orientation change. In FIG. 6B, it can be seen that the orientation of the operation representation of operation actuator 606 has been changed in correspondence with the display orientation change. In FIG. 6B, it can be seen that the orientations of operation indicators 612 and 614 have been changed in correspondence with the display orientation change.

Even though not shown in FIGS. 6A-6B, in at least one example embodiment, non-selected value information retains orientation such that the orientation of non-selected value information does not change in correspondence with the display orientation change.

Without limiting the claims in any way, at least one technical effect associated with retaining position of curvilinear slider interface element in differing orientation relates to retaining a position that is convenient for thumb access. For example, as seen in FIG. 5A, in portrait orientation, positioning the curvilinear slider interface elements such that the concavity region is proximate to the bottom of the display region provides for easy thumb control. The proximity of the concavity region of the curvilinear slider interface elements to the bottom of the display region in portrait mode may provide proximity to the base of the thumb, which may allow for simplified thumb movement along the contour of the curvilinear slider interface element. Similarly, as seen in FIG. 5B, in landscape orientation, positioning the curvilinear slider interface elements such that the concavity region is proximate to the side of the display region provides for easy thumb control. The proximity of the concavity region of the curvilinear slider interface elements to the side of the display region in landscape mode may provide proximity to the base of the thumb, which may allow for simplified thumb movement along the contour of the curvilinear slider interface element.

FIGS. 7A-7E are diagrams illustrating non-adjustment movement of a curvilinear slider interface element according to at least one example embodiment. The examples of FIGS. 7A-7E are merely examples of non-adjustment movement of a curvilinear slider interface element, and do not limit the scope of the claims. For example, eccentricity of the curvilinear slider interface element may vary, position of the curvilinear slider interface element may vary, and/or the like.

In at least one example embodiment, movement of a curvilinear slider interface element that is independent of adjustment of the curvilinear slider interface element is referred to as non-adjustment movement. Under some circumstances, a user may desire to move a curvilinear slider interface element in relation to a display region. For example, a user may desire to move a selection point that obscures subject matter overlaid by the selection point independently of adjustment of the selection point. In such an example, it may be beneficial to allow the user to perform an input to cause non-adjustment movement of the curvilinear slider interface element. In at least one example embodiment, an input associated with causation of a non-adjustment movement of a curvilinear slider interface element is referred to as an input indicative of a non-adjustment movement of the curvilinear slider interface element.

In at least one example embodiment, a user may perform a drag input comprising a movement input that relates to an orthogonal direction from the curvilinear slider interface element. The movement input may relate to an orthogonal direction from the curvilinear slider interface element by relating to an orthogonal direction from a tangent of the curvilinear slider interface element. In at least one example embodiment, such an input is an input indicative of a non-adjustment movement of the curvilinear slider interface element. Without limiting the claims in any way, at least one technical effect associated with the movement input being related to an orthogonal direction from the curvilinear slider interface element may be that such a movement input is more likely to be independent of adjustment movement of the curvilinear slider interface element.

In at least one example embodiment, a user may perform a drag input comprising a movement input associated with a curvilinear slider interface element that relates to a direction towards or away from an operation actuator. The movement input may relate to movement along an axis that is parallel to a boundary of a display region, for example a boundary of a display region that is orthogonal to a boundary of a display region that is proximate to the operation actuator. In at least one example embodiment, such an input is an input indicative of a non-adjustment movement of the curvilinear slider interface element. Without limiting the claims in any way, at least one technical effect associated with the movement input relating to a direction towards or away from an operation actuator may be that such a movement input is more likely to be independent of adjustment movement of the curvilinear slider interface element.

In at least one example embodiment, the drag input may comprise a contact input having a position that correlates with a position of a selection point associated with the curvilinear slider interface element.

In at least one example embodiment, an apparatus may evaluate an input to determine if a comprised movement input is an input indicative of a non-adjustment movement of the curvilinear slider interface element. In such an embodiment, causation of movement of the curvilinear slider interface element may be based, at least in part, on the determination that the comprised movement input is input indicative of a non-adjustment movement of the curvilinear slider interface element. For example, causation of non-adjustment movement of the curvilinear slider interface element may be predicated by the determination that the comprised movement input is input indicative of a non-adjustment movement of the curvilinear slider interface element. In at least one example embodiment, causation of non-adjustment movement of the curvilinear slider interface element may further be based, at least in part, on the determination that a comprised contact input correlates with a selection point associated with the curvilinear slider interface element. For example, causation of non-adjustment movement of the curvilinear slider interface element may further be predicated by the determination that the comprised contact input correlates with a selection point associated with the curvilinear slider interface element.

In at least one example embodiment, non-adjustment movement of the curvilinear slider interface element towards its concavity region is referred to as curvilinear contraction. In at least one example embodiment, non-adjustment movement of the curvilinear slider interface element away from its concavity region is referred to as curvilinear expansion.

Figure 7A:
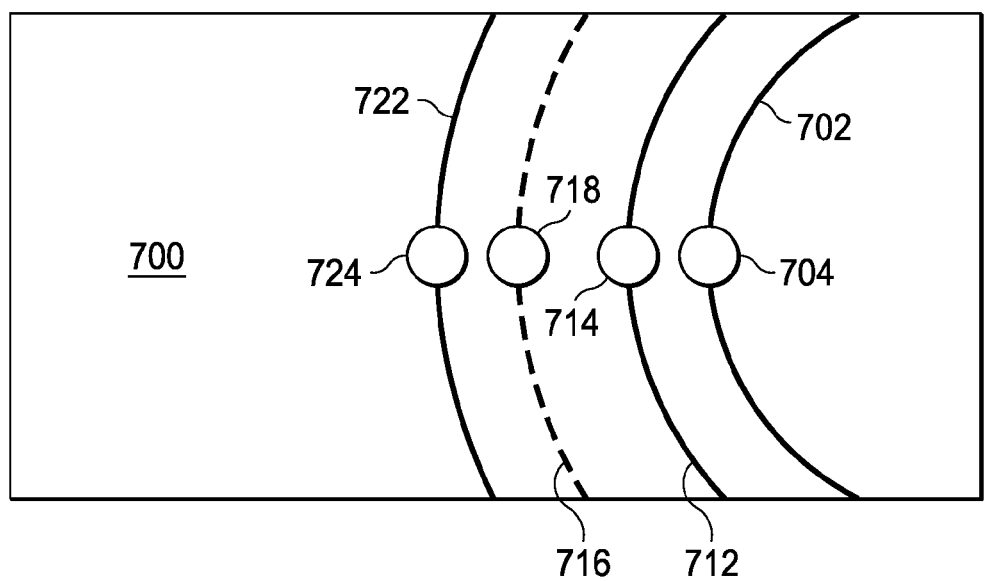
FIGS. 7A-7E are diagrams illustrating non-adjustment movement of a curvilinear slider interface element according to at least one example embodiment.

FIG. 7A is a diagram illustrating non-adjustment movement of a curvilinear slider interface element in relation to display area 700, according to at least one example embodiment. In the example of FIG. 7A, curvilinear slider interface elements 702 and 722, and their associated selection points, 704 and 724 are not moved. In the example of FIG. 7A, demarcation 716 relates to a position of curvilinear slider interface element 712 prior to non-adjustment movement, and demarcation 718 relates to a position of selection point 714 prior to non-adjustment movement. In at least one example embodiment, non-adjustment movement of a curvilinear slider interface element is performed absent non-adjustment movement of another curvilinear slider interface element. In the example of FIG. 7A, non-adjustment movement of curvilinear slider interface element 718 is performed absent non-adjustment movement of another curvilinear slider interface element. For example, non-adjustment movement of curvilinear slider interface element 718 may be characterized by an increase in distance between curvilinear slider interface element 718 and curvilinear slider interface element 722. In another example, non-adjustment movement of curvilinear slider interface element 718 may be characterized by a decrease in distance between curvilinear slider interface element 718 and curvilinear slider interface element 702. In the example of FIG. 7A, non-adjustment movement of curvilinear slider interface element 718 is performed such that curvilinear slider interface elements 702 and 722 to retain their position without regard for the non-adjustment movement of curvilinear slider interface element 712. In the example of FIG. 7A, the non-adjustment movement of curvilinear slider interface element may be characterized as a curvilinear contraction.

Figure 7B:
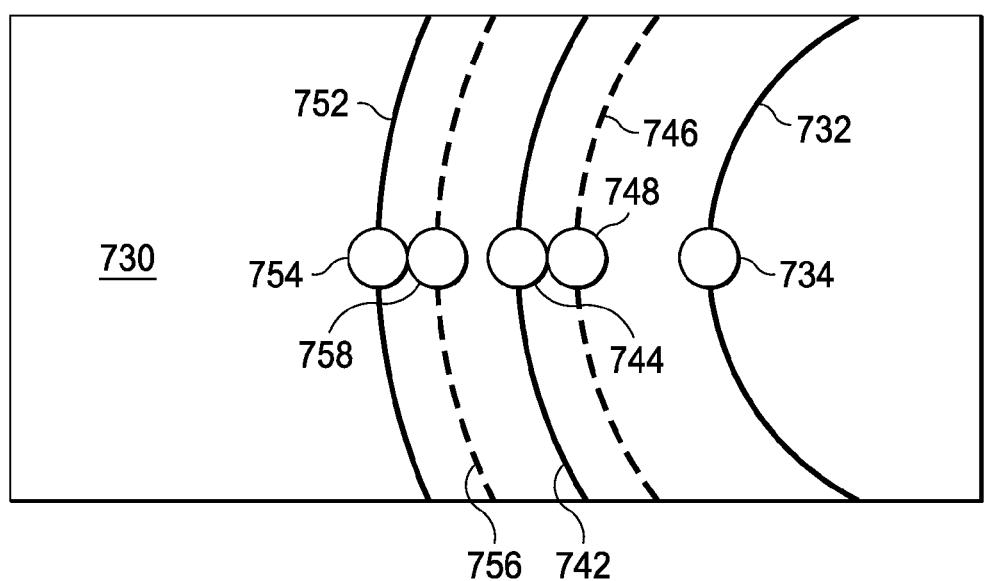

FIG. 7B is a diagram illustrating non-adjustment movement of a curvilinear slider interface element in relation to display area 700, according to at least one example embodiment. In the example of FIG. 7B, curvilinear slider interface element 732, and its associated selection point 734 is not moved. In the example of FIG. 7B, demarcation 746 relates to a position of curvilinear slider interface element 742 prior to non-adjustment movement, and demarcation 748 relates to a position of selection point 744 prior to non-adjustment movement. In the example of FIG. 7B, demarcation 756 relates to a position of curvilinear slider interface element 752 prior to non-adjustment movement, and demarcation 758 relates to a position of selection point 754 prior to non-adjustment movement. In at least one example embodiment, non-adjustment movement of a curvilinear slider interface element causes non-adjustment movement of another curvilinear slider interface element in correspondence with the non-adjustment movement of the curvilinear slider interface element. In at least one example embodiment, non-adjustment movement of another curvilinear slider interface element in correspondence with the non-adjustment movement of the curvilinear slider interface element relates to the other curvilinear slider interface element being moved such that a distance between the curvilinear slider interface element and the other curvilinear slider interface element is retained. In the example of FIG. 7B, non-adjustment movement of curvilinear slider interface element 742 causes non-adjustment movement of curvilinear slider interface element 752 in correspondence with the non-adjustment movement of the curvilinear slider interface element.

Figure 7C:
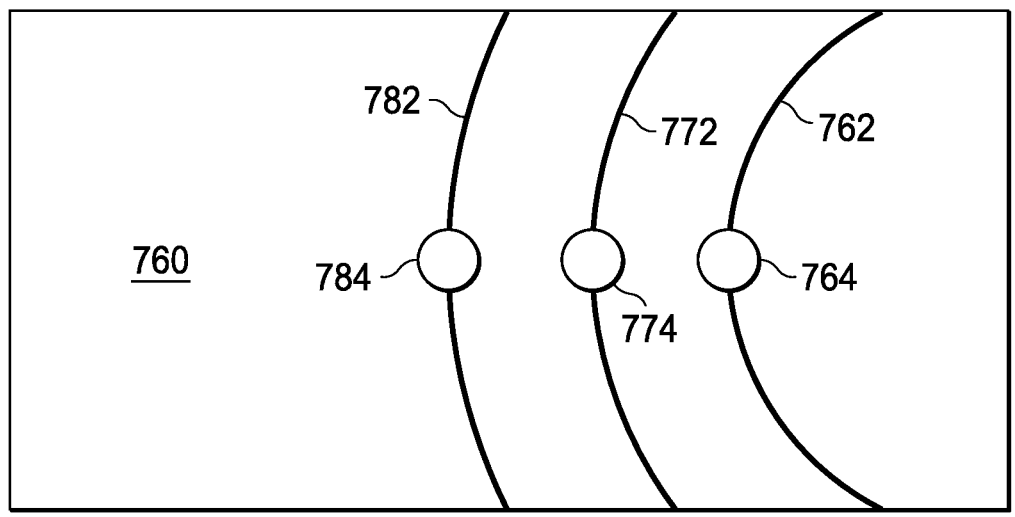
Figure 7D:
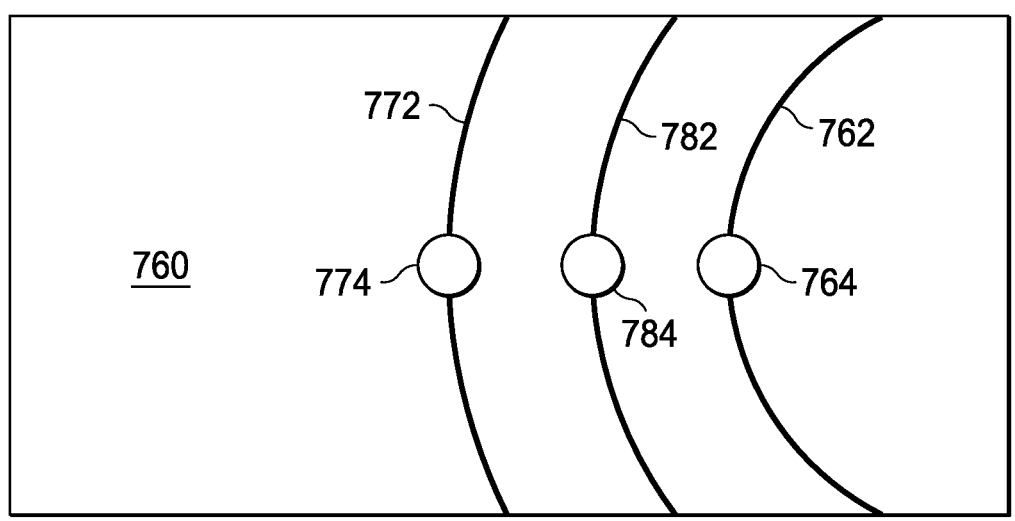

FIGS. 7C and 7D are a diagrams illustrating juxtaposition of a curvilinear slider interface element with another curvilinear slider interface element in relation to display area 760, according to at least one example embodiment. In at least one example embodiment a user may desire to have one curvilinear slider interface element exchange position with another curvilinear slider interface element. In at least one example embodiment, a user may invoke such juxtaposition of curvilinear slider interface elements by way of a drag input associated with non-adjustment movement of a curvilinear slider interface element, where the drag input comprises a release input the correlates with another curvilinear slider interface element. FIG. 7C illustrates curvilinear slider interface elements 762, 772, and 782 and their respective selection points 764, 774, and 784. FIG. 7D illustrates curvilinear slider interface elements 762, 772, and 782 and their respective selection points 764, 774, and 784 after performance of a non-adjustment movement that comprises juxtaposition of curvilinear slider interface elements 772 and 782.

Figure 7E:
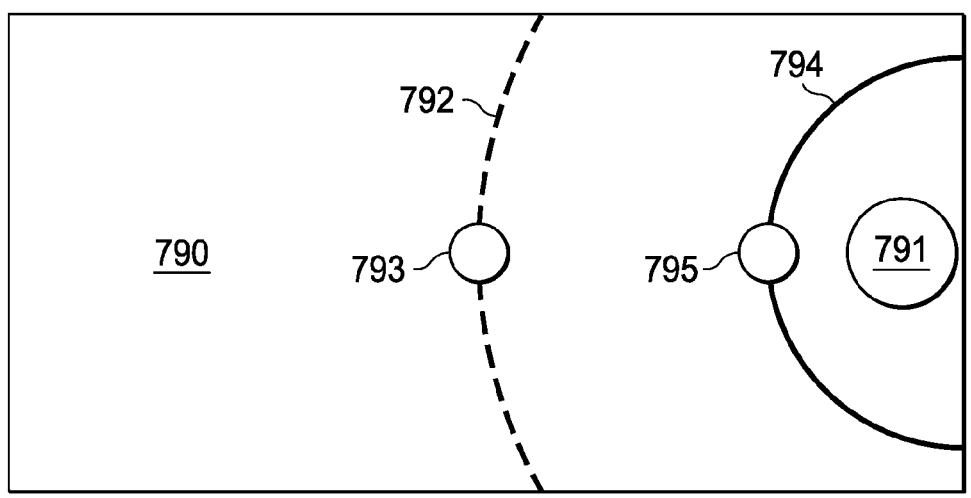

FIG. 7E is a diagram illustrating non-adjustment movement of a curvilinear slider interface element in relation to display area 790, according to at least one example embodiment. In the example of FIG. 7E, demarcation 792 relates to a position of curvilinear slider interface element 794 prior to non-adjustment movement, and demarcation 784 relates to a position of selection point 795 prior to non-adjustment movement. In the example of FIG. 7E, the non-adjustment movement of curvilinear slider interface element may be characterized as a curvilinear contraction.

When a user performs input that causes non-adjustment movement of a curvilinear slider interface element from a first position to a second position, it may be desirable to position the curvilinear slider interface element back to the first position when the user terminates the input. For example, the user may desire to temporarily move the curvilinear slider interface element during adjustment to avoid the curvilinear slider interface element obscuring overlaid visual information. Under such circumstances, the user may desire the movement to only relate to the time period that the user is performing the adjustment so that the arrangement of a set of curvilinear slider interface elements is not effected beyond the time of the input.

In at least one example embodiment, the movement described regarding FIG. 7E may be related to the adjustment described regarding FIGS. 3I-J.

FIGS. 8A-8F are diagrams illustrating a curvilinear slider interface element according to at least one example embodiment. The examples of FIGS. 8A-8F are merely examples of a curvilinear slider interface element, and do not limit the scope of the claims. For example, eccentricity of the curvilinear slider interface element may vary, position of the curvilinear slider interface element may vary, and/or the like.

In some circumstances, a user may desire to flip a curvilinear slider interface element from one side of a display region to an opposite side of the display region. For example, the user may desire to move the concavity region of the curvilinear slider interface element from one side of the display region to the opposite side of the display region. For example, a user may desire such non-adjustment movement in a landscape orientation so that the user may control the setting with a thumb on the opposite side of the apparatus.

Figure 8A:
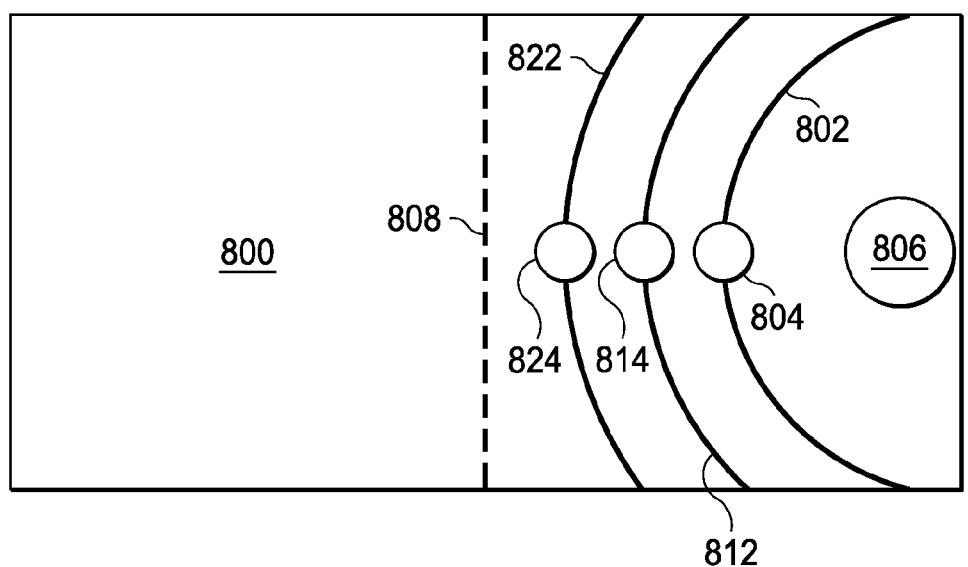
FIGS. 8A-8F are diagrams illustrating a curvilinear slider interface element according to at least one example embodiment.
Figure 8B:
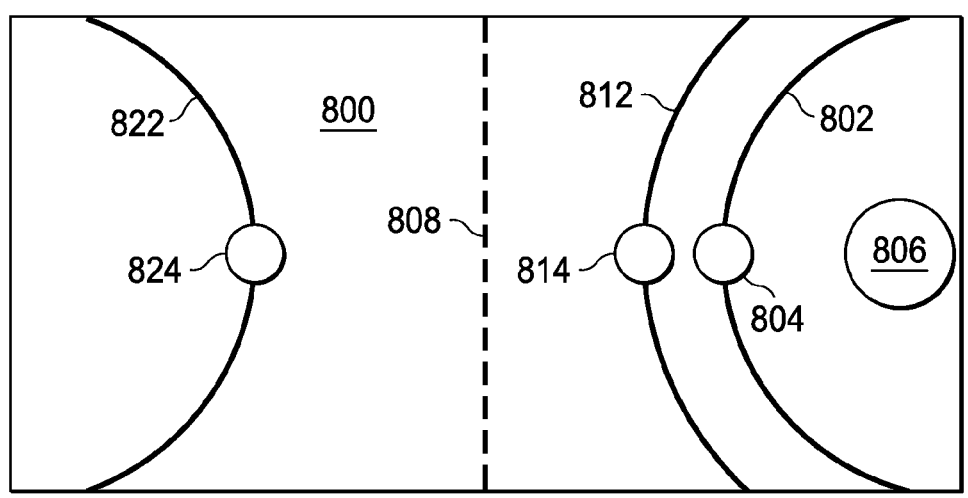

FIGS. 8A and 8B are a diagrams illustrating non-adjustment movement of a curvilinear slider interface element in relation to display area 800 according to at least one example embodiment.

In at least one example embodiment, a user may cause non-adjustment movement that relates to placement of a curvilinear slider interface element being positioned at an opposite side of a display region by way of performing a drag input associated with non-adjustment movement of the curvilinear slider interface element such that a movement input comprised by the drag input crosses a positional threshold. In at least one example embodiment, the positional threshold relates to a delineation that is parallel to the side of the display region. In at least one example embodiment, the delineation relates to a midpoint between the side of the display region and the opposite side of the display region.

The example of FIGS. 8A and 8B illustrates curvilinear slider interface elements 802, 812, and 822, selection points 804, 814, 824, operation actuator 806, and positional threshold 808. FIG. 8B illustrates the curvilinear slider interface elements 802, 812, and 822, selection points 804, 814, 824, operation actuator 806, and positional threshold 808 of FIG. 8A after performance of placement of curvilinear slider interface element 822 being positioned at the opposite side of display region 800. In the example of FIGS. 8A and 8B, the non-adjustment movement associated with placement of curvilinear slider interface element 822 may be based, at least in part, on receipt of the drag input associated with non-adjustment movement of curvilinear slider interface element comprising a movement input that crosses positional threshold 808. Placement of curvilinear slider interface element 822 may be characterized as placement at a position that is symmetrical to the position of curvilinear slider interface element 822 relative to the side of the display region as shown in FIG. 8A.

Figure 8C:
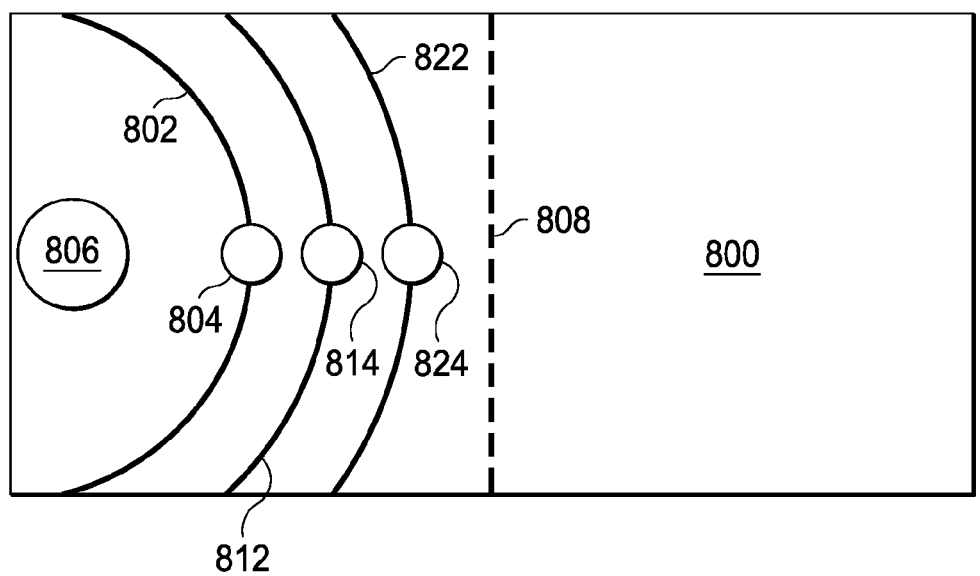

FIG. 8C is a diagram illustrating non-adjustment movement of a curvilinear slider interface element an operation actuator in relation to display area 800, according to at least one example embodiment.

In some circumstances, a user may desire to flip multiple curvilinear slider interface elements and an operation actuator from one side of a display region to an opposite side of the display region. For example, the user may desire to move the concavity region of multiple curvilinear slider interface elements from one side of the display region to the opposite side of the display region. For example, a user may desire such non-adjustment movement in a landscape orientation so that the user may control the settings with a thumb on the opposite side of the apparatus.

In at least one example embodiment, a user may cause non-adjustment movement that relates to placement of multiple curvilinear slider interface elements and an operation actuator being positioned at an opposite side of a display region by way of performing a drag input associated with movement of the operation actuator such that a movement input comprised by the drag input crosses a positional threshold. In at least one example embodiment, a drag input associated with an operation actuator relates to a drag input that comprises a contact input that corresponds with the operation actuator. In at least one example embodiment, the positional threshold relates to a delineation that is parallel to the side of the display region. In at least one example embodiment, the delineation relates to a midpoint between the side of the display region and the opposite side of the display region. Without limiting the claims in any way, at least one technical effect associated with such non-adjustment movement of curvilinear slider interface elements and an operation actuator based, at least in part, on such a drag input associated with an operation actuator may be that such non-adjustment movement may be intuitive to the user based, at least in part, on the operation actuator being represented as a visual core of the curvilinear slider interface elements. Such a representation provides the perception of dependency of the curvilinear slider interface elements upon the operation actuator. Therefore, based, at least, on this perception, it may be intuitive for a user to cause non-adjustment movement of the operation actuator and the curvilinear slider interface elements based, at least in part, on a drag input associated with movement of the operation actuator.

The example of FIGS. 8A and 8C illustrates curvilinear slider interface elements 802, 812, and 822, selection points 804, 814, 824, operation actuator 806, and positional threshold 808. FIG. 8C illustrates the curvilinear slider interface elements 802, 812, and 822, selection points 804, 814, 824, operation actuator 806, and positional threshold 808 of FIG. 8A after performance of placement of curvilinear slider interface elements 802, 812, and 822, and operation actuator 806 being positioned at the opposite side of display region 800. In the example of FIGS. 8A and 8B, the non-adjustment movement associated with placement of curvilinear slider interface elements 802, 812, and 822, and operation actuator 806 may be based, at least in part, on receipt of the drag input associated with non-adjustment movement of operation actuator 806 comprising a movement input that crosses positional threshold 808. Placement of curvilinear slider interface elements 802, 812, and 822, and operation actuator 806 may be characterized as placement at a position that is symmetrical to the position of curvilinear slider interface elements 802, 812, and 822, and operation actuator 806 relative to the side of the display region as shown in FIG. 8A.

Figure 8D:
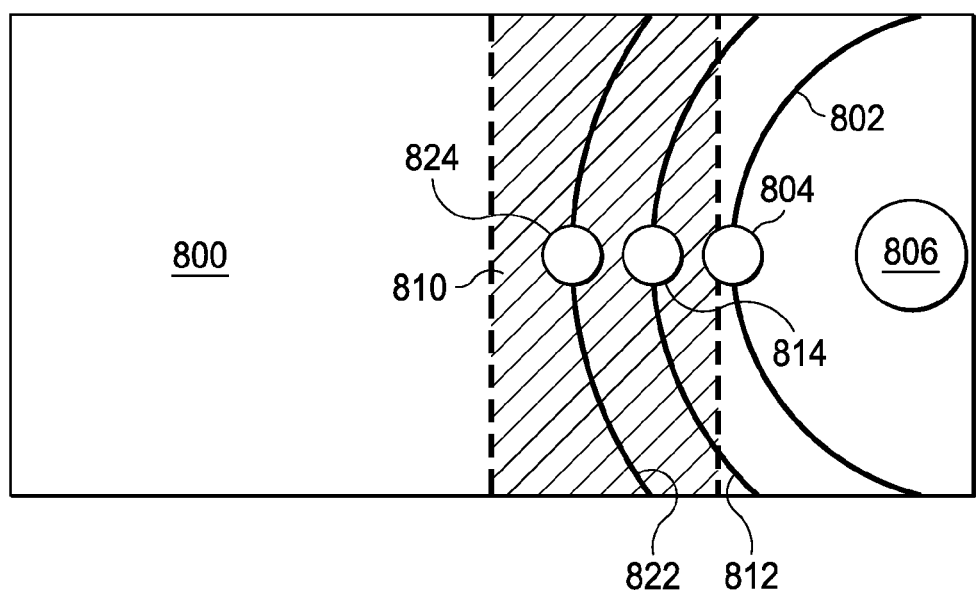

FIG. 8D is a diagram illustrating a curvilinear slider interface element according to at least one example embodiment. In at least one example embodiment, it may be desirable to cause all of the settings associated with an operation to be set to default values. In at least one example embodiment, a default value relates to a value of a setting that is based, at least in part, on a predetermined value unmodified by a user. For example, a user may cause a change to a setting that has adverse effects. In such an example, the user may desire to have the setting revert back to its default value. In such an example, the user may desire to set all of the settings to a default value by way of a quick input.

In at least one example embodiment, a user may cause all of the settings associated with an operation actuator by performing a drag input associated with movement of the operation actuator such that the drag input comprises a release input associated with a default setting zone. In at least one example embodiment, the default setting zone is confined to be within a half of a display region that comprises the operation actuator. In at least one example embodiment, the apparatus may cause display of an indication of the default setting zone. An indication of the default setting zone may relate to a demarcation that allows a user to identify the default setting zone.

In the example of FIG. 8D a user may perform a drag input, associated with operation actuator 806, having a release input within default setting zone 810 to cause settings associated with curvilinear slider interface elements 802, 812, and 822 to be set to default values.

It may be desirable for a user to be able to hide curvilinear slider interface elements associated with an operation actuator. For example, a user may desire to hide the curvilinear slider interface element to reduce obscurance of information overlain by the curvilinear slider interface element. In such an example, it may be desirable for the user to be able to perform a simple input to hide and/or unhide the curvilinear slider interface elements.

In at least one example embodiment, a user may cause display of one or more curvilinear slider interface elements by performing an input, such as an input comprising a movement input, in association with an operation actuator associated with the curvilinear slider interface element. Without limiting the scope of the claims in any way, at least one technical effect associated with such causation may be to allow the user to easily remember how to invoke display of curvilinear slider interface elements associated with setting of the operation actuator. For example, the user may be aware of the relationship between the settings and the operation actuator. Such awareness may provide an instinctive recognition that performance of a movement input associated with the operation actuator may cause display of an interface for adjusting related settings. For example, the movement input may be perceived as a "shaking loose" or an "expansion" to the settings interface.

In at least one example embodiment, a movement input, for example a movement input comprised by a drag input, is associated with causation of display of one or more curvilinear slider interface elements associated with the operation actuator. In at least one example embodiment, causation of display of one or more curvilinear slider interface elements is based, at least in part, on a distance of the movement input being beyond a distance threshold. A distance threshold may be a distance beyond which movement input associated with an operation actuator is associated with invocation of displaying one or more curvilinear slider interface elements. In at least one example embodiment, the distance of the movement input being within the distance threshold is associated with abstinence from displaying one or more curvilinear slider interface elements.

In at least one example embodiment, causation of display of one or more curvilinear slider interface elements is based, at least in part, on a release input associated with the movement input being within a setting adjustment region. A setting adjustment region may be a region within which release input associated with an operation actuator is associated with invocation of displaying one or more curvilinear slider interface elements. In at least one example embodiment, the release input associated with the movement input being beyond the setting adjustment region is associated with abstinence from displaying one or more curvilinear slider interface elements.

Figure 8E:
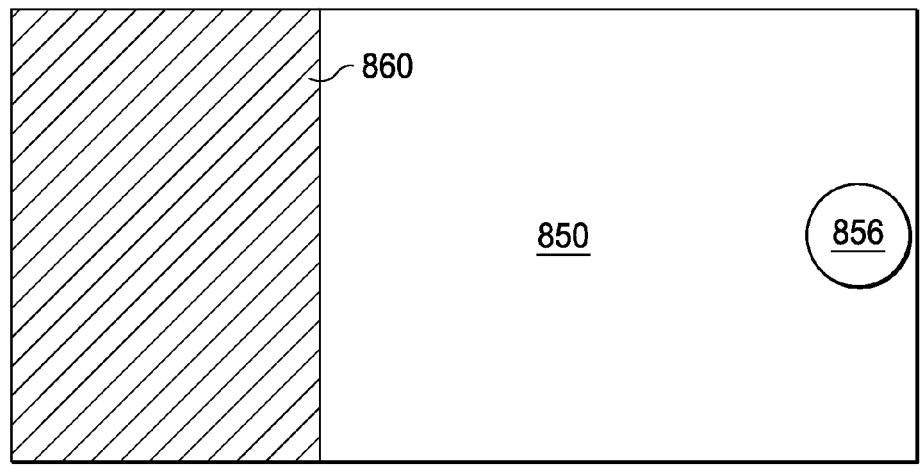

FIG. 8E is a diagram illustrating operation actuator 856 and setting adjustment region 860 in relation to display region 850, according to at least one example embodiment. In at least one example embodiment, a user may perform a drag input associated with operation actuator 856 that comprises a release input within setting adjustment region 860 to cause display of one or more curvilinear slider interface elements. For example, a user may perform a drag input associated with operation actuator 856 that comprises a release input within setting adjustment region 860 to cause transition to the example of FIG. 8F.

In at least one example embodiment a user may perform in input associated with a setting adjustment termination region to cause termination of display of one or more curvilinear slider interface elements. For example, a user may perform an input comprising a release input within a setting adjustment termination region comprising a contact input within a setting adjustment termination region, and/or the like. For example, the input may be related to a tap input. In at least one embodiment, a tap input relates to an input comprising a contact input and a release input. A tap input may lack a movement input.

It may be desirable to reposition an operation actuator during a time when associated curvilinear slider interface elements are being displayed. For example a user may be able to better comprehend the relationship between the operation actuator and the curvilinear slider interface elements based on the repositioning. In at least one example embodiment, the operation actuator is repositioned to a position that is closer to a position of the curvilinear slider interface elements when the curvilinear slider interface elements are caused to be displayed. Without limiting the scope of the claims in any way, at least one technical effect of such positioning may be to provide an indication that a movement input may be associated with causing display of the curvilinear slider interface elements. For example a user may identify the repositioning of the operation actuator with a movement input.

Figure 8F:
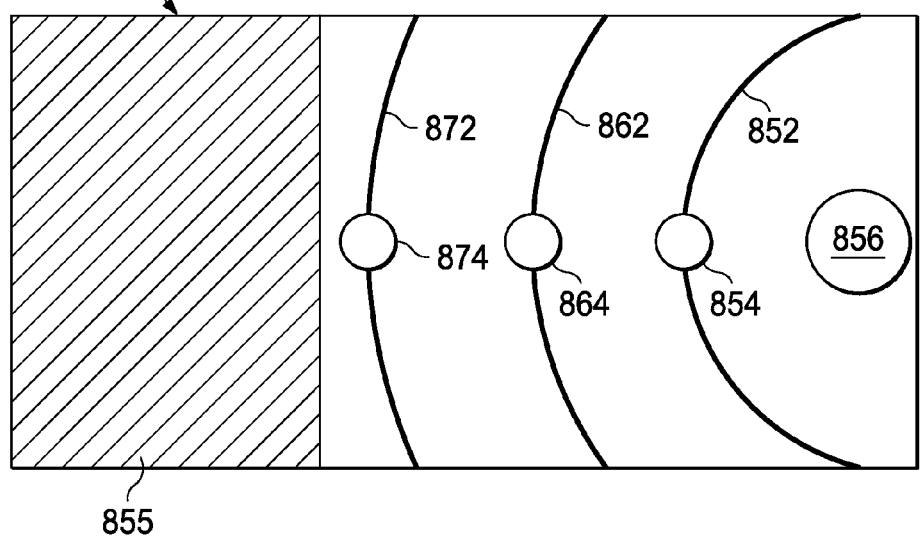

FIG. 8F is a diagram illustrating curvilinear slider interface elements 852, 862, and 872, selection points 854, 864, 874, operation actuator 856, and setting adjustment termination region 855 in relation to display region 850, according to at least one example embodiment. In at least one example embodiment, a user may perform an input associated setting adjustment termination region 855 to cause termination of display of one or more curvilinear slider interface elements. For example, a user may perform an input associated setting adjustment termination region 855 to cause transition to the example of FIG. 8E. In at least one example embodiment, position of 856 is further from the right side of display region 850 in the example of FIG. 8F that in the example of FIG. 8E.

FIGS. 9A-9D are diagrams illustrating a slider interface element according to at least one example embodiment. The examples of FIGS. 9A-9D are merely examples of a slider interface element, and do not limit the scope of the claims. For example, eccentricity of region location with respect to a slider interface element may vary, representation of information associated with a slider interface element may vary, and/or the like.

In at least one example embodiment, a setting may be capable of being adjusted based, at least in part, on more than one value position type. In at least one example embodiment a value position type relates to a manner in which value positions are distributed. For example, a value position type may be conducive to a continuous distribution of value positions and another value position type may be conducive to an indexed distribution of value positions. For example, a large range of values relative to the increment between values, such as a manual focus setting, may be conducive to a continuous distribution of value positions. In another example, a discrete set of enumerated values may be conducive to an indexed distribution of value positions.

In at least one example embodiment, a continuous distribution of value positions relates to a distribution of value positions such that separation between adjacent value positions is undesirable to perceive. For example, separation between adjacent value positions may be similar to a perceived discontinuity associated with graphics processing. In at least one example embodiment, a continuous distribution is a distribution of value positions relates to a distribution of value positions such that separation between adjacent value positions is less than 95% just-noticeable difference based, at least in part, on the length of a slider interface element associated with the setting.

In at least one example embodiment, an indexed distribution of value positions relates to a distribution of value positions such that separation between adjacent value positions such that separation between adjacent value positions is desirable to perceive. For example, separation between adjacent value positions may be greater than 10 times larger than a span associated with a value position.

In at least one example embodiment, it may be desirable to provide continuous value positions and indexed value positions for the same setting. For example, a focus setting may have a range of values associated with manual focus adjustment are conducive to continuous distribution. In such an example, a focus setting may have discrete values associated with designation of values that are not conducive to continuous distribution, such as infinity focus, associated with operations for controlling focus, such as automatic focus, or hyper focus. In at least one example embodiment, a slider interface element comprises a continuous region and an indexed region. In at least one example embodiment, a continuous region relates to a region associated with a continuous value position distribution. In at least one example embodiment, an indexed region relates to a region associated with an indexed value position distribution. In at least one example embodiment, overlap of a continuous region and an indexed region is precluded. In at least one example embodiment, a value position within an indexed region is referred to as an index.

In at least one example embodiment, it may be desirable to allow the user to move a selection point relative to a slider interface element in a continuous manner without regard for correlation between a value position and the selection point. In at least one example embodiment, it may be desirable to automatically move a selection point relative to a slider interface element in circumstances where a value position fails to align with the selection point, after an input associated with adjustment of the setting is performed. In at least one example embodiment, this adjustment movement based, at least in part, on lack of correlation between a value position and a selection point may be referred to as snap-to movement.

In at least one example embodiment, a slider interface element comprises at least one demarcation signifying at least one index of the indexed region. A demarcation may be a delineation indicating the index, a value indicator, such as indicator 230 of FIG. 2B.

Figure 9A:
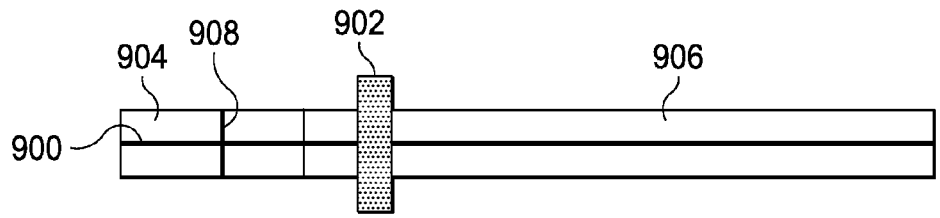
FIGS. 9A-9D are diagrams illustrating a slider interface element according to at least one example embodiment.

FIG. 9A is a diagram illustrating a slider interface element according to at least one example embodiment. In the example of FIG. 9A, slider interface element 900 comprises indexed region 904 and continuous region 906, with selection point 902 being within continuous region 906. In the example of FIG. 9A, indexed region 904 comprises demarcation 908, which signifies an index within indexed region 904.

Figure 9B:
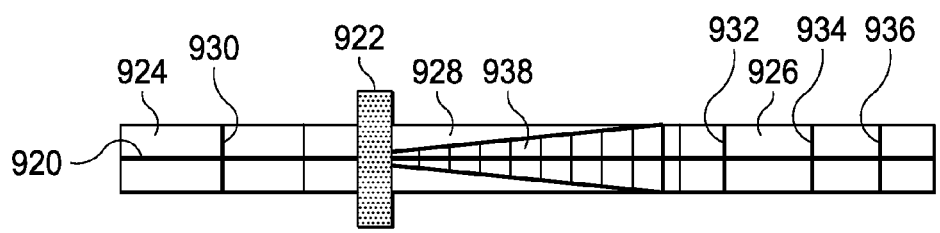

FIG. 9B is a diagram illustrating a slider interface element according to at least one example embodiment. In at least one example embodiment, a slider interface element may comprise an indication of a continuous region. The indication may be a variation in color, a label, text, an icon, a variation in representation of the slider interface element, and/or the like.

In the example of FIG. 9B, slider interface element 920 comprises indexed regions 924 and 926, and continuous region 928, with selection point 922 being within continuous region 928. In the example of FIG. 9B, indexed region 924 comprises demarcation 930, which signifies an index within indexed region 924. In the example of FIG. 9B, indexed region 926 comprises demarcations 932, 934, and 936, which signify respective indexes within indexed region 926. In the example of FIG. 9B, continuous region 928 comprises indication 938, which is an indication of continuous region 928. Even though the example of indication 938 indicates leftward ascending values, other examples of indicators may be absent any representation indicating a value within the continuous region.

Figure 9C:
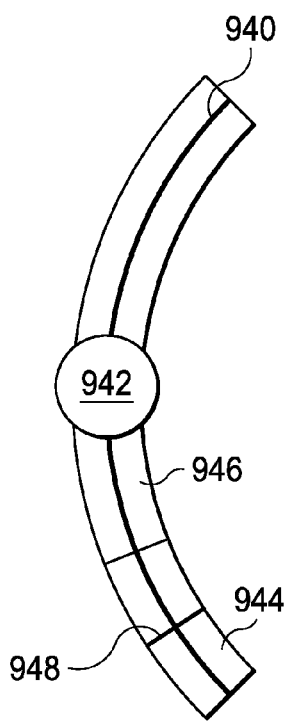

FIG. 9C is a diagram illustrating a curvilinear slider interface element according to at least one example embodiment. In the example of FIG. 9C, slider interface element 940 comprises indexed region 944 and continuous region 946, with selection point 942 being within continuous region 946. In the example of FIG. 9C, indexed region 944 comprises demarcation 948, which signifies an index within indexed region 944.

Figure 9D:
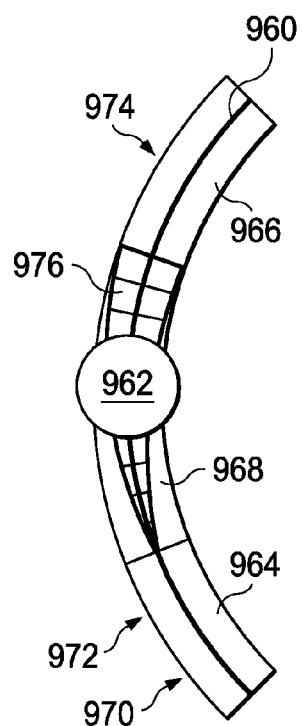

FIG. 9D is a diagram illustrating a curvilinear slider interface element according to at least one example embodiment. In the example of FIG. 9D, slider interface element 960 comprises indexed regions 964 and 966, and continuous region 968, with selection point 962 being within continuous region 968. In the example of FIG. 9D, indexed region 964 comprises demarcations 970 and 972, which signify respective indexes within indexed region 964. In the example of FIG. 9D, indexed region 966 comprises demarcation 974, which signifies an index within indexed region 966. In the example of FIG. 9D, continuous region 968 comprises indication 976, which is an indication of continuous region 968. Even though the example of indication 976 indicates upward ascending values, other examples of indicators may be absent any representation indicating a value within the continuous region.

Figures 10, 11:
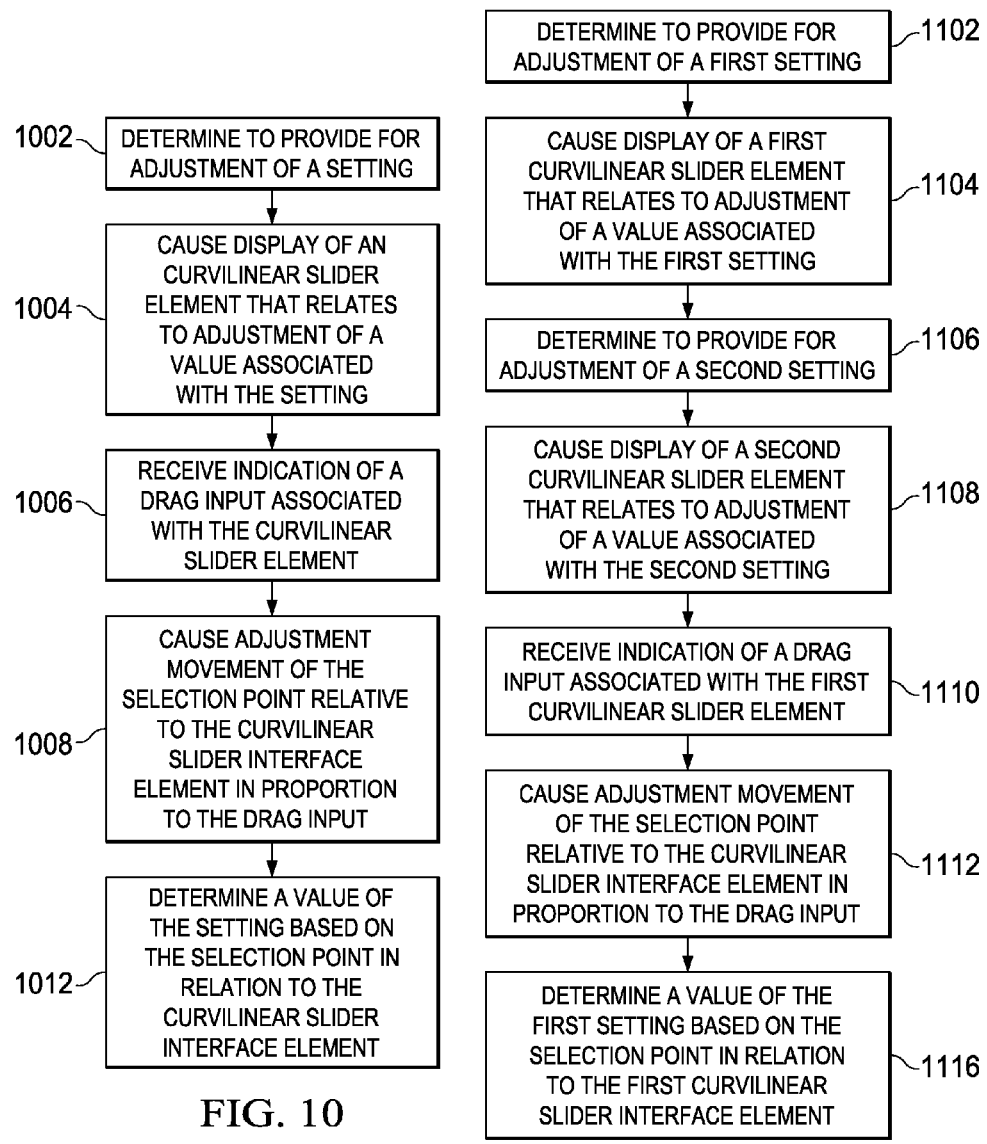
FIG. 10 is a flow diagram illustrating activities associated with determining a setting value by way of a curvilinear slider interface element according to at least one example embodiment.
FIG. 11 is a flow diagram illustrating activities associated with determining a setting value by way of a curvilinear slider interface element according to at least one example embodiment.

FIG. 10 is a flow diagram illustrating activities associated with determining a setting value by way of a curvilinear slider interface element according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus determines to provide for adjustment of a setting. The determination to adjust the setting may be similar as described regarding FIGS. 2A-2I and FIGS. 4A-4B.

At block 1004, the apparatus causes display of a curvilinear slider interface element that relates to adjustment of a value associated with the setting. The curvilinear slider interface element, the value, and the setting may be similar as described regarding FIGS. 2A-2I, FIGS. 3A-3J, FIGS. 4A-4B, FIGS. 6A-6B, FIGS. 7A-7E, FIGS. 8A-8F, and FIGS. 9C-9D.

At block 1006, the apparatus receives an indication of a drag input associated with the curvilinear slider interface element. The indication of the drag input may be similar as described regarding FIGS. 2A-2I.

At block 1008, the apparatus causes adjustment movement of the selection point relative to the curvilinear slider interface element in proportion to the drag input. The adjustment movement and proportion to the drag input may be similar as described regarding FIGS. 2A-2I.

At block 1012, the apparatus determines a value of the setting based, at least in part, on the position of the first selection point relative to curvilinear slider interface element. The determination and the value may be similar as described regarding FIGS. 2A-2I.

FIG. 11 is a flow diagram illustrating activities associated with determining a setting value by way of a curvilinear slider interface element according to at least one example embodiment. In at least one example embodiment, there is a set of operations that corresponds the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines to provide for adjustment of a first setting similarly as described regarding block 1002 of FIG. 10.

At block 1104, the apparatus causes display of a first curvilinear slider interface element that relates to adjustment of a value associated with the first setting similarly as described regarding block 1004 of FIG. 10.

At block 1106, the apparatus determines to provide for adjustment of a second setting similarly as described regarding block 1002 of FIG. 10.

At block 1108, the apparatus causes display of a second curvilinear slider interface element that relates to adjustment of a second value associated with the first setting similarly as described regarding block 1004 of FIG. 10.

At block 1110, the apparatus receives an indication of a drag input associated with the first curvilinear slider interface element similarly as described regarding block 1006 of FIG. 10.

At block 1112, the apparatus causes adjustment movement of the selection point relative to the curvilinear slider interface element in proportion to the drag input similarly as described regarding block 1008 of FIG. 10.

At block 1116, the apparatus determines a value of the first setting based, at least in part, on the position of the first selection point relative to the first curvilinear slider interface element similarly as described regarding block 1012 of FIG. 10.

FIG. 12 is a flow diagram illustrating activities associated with determining a setting value by way of a curvilinear slider interface element according to at least one example embodiment. In at least one example embodiment, there is a set of operations that corresponds the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus causes display of a setting designation representation indicating that a setting may be designated for adjustment. The setting designation representation and the indication that the setting may be designated for adjustment may be similar as described regarding FIGS. 4A-4B.

At block 1204, the apparatus receives an indication of an input indicative of selection of the setting designation representation. The indication and the input indicative of selection may be similar as described regarding FIGS. 4A-4B.

At block 1206, the apparatus causes display of the curvilinear slider interface element that relates to adjustment of a value associated with the setting similarly as described regarding block 1004 of FIG. 10.

At block 1208, the apparatus similarly as described regarding block 1006 of FIG. 10.

At block 1210, the apparatus similarly as described regarding block 1008 of FIG. 10.

At block 1214, the apparatus determines a value of the setting based, at least in part, on the position of the first selection point relative to curvilinear slider interface element similarly as described regarding block 1012 of FIG. 10.

FIG. 13 is a flow diagram illustrating activities associated with change in orientation in relation to a curvilinear slider interface element according to at least one example embodiment. In at least one example embodiment, there is a set of operations that corresponds the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus determines to provide for adjustment of a setting similarly as described regarding block 1002 of FIG. 10.

At block 1304, the apparatus causes display of a curvilinear slider interface element that relates to adjustment of a value associated with the setting similarly as described regarding block 1004 FIG. 10.

At block 1306, the apparatus receives an indication of a display orientation change. The indication and the display orientation change may be similar as described regarding FIGS. 5A-5B and FIGS. 6A-6B.

At block 1308, the apparatus retains position of the curvilinear sliding interface element. The retention of position may be similar as described regarding FIGS. 6A-6B.

At block 1310, the apparatus changes orientation of the representation of the selection point in correspondence with the display orientation change. The change of the representation and correspondence with the display orientation change may be similar as described regarding FIGS. 6A-6B.

FIG. 14 is a flow diagram illustrating activities associated with performance of an operation in relation to a curvilinear slider interface element according to at least one example embodiment. In at least one example embodiment, there is a set of operations that corresponds the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus determines to provide for adjustment of a setting similarly as described regarding block 1002 of FIG. 10.

At block 1404, the apparatus causes display of a curvilinear slider interface element that relates to adjustment of a value associated with the setting similarly as described regarding block 1004 of FIG. 10.

At block 1406, the apparatus causes display of an operation actuator relating to an operation associated with the setting. The operation actuator and the operation associated with the setting may be similar as describe regarding FIGS. 3A-3J, FIGS. 4A-4B, FIGS. 6A-6B, and FIGS. 8A-8F.

At block 1408, the apparatus receives an indication of an actuation input associated with the operation actuator. The actuation input may be similar as described regarding FIGS. 3A-3J.

At block 1410, the apparatus causes performance of the operation based, at least in part, on receipt of the indication, the operation being performed in accordance with the value of the setting. The performance of the operation, the basis on receipt of the indication, and the performance in accordance with value of the setting may be similar as described regarding FIGS. 3A-3J.

FIG. 15 is a flow diagram illustrating activities associated with non-adjustment movement of a curvilinear slider interface element according to at least one example embodiment. In at least one example embodiment, there is a set of operations that corresponds the activities of FIG. 15. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 15.

At block 1502, the apparatus causes display of a curvilinear slider interface element that relates to adjustment of a value associated with a setting similarly as described regarding block 1004 of FIG. 10.

At block 1504, the apparatus receives an indication of a drag input indicative of a non-adjustment movement of the curvilinear slider interface element. The indication of the drag input and indication of a non-adjustment movement of the curvilinear slider interface element may be similar as described regarding FIGS. 7A-7E and FIGS. 8A-8F.

At block 1506, the apparatus causes non-adjustment movement of the curvilinear slider interface element based, at least in part on the drag input. The non-adjustment movement and the basis on the drag input may be similar as described regarding FIGS. 7A-7E and FIGS. 8A-8F.

Figures 16, 17:
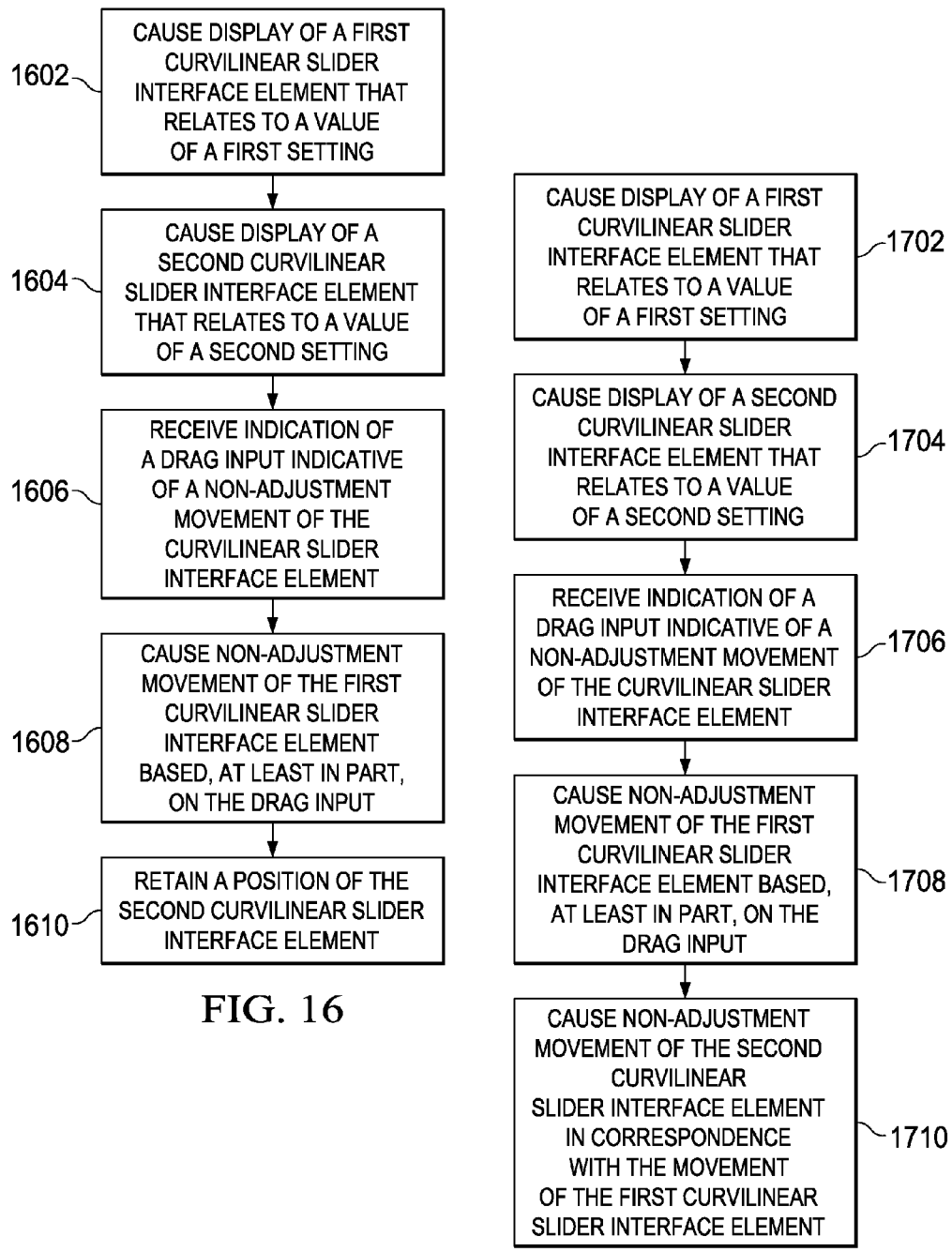
FIG. 16 is a flow diagram illustrating activities associated with non-adjustment movement of a curvilinear slider interface element according to at least one example embodiment.
FIG. 17 is a flow diagram illustrating activities associated with non-adjustment movement of a curvilinear slider interface element according to at least one example embodiment.

FIG. 16 is a flow diagram illustrating activities associated with non-adjustment movement of a curvilinear slider interface element according to at least one example embodiment. In at least one example embodiment, there is a set of operations that corresponds the activities of FIG. 16. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 16.

At block 1602, the apparatus causes display of a first curvilinear slider interface element that relates to adjustment of a value associated with a first setting similarly as described regarding block 1004 of FIG. 10.

At block 1604, the apparatus causes display of a second curvilinear slider interface element that relates to adjustment of a value associated with a second setting similarly as described regarding block 1004 of FIG. 10.

At block 1606, the apparatus receives an indication of a drag input indicative of a non-adjustment movement of the curvilinear slider interface element similarly as described regarding block 1504 of FIG. 15.

At block 1608, the apparatus causes non-adjustment movement of the first curvilinear slider interface element based, at least in part on the drag input similarly as described regarding block 1506 of FIG. 15.

At block 1610, the apparatus causes the second curvilinear slider interface element to retain a position without regard for the non-adjustment movement of the first curvilinear slider interface element. The retention of position, and absence of regard may be similar as described regarding FIGS. 7A-7E and FIGS. 8A-8F.

FIG. 17 is a flow diagram illustrating activities associated with movement of a curvilinear slider interface element according to at least one example embodiment. In at least one example embodiment, there is a set of operations that corresponds the activities of FIG. 17. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 17.

At block 1702, the apparatus causes display of a first curvilinear slider interface element that relates to adjustment of a value associated with a first setting similarly as described regarding block 1004 of FIG. 10.

At block 1704, the apparatus causes display of a second curvilinear slider interface element that relates to adjustment of a value associated with a second setting similarly as described regarding block 1004 of FIG. 10.

At block 1706, the apparatus receives an indication of a drag input indicative of a non-adjustment movement of the curvilinear slider interface element similarly as described regarding block 1504 of FIG. 15.

At block 1708, the apparatus causes non-adjustment movement of the first curvilinear slider interface element based, at least in part on the drag input similarly as described regarding block 1506 of FIG. 15.

At block 1710, the apparatus causes non-adjustment movement of the second curvilinear slider interface element in correspondence with the non-adjustment movement of the first curvilinear slider interface element. The causation of non-adjustment movement and correspondence with the non-adjustment movement may be similar as described regarding FIGS. 7A-7E.

FIG. 18 is a flow diagram illustrating activities associated with non-adjustment movement of a curvilinear slider interface element according to at least one example embodiment. In at least one example embodiment, there is a set of operations that corresponds the activities of FIG. 18. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 18.

At block 1802, the apparatus causes display of a first curvilinear slider interface element that relates to adjustment of a value associated with a first setting similarly as described regarding block 1004 of FIG. 10.

At block 1804, the apparatus causes display of a second curvilinear slider interface element that relates to adjustment of a value associated with a second setting similarly as described regarding block 1004 of FIG. 10.

At block 1806, the apparatus receives a drag input that intersects with the second curvilinear slider interface element. The intersection with the second curvilinear slider interface element may be similar as described regarding FIGS. 7A-7E. In at least one example embodiment, the apparatus determines that the drag input intersects with the second curvilinear slider interface element.

At block 1808, the apparatus causes non-adjustment movement of the first curvilinear slider interface element comprises juxtaposition of the first curvilinear slider interface element and the second curvilinear slider interface element. The juxtaposition may be similar as described regarding FIGS. 7A-7E.

FIG. 19 is a flow diagram illustrating activities associated with non-adjustment movement of a curvilinear slider interface element according to at least one example embodiment. In at least one example embodiment, there is a set of operations that corresponds the activities of FIG. 19. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 19.

At block 1902, the apparatus causes display of a curvilinear slider interface element that relates to adjustment of a value associated with a setting similarly as described regarding block 1004 of FIG. 10.

At block 1904, the apparatus receives a drag input associated with the curvilinear slider interface element that crosses a positional threshold. The positional threshold and crossing of the positional threshold may be similar as described regarding FIGS. 8A-8F. In at least one example embodiment, the apparatus determines that the drag input crosses the positional threshold.

At block 1906, the apparatus causes non-adjustment movement relating to placement of the first curvilinear slider interface element being positioned at an opposite side of a display region. The placement, position and opposite side of the display region may be similar as described regarding FIGS. 8A-8F.

Figure 20:
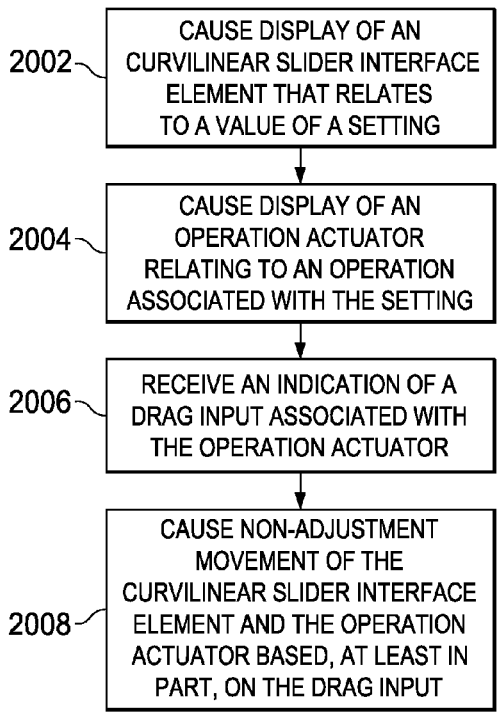
FIG. 20 is a flow diagram illustrating activities associated with non-adjustment movement of a curvilinear slider interface element according to at least one example embodiment.

FIG. 20 is a flow diagram illustrating activities associated with non-adjustment movement of a curvilinear slider interface element according to at least one example embodiment. In at least one example embodiment, there is a set of operations that corresponds the activities of FIG. 20. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 20.

At block 2002, the apparatus causes display of a curvilinear slider interface element that relates to adjustment of a value associated with the setting similarly as described regarding block 1004 of FIG. 10.

At block 2004, the apparatus causes display of an operation actuator relating to an operation associated with the setting similarly as described regarding block 1406 of FIG. 14.

At block 2006, the apparatus receives an indication of a drag input associated with the operation actuator. The association between the drag input and the operation actuator may be similar as described regarding FIGS. 8A-8F.

At block 2008, the apparatus causes non-adjustment movement of the first curvilinear slider interface element and the operation actuator based, at least in part, on the drag input. The non-adjustment movement and the basis on the drag input may be similar as described regarding FIGS. 8A-8F.

Figure 21:
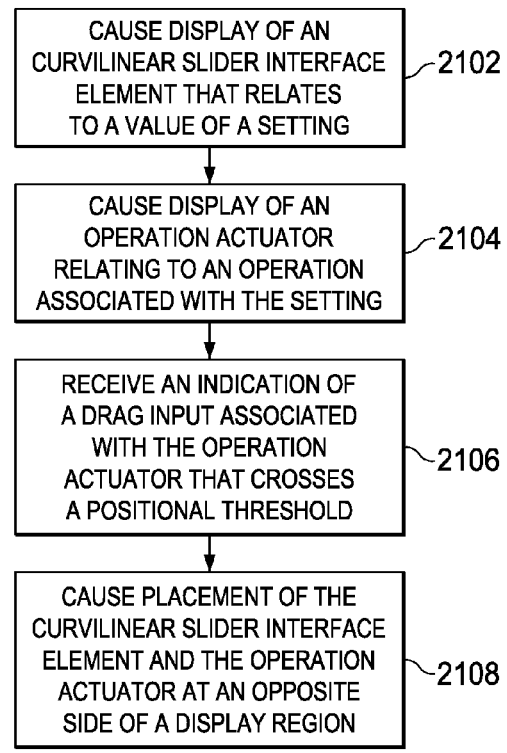
FIG. 21 is a flow diagram illustrating activities associated with non-adjustment movement of a curvilinear slider interface element according to at least one example embodiment.

FIG. 21 is a flow diagram illustrating activities associated with non-adjustment movement of a curvilinear slider interface element according to at least one example embodiment. In at least one example embodiment, there is a set of operations that corresponds the activities of FIG. 21. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 21.

At block 2102, the apparatus causes display of a curvilinear slider interface element that relates to adjustment of a value associated with the setting similarly as described regarding block 1004 of FIG. 10.

At block 2104, the apparatus causes display of an operation actuator relating to an operation associated with the setting similarly as described regarding block 1406 of FIG. 14.

At block 2106, the apparatus receives an indication of a drag input associated with the operation actuator that crosses a positional threshold. The association between the drag input and the operation actuator, the positional threshold, and the crossing of the positional threshold may be similar as described regarding FIGS. 8A-8F. In at least one example embodiment, the apparatus determines that the drag input crosses the positional threshold.

At block 2108, the apparatus causes non-adjustment movement related to placement of the first curvilinear slider interface element and the operation actuator being positioned at an opposite side of a display region. The placement, and position at the opposite side of the display region may be similar as described regarding FIGS. 8A-8F.

Figure 22:
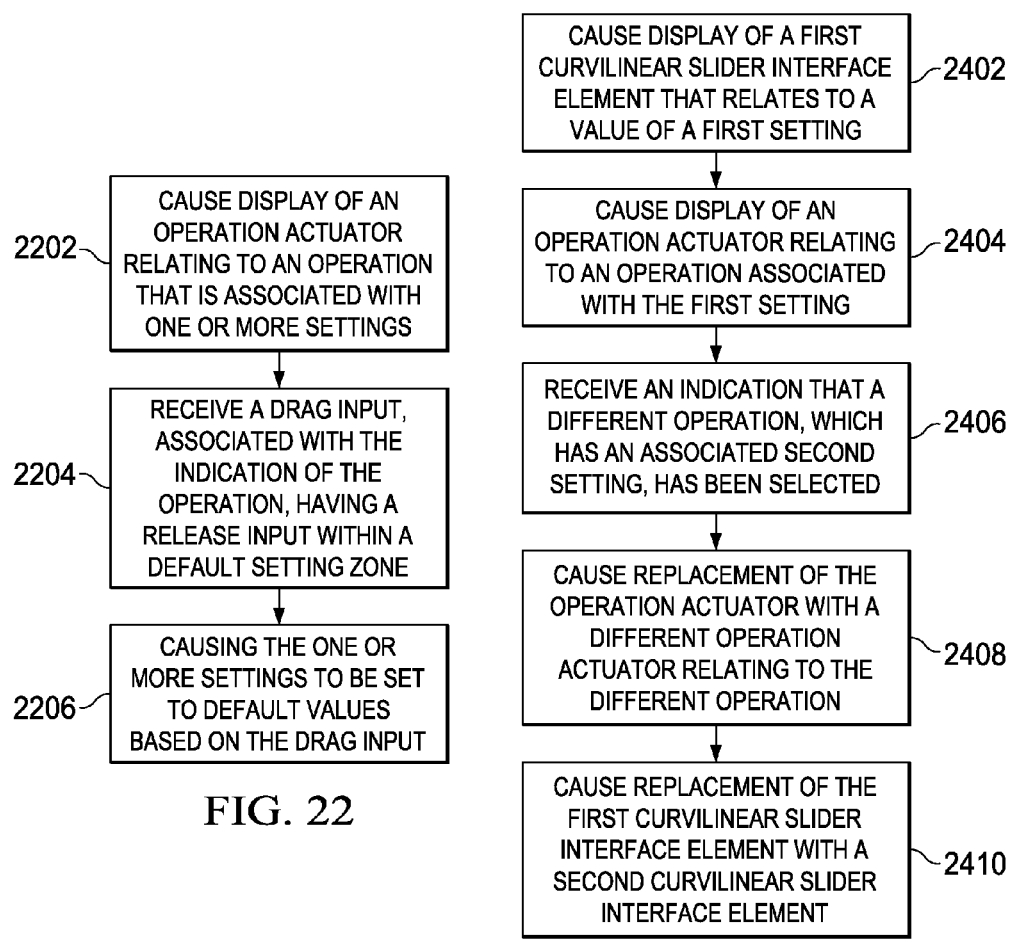
FIG. 22 is a flow diagram illustrating activities associated with default settings associated with a curvilinear slider interface element according to at least one example embodiment.

FIG. 22 is a flow diagram illustrating activities associated with default settings associated with a curvilinear slider interface element according to at least one example embodiment. In at least one example embodiment, there is a set of operations that corresponds the activities of FIG. 22. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 22.

At block 2202, the apparatus causes display of an operation actuator relating to an operation that is associated with one or more settings similarly as described regarding block 1406 of FIG. 14.

At block 2204, the apparatus receives an indication of a drag input associated with the operation actuator, the drag input having a terminus within a default setting zone. The terminus, and the default setting zone may be similar as described regarding FIGS. 8A-8F. In at least one example embodiment, the apparatus determines that the terminus is within the default setting zone.

At block 2206, the apparatus causes the one or more settings to be set to default values based, at least in part, on the drag input. The setting to default values may be similar as described regarding FIGS. 8A-8F.

Figure 23:
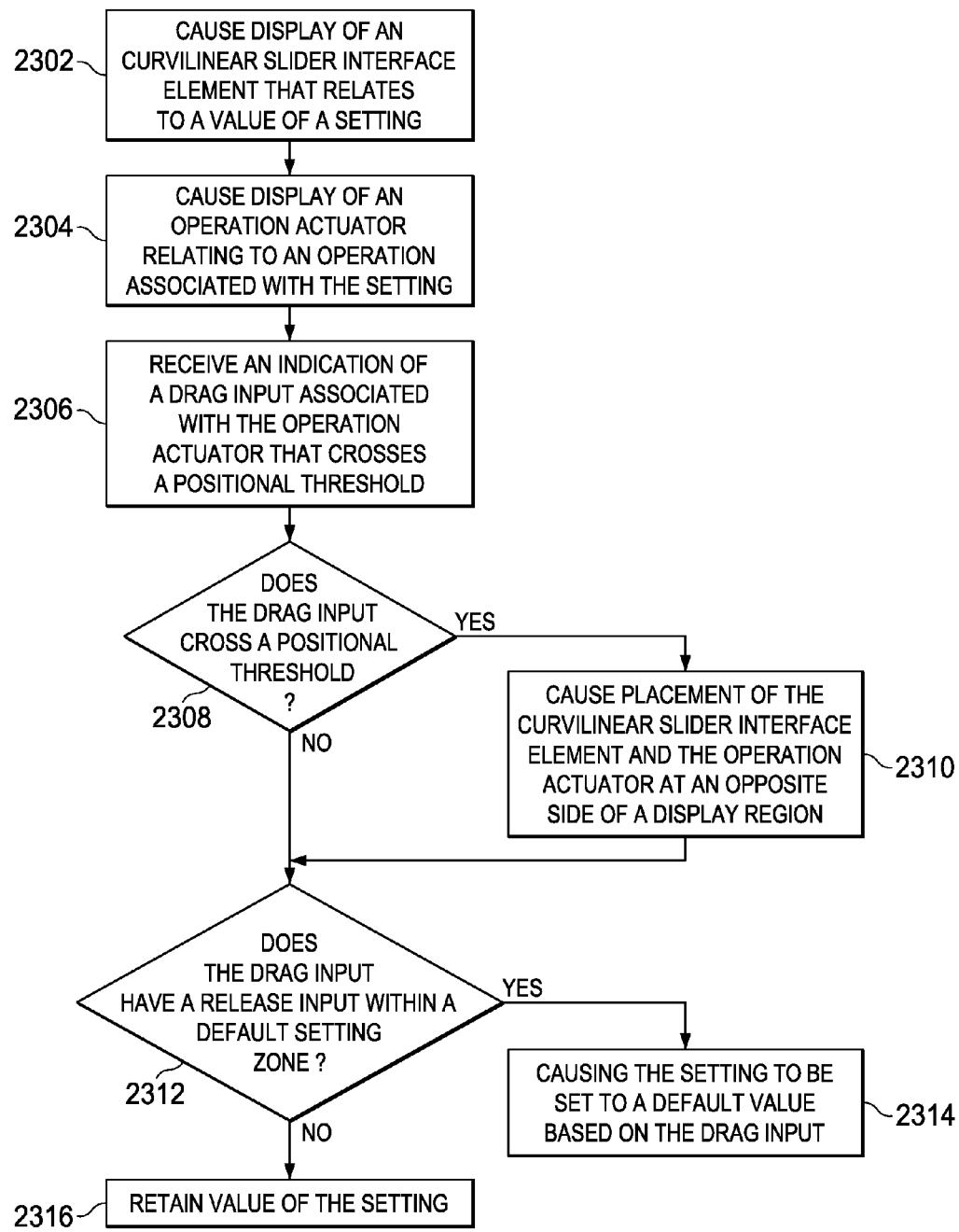
FIG. 23 is a flow diagram illustrating activities associated with a drag input associated with an operation actuator according to at least one example embodiment.

FIG. 23 is a flow diagram illustrating activities associated with a drag input associated with an operation actuator according to at least one example embodiment. In at least one example embodiment, there is a set of operations that corresponds the activities of FIG. 23. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 23.

At block 2302, the apparatus causes display of a curvilinear slider interface element that relates to adjustment of a value associated with a setting similarly as described regarding block 1004 of FIG. 10.

At block 2304, the apparatus causes display of an operation actuator relating to an operation associated with the setting similarly as described regarding block 1406 of FIG. 14.

At block 2306, the apparatus receives an indication of a drag input associated with the operation actuator similarly as described regarding block 2006 of FIG. 20.

At block 2308, the apparatus determines whether the drag input crosses a positional threshold. If the apparatus determines that the drag input crosses the positional threshold, flow proceeds to block 2310. If the apparatus determines that the drag input fails to cross a positional threshold, flow proceeds to block 2312.

At block 2310, the apparatus causes non-adjustment movement related to placement of the first curvilinear slider interface element and the operation actuator being positioned at an opposite side of a display region similarly as described regarding block 2108 of FIG. 21. Flow then proceeds to block 2312.

At block 2312, the apparatus determines whether the drag input has a terminus within a default setting zone. If the apparatus determines that the drag input has a terminus within a default setting zone, flow proceeds to block 2314. If the apparatus determines that the drag input does not have a terminus within a default setting zone, flow proceeds to block 2316.

At block 2314, the apparatus causes the one or more settings to be set to default values based, at least in part, on the drag input similarly as described regarding block 2206 of FIG. 22.

At block 2316, the apparatus retains the value of the setting. In at least one example embodiment retaining the value of the setting relates to abstaining from adjusting the value of the setting.

FIG. 24 is a flow diagram illustrating activities associated with placement of a curvilinear slider interface element according to at least one example embodiment. In at least one example embodiment, there is a set of operations that corresponds the activities of FIG. 24. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 24.

At block 2402, the apparatus causes display of a first curvilinear slider interface element that relates to adjustment of a value associated with a first setting similarly as described regarding block 1004 of FIG. 10.

At block 2404, the apparatus causes display of an operation actuator relating to an operation associated with the first setting similarly as described regarding block 1406 of FIG. 14.

At block 2406, the apparatus receives an indication that a different operation has been selected. In at least one example embodiment the different operation is associated with a second setting. The indication that a different operation has been selected may be similar as described regarding blocks 3A-3J.

At block 2408, the apparatus causes replacement of the operation actuator with a different operation actuator relating to the different operation. The replacement may be similar as described regarding FIGS. 3A-3J.

At block 2410, the apparatus causes replacement of the first curvilinear slider interface element with a second curvilinear slider interface element. The replacement may be similar as described regarding FIGS. 3A-3J.

Figures 25, 26:
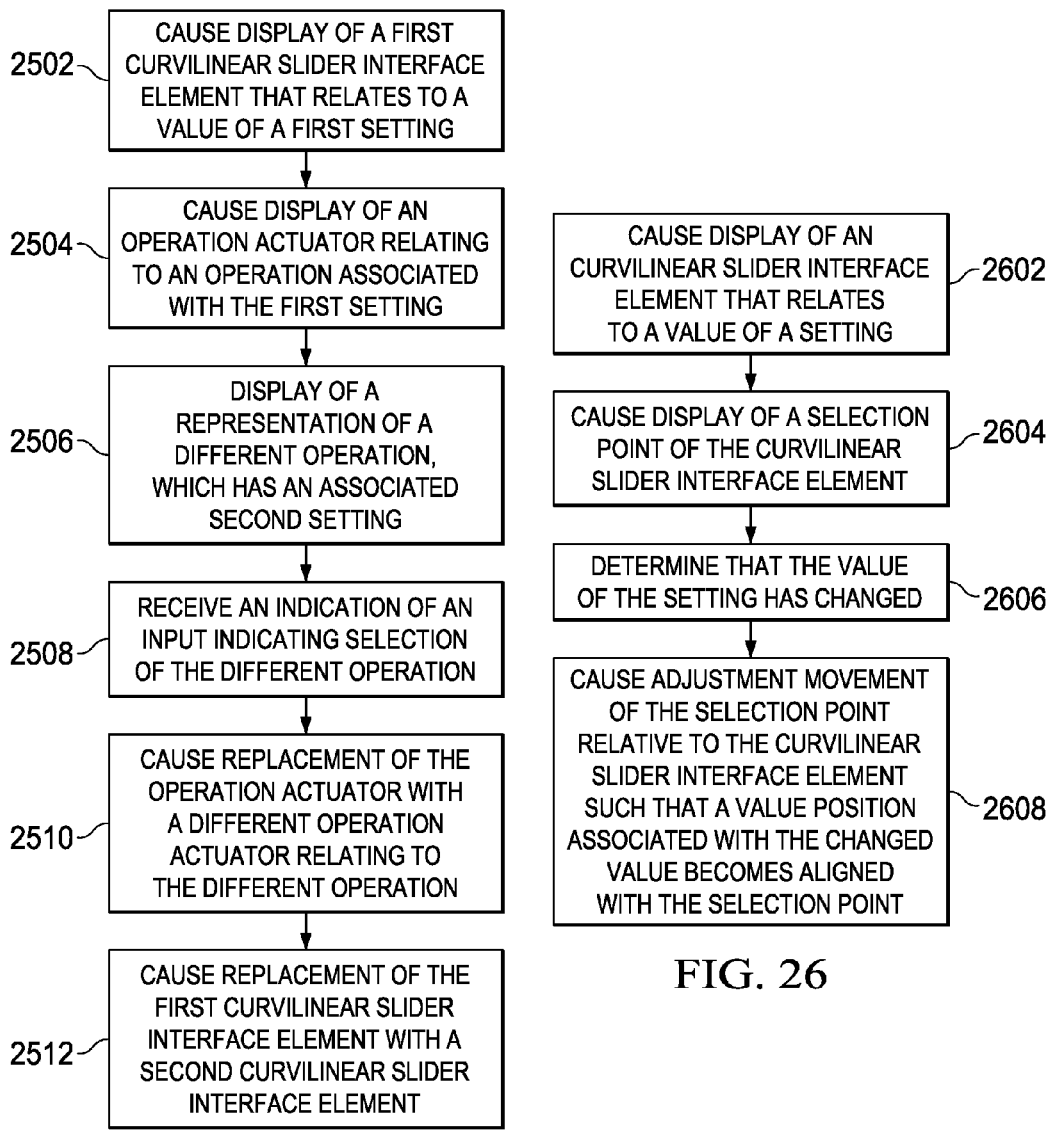
FIG. 25 is a flow diagram illustrating activities associated with placement of a curvilinear slider interface element according to at least one example embodiment.
FIG. 26 is a flow diagram illustrating activities associated with value indication of a curvilinear slider interface element according to at least one example embodiment.

FIG. 25 is a flow diagram illustrating activities associated with placement of a curvilinear slider interface element according to at least one example embodiment. In at least one example embodiment, there is a set of operations that corresponds the activities of FIG. 25. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 25.

At block 2502, the apparatus causes display of a first curvilinear slider interface element that relates to adjustment of a value associated with a first setting similarly as described regarding block 1004 of FIG. 10.

At block 2504, the apparatus causes display of an operation actuator relating to an operation associated with the first setting similarly as described regarding block 1406 of FIG. 14.

At block 2506, the apparatus causes display of a representation of the different operation. In at least one example embodiment, the different operation may be associated with a second setting. The representation of the different operation may be similar as described regarding blocks 3A-3J.

At block 2508, the apparatus receives a selection input associated with the representation of the different operation. The selection input may be similar as described regarding FIGS. 3A-3J.

At block 2510, the apparatus causes replacement of the operation actuator with a different operation actuator relating to the different operation similar as described regarding block 2408 of FIG. 24.

At block 2512, the apparatus causes replacement of the first curvilinear slider interface element with a second curvilinear slider interface element similarly as described regarding block 2410 of FIG. 24.

FIG. 26 is a flow diagram illustrating activities associated with value indication of a curvilinear slider interface element according to at least one example embodiment. In at least one example embodiment, there is a set of operations that corresponds the activities of FIG. 26. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 26.

At block 2602, the apparatus causes display of a curvilinear slider interface element that relates to adjustment of a value associated with a setting, similarly as described regarding block 1004 of FIG. 10.

At block 2604, the apparatus causes display of a selection point of the curvilinear slider interface element. The selection point may be similar as described regarding FIGS. 2A-2I, FIGS. 3A-3J, FIGS. 4A-4B, FIGS. 6A-6B, FIGS. 7A-7E, FIGS. 8A-8F, and FIGS. 9A-9D.

At block 2606, the apparatus determines that the value of the first setting has changed. Determination that the value has changed may be similar as described regarding FIGS. 2A-2I and FIGS. 3A-3J.

At block 2608, the apparatus causes rotation the first curvilinear slider interface element such that a position associated with the changed value aligns with the first selection point. The causation of rotation and value alignment may be similar as described regarding FIGS. 2A-2I and FIGS. 3A-3J.

Figure 27:
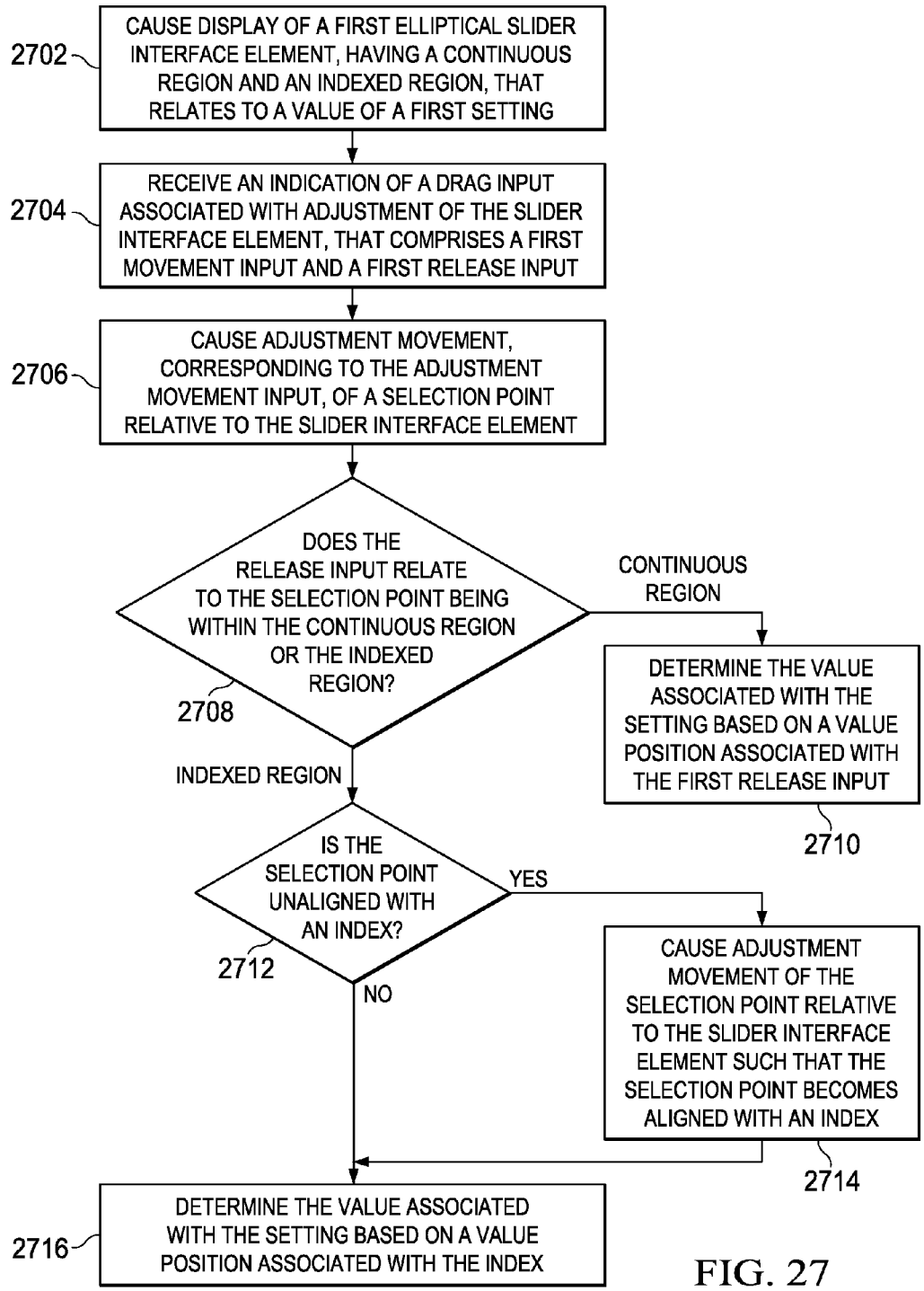
FIG. 27 is a flow diagram illustrating activities associated with regions of a slider interface element according to at least one example embodiment.

FIG. 27 is a flow diagram illustrating activities associated with regions of a slider interface element according to at least one example embodiment. In at least one example embodiment, there is a set of operations that corresponds the activities of FIG. 27. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 27.

At block 2702, the apparatus causes display of a slider interface element comprising at least one continuous region and at least one indexed region such that the slider interface element comprises a plurality of value positions along the contour of the slider interface element, the value positions corresponding with values associated with a setting. The continuous region, the indexed region, the value position may be similar as described regarding FIGS. 2A-2I and FIGS. 9A-9D.

At block 2704, the apparatus receives an indication of a drag input associated with adjustment of the slider interface element, the first drag input comprising a first movement input and a first release input. The drag input may be similar as described regarding FIGS. 2A-2I.

At block 2706, the apparatus causes adjustment movement, corresponding to the movement input, of a selection point relative to the slider interface element. The causation of adjustment movement may be similar as described regarding FIGS. 2A-2I.

At block 2708, the apparatus determines whether the release input relates to the selection point being within the continuous region or the indexed region. If the apparatus determines that the release input relates to the selection point being in the continuous region, flow proceeds to block 2710. If the apparatus determines that the release input relates to the selection point being in the indexed, flow proceeds to block 2712.

At block 2710, the apparatus determines the value associated with the setting based, at least in part, on a value position associated with the first release input. Determination of the value may be similar as described regarding FIGS. 2A-2I.

At block 2712, the apparatus determines whether the selection point is unaligned with an index. If the apparatus determines that the selection point is unaligned with an index, flow proceeds to block 2714. If the apparatus determines that the selection point is aligned with an index, flow proceeds to block 2716.

At block 2714, the apparatus causes adjustment movement of the selection point relative to the value positions of the slider interface element such that the selection point becomes aligned with an index. The adjustment movement may be similar as described regarding FIGS. 9A-9E. Flow then proceeds to block 2716.

At block 2716, the apparatus determines the value associated with the setting based, at least in part, on the value position associated with the index. The determination of the value may be similar as described regarding FIGS. 2A-2I.

Figure 28:
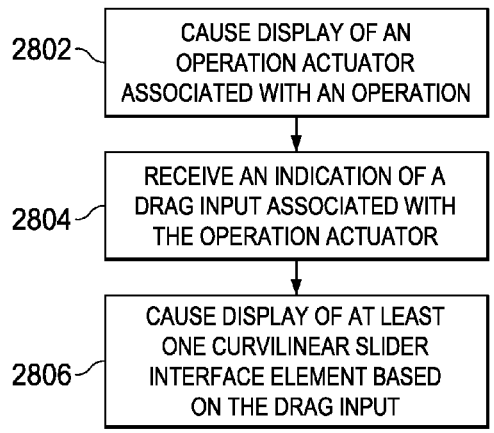
FIG. 28 is a flow diagram illustrating activities associated with display of a curvilinear slider interface element according to at least one example embodiment.

FIG. 28 is a flow diagram illustrating activities associated with display of a curvilinear slider interface element according to at least one example embodiment. In at least one example embodiment, there is a set of operations that corresponds the activities of FIG. 28. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 28.

At block 2802, the apparatus causes display of an operation actuator associated with an operation similarly as described regarding block 1406 of FIG. 14. At block 2804, the apparatus receives an indication of a drag input associated with the operation actuator. The drag input and the association with the operation actuator may be similar as described regarding FIGS. 8A-8F. At block 2806, the apparatus causes display of at least one curvilinear slider interface element, based, at least in part, on the drag input. The basis for causation of display may be similar as described regarding FIGS. 8A-8F.

Figure 29:
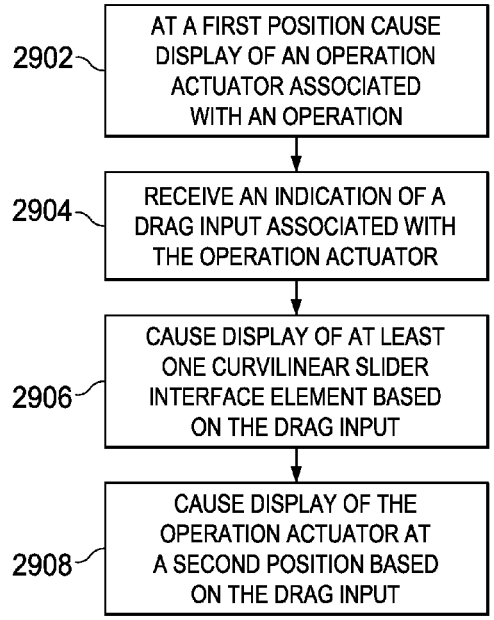
FIG. 29 is a flow diagram illustrating activities associated with display of a curvilinear slider interface element according to at least one example embodiment.

FIG. 29 is a flow diagram illustrating activities associated with display of a curvilinear slider interface element according to at least one example embodiment. In at least one example embodiment, there is a set of operations that corresponds the activities of FIG. 29. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 29.

At block 2902, the apparatus causes display of an operation actuator, associated with an operation, at a first position, similarly as described regarding block 1406 of FIG. 14. At block 2904, the apparatus receives an indication of a drag input associated with the operation actuator similarly as described regarding block 2804 of FIG. 28. At block 2906, the apparatus causes display of at least one curvilinear slider interface element, based, at least in part, on the drag input apparatus similarly as described regarding block 2806 of FIG. 28. At block 2908, the apparatus causes display of the operation actuator at a second position based, at least in part, on the drag input. The second position may be similar as described regarding FIGS. 8A-8F.

Figure 30:
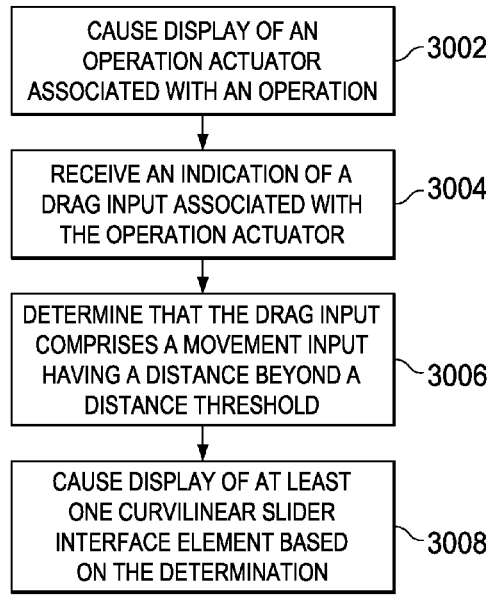
FIG. 30 is a flow diagram illustrating activities associated with display of a curvilinear slider interface element according to at least one example embodiment.

FIG. 30 is a flow diagram illustrating activities associated with display of a curvilinear slider interface element according to at least one example embodiment. In at least one example embodiment, there is a set of operations that corresponds the activities of FIG. 30. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 30.

At block 3002, the apparatus causes display of an operation actuator, associated with an operation, at a first position, similarly as described regarding block 1406 of FIG. 14. At block 3004, the apparatus receives an indication of a drag input associated with the operation actuator similarly as described regarding block 2804 of FIG. 28. At block 3006, the apparatus determines that the drag input comprises a movement input having a distance beyond a distance threshold. The determination and the distance threshold may be similar as described regarding FIGS. 8A-8F. At block 3008, the apparatus causes display of at least one curvilinear slider interface element, based, at least in part, on the drag input apparatus similarly as described regarding block 2806 of FIG. 28. In at least one example embodiment, display of the at least one curvilinear slider interface element is based, at least in part, on the determination that the drag input comprises a movement input having a distance beyond a distance threshold, similarly as described regarding FIGS. 8A-8F.

Figure 31:
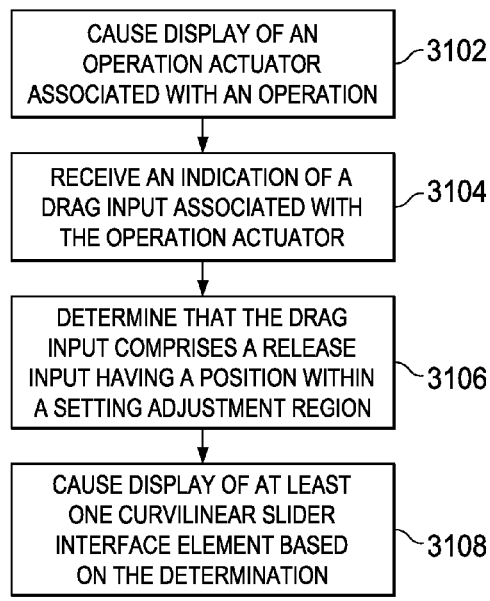
FIG. 31 is a flow diagram illustrating activities associated with display of a curvilinear slider interface element according to at least one example embodiment.

FIG. 31 is a flow diagram illustrating activities associated with display of a curvilinear slider interface element according to at least one example embodiment. In at least one example embodiment, there is a set of operations that corresponds the activities of FIG. 31. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 31.

At block 3102, the apparatus causes display of an operation actuator, associated with an operation, at a first position, similarly as described regarding block 1406 of FIG. 14. At block 3104, the apparatus receives an indication of a drag input associated with the operation actuator similarly as described regarding block 2804 of FIG. 28. At block 3106, the apparatus determines that the drag input comprises a release input having a position within a setting adjustment region. The determination and the setting adjustment region may be similar as described regarding FIGS. 8A-8F. At block 3108, the apparatus causes display of at least one curvilinear slider interface element, based, at least in part, on the drag input apparatus similarly as described regarding block 2806 of FIG. 28. In at least one example embodiment, display of the at least one curvilinear slider interface element is based, at least in part, on the determination that the drag input comprises a release input having a position within a setting adjustment region, similarly as described regarding FIGS. 8A-8F.

Figure 32:
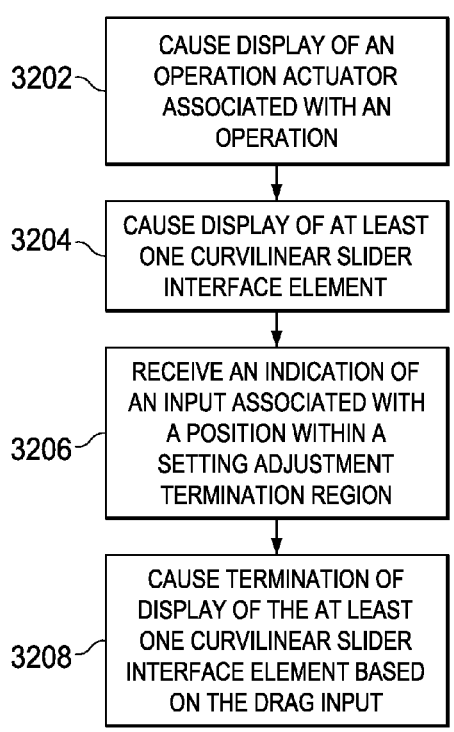
FIG. 32 is a flow diagram illustrating activities associated with display of a curvilinear slider interface element according to at least one example embodiment.

FIG. 32 is a flow diagram illustrating activities associated with display of a curvilinear slider interface element according to at least one example embodiment. In at least one example embodiment, there is a set of operations that corresponds the activities of FIG. 32. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 32.

At block 3202, the apparatus causes display of an operation actuator, associated with an operation having a related setting, at a first position, similarly as described regarding block 1406 of FIG. 14. At block 3204, the apparatus causes display of a curvilinear slider interface element that relates to adjustment of a value associated with the setting, similarly as described regarding block 1004 of FIG. 10. At block 3206, the apparatus receives an indication of an input associated with a position within a setting adjustment termination region. The input and the setting adjustment termination region may be similar as described regarding FIGS. 8A-8F. At block 3208, the apparatus causes termination of display of the at least one curvilinear slider interface element based, at least in part, on the drag input. The termination and the basis may be similar as described regarding FIGS. 8A-8F.

Figure 33:
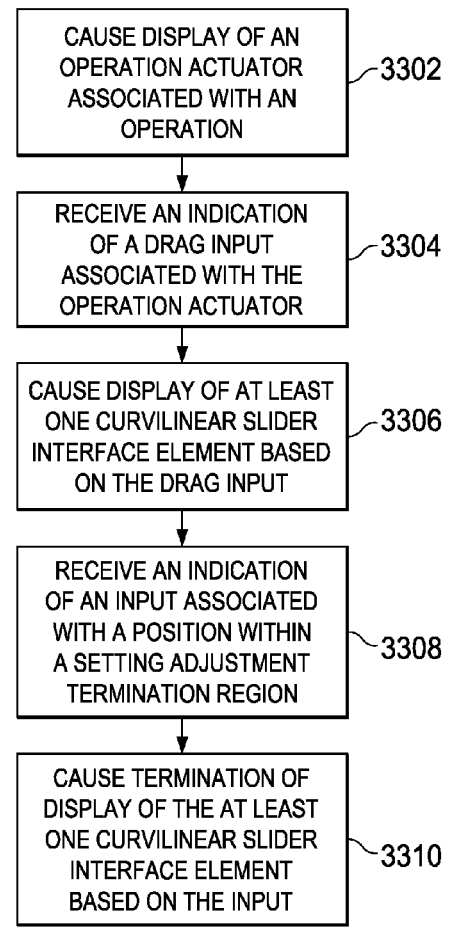
FIG. 33 is a flow diagram illustrating activities associated with display of a curvilinear slider interface element according to at least one example embodiment.

FIG. 33 is a flow diagram illustrating activities associated with display of a curvilinear slider interface element according to at least one example embodiment. In at least one example embodiment, there is a set of operations that corresponds the activities of FIG. 33. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 33.

At block 3302, the apparatus causes display of an operation actuator, associated with an operation, at a first position, similarly as described regarding block 1406 of FIG. 14. At block 3304, the apparatus receives an indication of a drag input associated with the operation actuator similarly as described regarding block 2804 of FIG. 28. At block 3306, the apparatus causes display of at least one curvilinear slider interface element, based, at least in part, on the drag input apparatus similarly as described regarding block 2806 of FIG. 28. At block 3308, the apparatus receives an indication of an input associated with a position within a setting adjustment termination region, similarly as described regarding block 3206 of FIG. 32. At block 3310, the apparatus causes termination of display of the at least one curvilinear slider interface element based, at least in part, on the drag input, similarly as described regarding block 3208 of FIG. 32.

Figure 34:
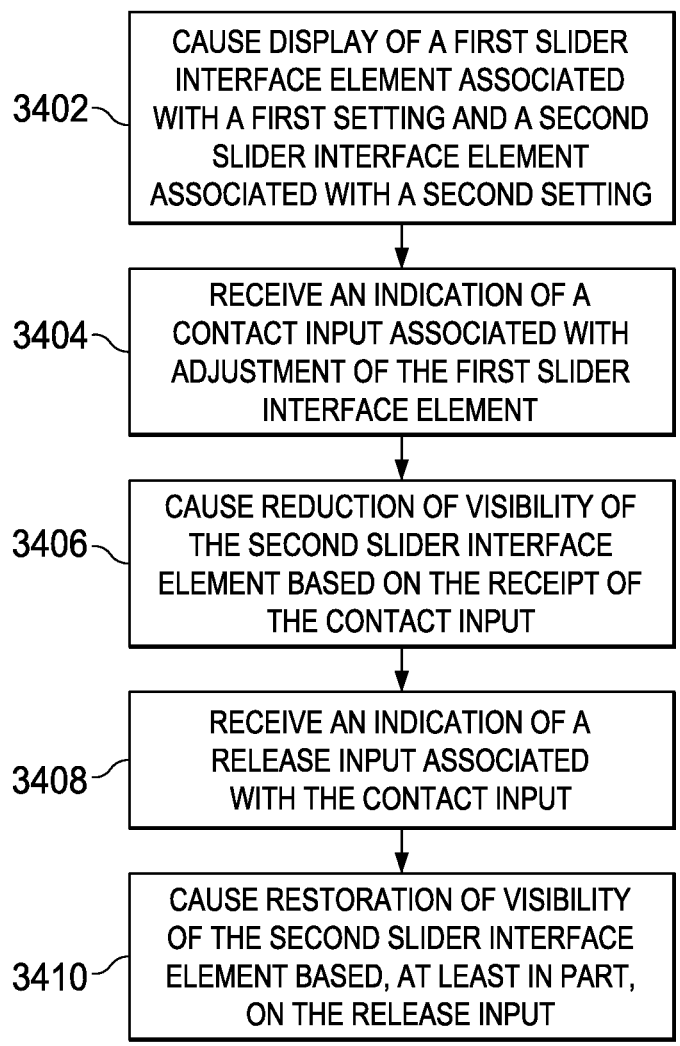
FIG. 34 is a flow diagram illustrating activities associated with display of a curvilinear slider interface element according to at least one example embodiment.

FIG. 34 is a flow diagram illustrating activities associated with display of a curvilinear slider interface element according to at least one example embodiment. In at least one example embodiment, there is a set of operations that corresponds the activities of FIG. 34. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 34.

At block 3402, the apparatus causes display of a first slider interface element associated with a first setting and a second slider interface element associated with a second setting, similarly as described regarding blocks 1104 and 1108 of FIG. 11. At block 3404, the apparatus receives an indication of a contact input associated with the first slider interface element. The input may be associated with adjustment movement, with non-adjustment movement, and/or the like. Block 3404 may further comprise determination that the contact input is associated with adjustment of the first slider interface element. The input may be similar as described regarding FIGS. 3A-3J and FIGS. 7A-7E. At block 3406, the apparatus causes a reduction of visibility of the second slider interface element based, at least in part, on the receipt of the contact input. The causation and the reduction of visibility may be similar as described regarding FIGS. 3A-3J and FIGS. 7A-7E. At block 3408, the apparatus receives an indication of a release input associated with the contact input. The release input may be associated with the contact input by way of the contact input and the release input being comprised by another input, such as a drag input, a tap input, and/or the like. At block 3410, the apparatus causes restoration of visibility of the second slider interface element based, at least in part, on the release input. The restoration of visibility may be similar as described regarding FIGS. 3A-3J and FIGS. 7A-7E.

Figure 35:
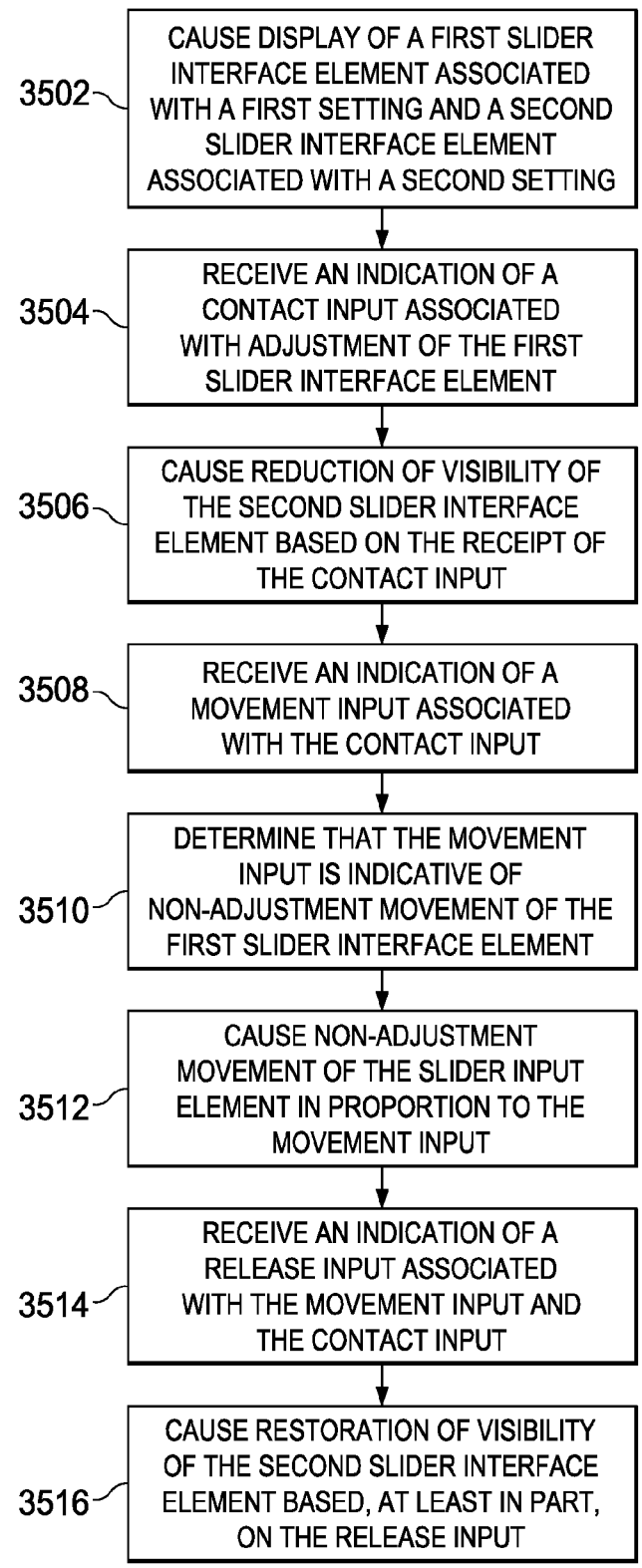
FIG. 35 is a flow diagram illustrating activities associated with display of a curvilinear slider interface element according to at least one example embodiment.

FIG. 35 is a flow diagram illustrating activities associated with display of a curvilinear slider interface element according to at least one example embodiment. In at least one example embodiment, there is a set of operations that corresponds the activities of FIG. 35. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 35.

At block 3502, the apparatus causes display of a first slider interface element associated with a first setting and a second slider interface element associated with a second setting, similarly as described regarding block 3402 of FIG. 34. At block 3504, the apparatus receives an indication of a contact input associated with the first slider interface element similarly as described regarding block 2404 of FIG. 34. At block 3506, the apparatus causes a reduction of visibility of the second slider interface element based, at least in part, on the receipt of the contact input similarly as described regarding block 3406 of FIG. 34. At block 3508, the apparatus receives an indication of a movement input associated with the contact input. In at least one example embodiment, the movement input, the contact input, and the release input are comprised by a drag input. The movement input may be similar as described regarding FIGS. 3A-3J and FIGS. 7A-7E. At block 3510, the apparatus determines that, at least part of, the movement input is indicative of non-adjustment movement of the first slider interface element. The determination may be similar as described regarding FIGS. 2A-2I, FIGS. 3A-3J, FIGS. 7A-7E, and FIGS. 8A-8F. At block 3512, the apparatus causes non-adjustment movement of the slider input element in proportion to the movement input. The causation of movement may be such that the slider interface element is at a different position in relation to the display region than before the movement. The non-adjustment movement may be similar as described regarding FIGS. 8A-8F. At block 3514, the apparatus receives an indication of a release input associated with the contact input similarly as described regarding block 3408 of FIG. 34. At block 3516, the apparatus causes restoration of visibility of the second slider interface element based, at least in part, on the release input, similarly as described regarding block 3410 of FIG. 34.

Figure 36:
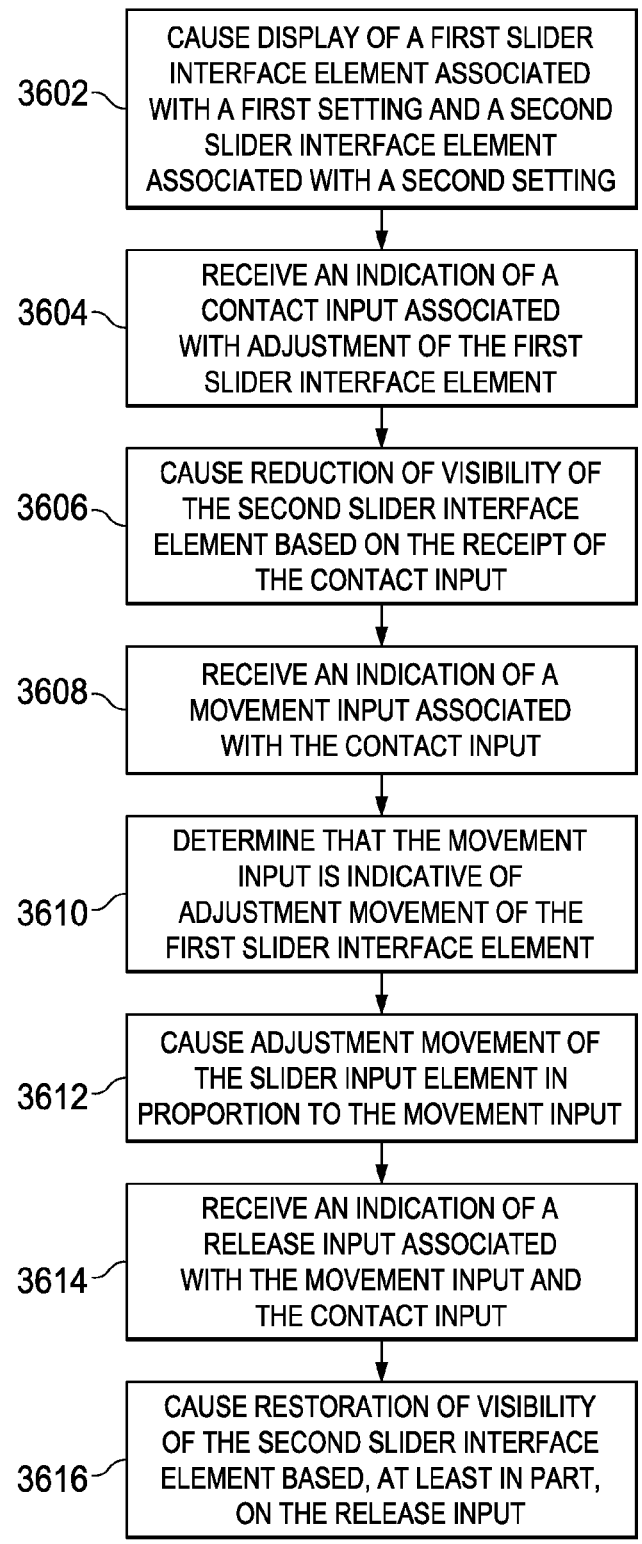
FIG. 36 is a flow diagram illustrating activities associated with display of a curvilinear slider interface element according to at least one example embodiment.

FIG. 36 is a flow diagram illustrating activities associated with display of a curvilinear slider interface element according to at least one example embodiment. In at least one example embodiment, there is a set of operations that corresponds the activities of FIG. 36. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 36.

At block 3602, the apparatus causes display of a first slider interface element associated with a first setting and a second slider interface element associated with a second setting, similarly as described regarding block 3402 of FIG. 34. At block 3604, the apparatus receives an indication of a contact input associated with the first slider interface element similarly as described regarding block 2404 of FIG. 34. At block 3606, the apparatus causes a reduction of visibility of the second slider interface element based, at least in part, on the receipt of the contact input similarly as described regarding block 3406 of FIG. 34. At block 3608, the apparatus receives an indication of a movement input associated with the contact input similarly as described regarding block 3508 of FIG. 35. At block 3610, the apparatus determines that, at least part of, the movement input is indicative of adjustment movement of the first slider interface element. The determination may be similar as described regarding FIGS. 2A-2I, FIGS. 3A-3J, FIGS. 7A-7E, and FIGS. 8A-8F. At block 3612, the apparatus causes adjustment movement of the slider input element in proportion to the movement input. The adjustment movement may be similar as described regarding FIGS. 2A-2I. At block 3614, the apparatus receives an indication of a release input associated with the contact input similarly as described regarding block 3408 of FIG. 34. At block 3616, the apparatus causes restoration of visibility of the second slider interface element based, at least in part, on the release input, similarly as described regarding block 3410 of FIG. 34.

Figure 37:
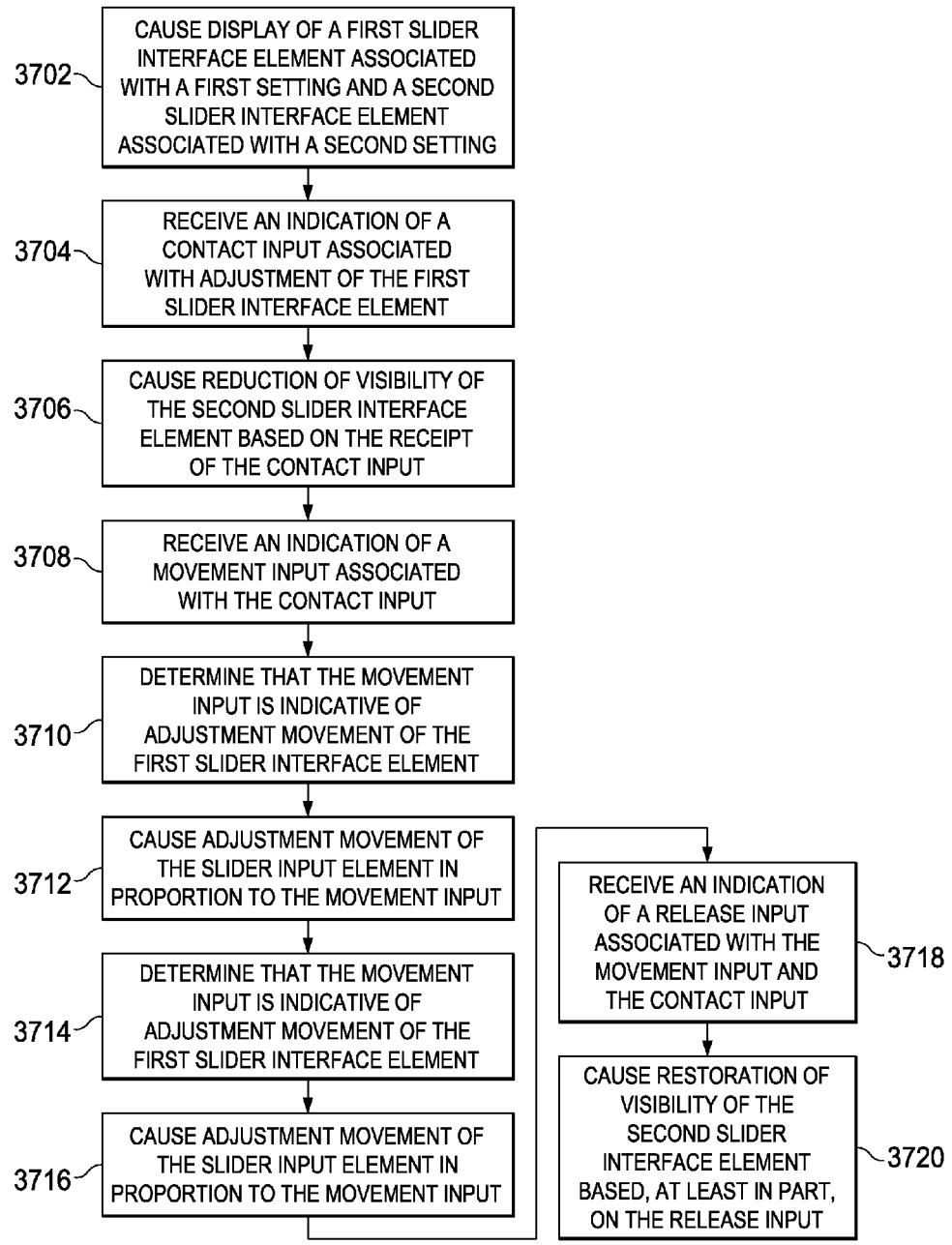
FIG. 37 is a flow diagram illustrating activities associated with display of a curvilinear slider interface element according to at least one example embodiment.

FIG. 37 is a flow diagram illustrating activities associated with display of a curvilinear slider interface element according to at least one example embodiment. In at least one example embodiment, there is a set of operations that corresponds the activities of FIG. 37. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 37.

At block 3702, the apparatus causes display of a first slider interface element associated with a first setting and a second slider interface element associated with a second setting, similarly as described regarding block 3402 of FIG. 34. At block 3704, the apparatus receives an indication of a contact input associated with the first slider interface element similarly as described regarding block 2404 of FIG. 34. At block 3706, the apparatus causes a reduction of visibility of the second slider interface element based, at least in part, on the receipt of the contact input similarly as described regarding block 3406 of FIG. 34. At block 3708, the apparatus receives an indication of a movement input associated with the contact input similarly as described regarding block 3508 of FIG. 35. At block 3710, the apparatus determines that, at least part of, the movement input is indicative of adjustment movement of the first slider interface element, similarly as described regarding block 3610 of FIG. 36. At block 3712, the apparatus causes adjustment movement of the slider input element in proportion to the movement input, similarly as described regarding block 3612 of FIG. 36. At block 3714, the apparatus determines that, at least part of, the movement input is indicative of non-adjustment movement of the first slider interface element, similarly as described regarding block 3510 of FIG. 35. At block 3716, the apparatus causes non-adjustment movement of the slider input element in proportion to the movement input, similarly as described regarding block 3512 of FIG. 35. At block 3718, the apparatus receives an indication of a release input associated with the contact input similarly as described regarding block 3408 of FIG. 34. At block 3720, the apparatus causes restoration of visibility of the second slider interface element based, at least in part, on the release input, similarly as described regarding block 3410 of FIG. 34.

FIGS. 38A-38E are diagrams illustrating an operation actuator according to at least one example embodiment. The examples of FIGS. 38A-38E are merely examples of an operation actuator, and do not limit the scope of the claims. For example, size of the operation actuator may vary, position of the operation actuator may vary, representation of the operation actuator may vary, and/or the like.

Figure 38A:
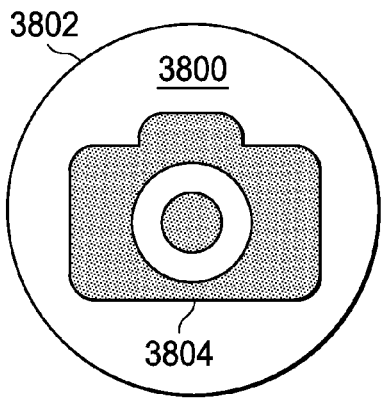
FIGS. 38A-38E are diagrams illustrating an operation actuator according to at least one example embodiment.

FIG. 38A is a diagram illustrating operation actuator 3800, according to at least one example embodiment. In the example of 38A, operation actuator 3800 comprises operation indicator 3804 and operation actuator contour 3802. In at least one example embodiment, operation actuator contour relates to at least one curvilinear part of a visual representation of the operation actuator. The curvilinear part may relate to a boundary of the operation actuator, a shape within the representation of the operation actuator, and/or the like. In at least one example embodiment, a visual representation of the operation actuator relates to at least one visual aspect of the operation actuator. For example, a visual representation may relate to shading, color, opacity, thickness, and/or the like, of the operation actuator.

In at least one example embodiment, an operation associated with an operation actuator has a status associated with performance of the operation. In at least one example embodiment, a status associated with performance of an operation relates to information indicating one or more operational stages associated with performance of the operation. For example, an operational stage may relate to one of a plurality of states, an aspect of a step associated with the operation, and/or the like. In at least one example embodiment, a status relates to a duration associated with performance of the operation. A duration associated with an operation may relate to a duration of a state associated with the operation, a delay associated with the operation, a duration associated with completion of performance of the operation, and/or the like. For example, status may relate to a delay prior to performance of the operation, a duration that the operation is performed, and/or the like. For example, a status may relate to an extended exposure image capture operation. In such an example, the status may relate to a duration since invocation of the extended exposure image capture operation.

In at least one example embodiment, invocation of an operation relates to a beginning of one or more activities that result in performance of the operation. For example, causing invocation of the operation may comprise causing the performance of the operation, initiating a timer associated with performance of the operation, and/or the like. For example, the operation may relate to an image capture operation associated with a delayed shutter setting. In such an example, invocation of the image capture operation associated with a delayed shutter setting may comprise initiating countdown towards elapse of the delay. In such an example, the status of such an operation may relate to a duration prior to performance of the image capture operation In at least one example embodiment, an apparatus causes change of an operation actuator to indicate status of performance of an associated operation. For example, the user may perform an actuation input to invoke performance of the operation associated with the operation actuator. In such an example, the operation actuator may change from a first representation that fails to indicate status information to a second representation that is indicative of status of performance of the operation. In at least one example embodiment, a part of an operation actuator associated with indication of status of an operation is referred to as an operation status indicator.

In at least one example embodiment, in circumstances where a status relates to a duration associated with performance of an operation and the status indicator relates to a durational representation. In at least one example embodiment, a durational representation relates to a representation that conveys at least one aspect associated with a duration. For example a durational representation may indicate a duration by way of representational change with respect to time, such as an animation. A durational representation may relate to a textual representation, a graphical representation, and/or the like. For example, a textual representation may relate to a durational representation that indicates duration by way of providing text information. In another example, a graphical representation may relate to a durational representation that indicates duration by providing non-textual visual information. For example, the visual information may be indicative of a metaphor that invokes user perception of duration. For example, the durational representation may invoke a clock metaphor, a filling metaphor, an emptying metaphor, and/or the like.

In at least one example embodiment, a durational representation represents a diminishing duration. For example, the duration may relate to a duration prior to performance of the operation. In such an example, the durational representation may be a diminishing durational representation, such as a representation indicative of a countdown, a draining, a reverse movement of time, and/or the like.

In at least one example embodiment, a durational representation represents an increasing duration. For example, the duration may relate to a duration after invocation of performance of the operation. In such an example, the durational representation may be an increasing durational representation, such as a representation indicative of a count-up, a filling, a forward movement of time, and/or the like.

In at least one example embodiment, a graphical duration indicator relates to a duration contour representation along an operation actuator contour. For example, the graphical duration indicator may relate to an animation along the operation actuator contour, within the operation actuator contour, outside the operation actuator contour, and/or the like. In at least one example embodiment, the graphical duration indication provides an indication of duration relating to an amount of the operation actuator contour to which a graphical duration indication is applied. For example, an increasing durational representation may relate to an increasing amount of a contour to which a graphical duration indication is applied. In another example, a decreasing durational representation may relate to a decreasing amount of a contour to which a graphical duration indication is applied.

In at least one example embodiment, an apparatus may condition determination of the status on determination that performance of the operation is associated with a status. For example, there may be some operations that have performance associated with a status and other operations that have performance unassociated with a status. For example, some operations may be performed upon invocation such that there is no noticeable status transition to a user. In another example, there may be no transition beyond performance of the operation itself. For example, an image capture operation may be performed absent user perceivable status. In such circumstances, it may be desirable to avoid providing status representation in association with performance of an operation unassociated with a status.

In at least one example embodiment, it may be desirable to restore an operation actuator after performance of an operation associated with the operation actuator has completed. For example, if the operation actuator changed from a first representation to a second representation by way of a status indicator, upon completion of performance of the operation, the operation actuator may be changed back to the first representation.

Figure 38B:
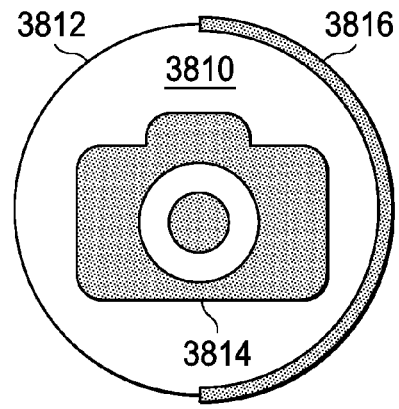

FIG. 38B is a diagram illustrating operation actuator 3810, according to at least one example embodiment. In the example of 38B, operation actuator 3810 comprises operation indicator 3814, operation actuator contour 3812, and status indicator 3816. In the example of FIG. 38B, status indicator 3816 relates to a graphical duration indication. In the example of FIG. 38B, status indicator 3816 relates to a duration contour representation. It can be seen that status indicator relates to a representation along operation actuator contour 2812. In at least one example embodiment, status indicator 3816 is indicative of a diminishing duration. For example, prior to the representation of status indicator 3816 illustrated in FIG. 38B, status indicator 3816 may have been associated with a larger amount of operation actuator contour 2812. In at least one example embodiment, status indicator 3816 is indicative of an increasing duration. For example, prior to the representation of status indicator 3816 illustrated in FIG. 38B, status indicator 3816 may have been similar to status indicator 3826 of FIG. 38C.

Figure 38C:
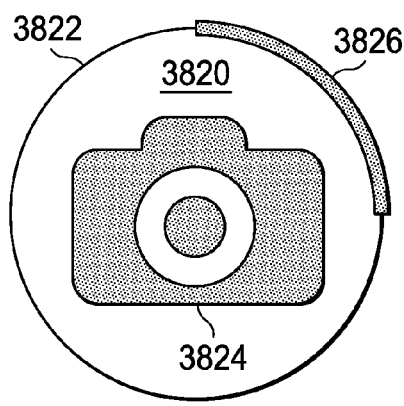

FIG. 38C is a diagram illustrating operation actuator 3820, according to at least one example embodiment. In the example of 38C, operation actuator 3820 comprises operation indicator 3824, operation actuator contour 3822, and status indicator 3826. In the example of FIG. 38C, status indicator 3826 relates to a graphical duration indication. In the example of FIG. 38C, status indicator 3826 relates to a duration contour representation. It can be seen that status indicator 3826 relates to a representation along operation actuator contour 2822. In at least one example embodiment, status indicator 3826 is indicative of a diminishing duration. For example, prior to the representation of status indicator 3826 illustrated in FIG. 38C, status indicator 3826 may have been similar to status indicator 3816 of FIG. 38B. In at least one example embodiment, status indicator 3826 is indicative of an increasing duration. For example, prior to the representation of status indicator 3826 illustrated in FIG. 38C, status indicator 3826 may have been associated with a lesser amount of operation actuator contour 2822.

Figure 38D:
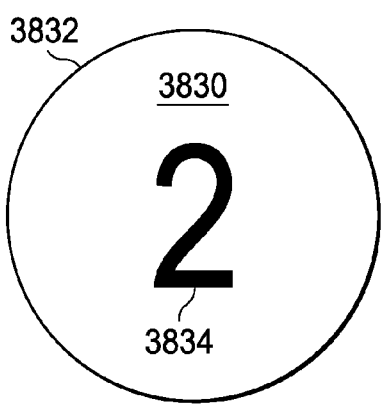

FIG. 38D is a diagram illustrating operation actuator 3830, according to at least one example embodiment. In the example of 38D, operation actuator 3830 comprises operation actuator contour 3832 and status indicator 3834. In the example of FIG. 38D, status indicator 3834 relates to a textual duration indication. In at least one example embodiment, status indicator 3834 is indicative of a diminishing duration. For example, prior to the representation of status indicator 3834 illustrated in FIG. 38D, status indicator 3834 may have been similar to status indicator 3844 of FIG. 38E. In at least one example embodiment, status indicator 3834 is indicative of an increasing duration. For example, prior to the representation of status indicator 3834 illustrated in FIG. 38D, status indicator 3834 may have been associated with text indicative of a lesser amount.

Figure 38E:
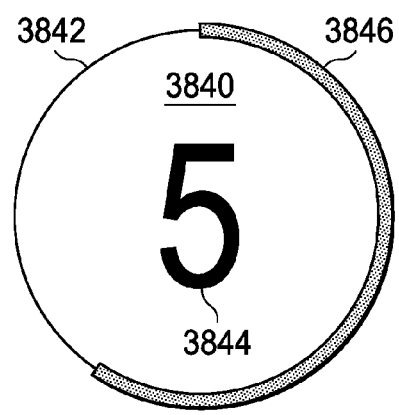

FIG. 38E is a diagram illustrating operation actuator 3840, according to at least one example embodiment. In the example of 38E, operation actuator 3820 comprises status indicator 3844, operation actuator contour 3842, and status indicator 3846. In the example of FIG. 38E, status indicator 3846 relates to a graphical duration indication. In the example of FIG. 38E, status indicator 3846 relates to a duration contour representation. It can be seen that status indicator 3846 relates to a representation along operation actuator contour 2842. In at least one example embodiment, status indicator 3846 is indicative of a diminishing duration. For example, prior to the representation of status indicator 3846 illustrated in FIG. 38E, status indicator 3846 may have been similar to status indicator 3816 of FIG. 38B. In at least one example embodiment, status indicator 3846 is indicative of an increasing duration. For example, prior to the representation of status indicator 3846 illustrated in FIG. 38E, status indicator 3846 may have been similar to status indicator 3826 of FIG. 38C. In the example of FIG. 38E, status indicator 3844 relates to a textual duration indication. In at least one example embodiment, status indicator 3844 is indicative of a diminishing duration. For example, prior to the representation of status indicator 3844 illustrated in FIG. 38E, status indicator 3844 may have been associated with text indicative of a greater amount. In at least one example embodiment, status indicator 3844 is indicative of an increasing duration. For example, prior to the representation of status indicator 3844 illustrated in FIG. 38E, status indicator 3844 may have been similar to status indicator 3834 of FIG. 38D.

Figure 39:
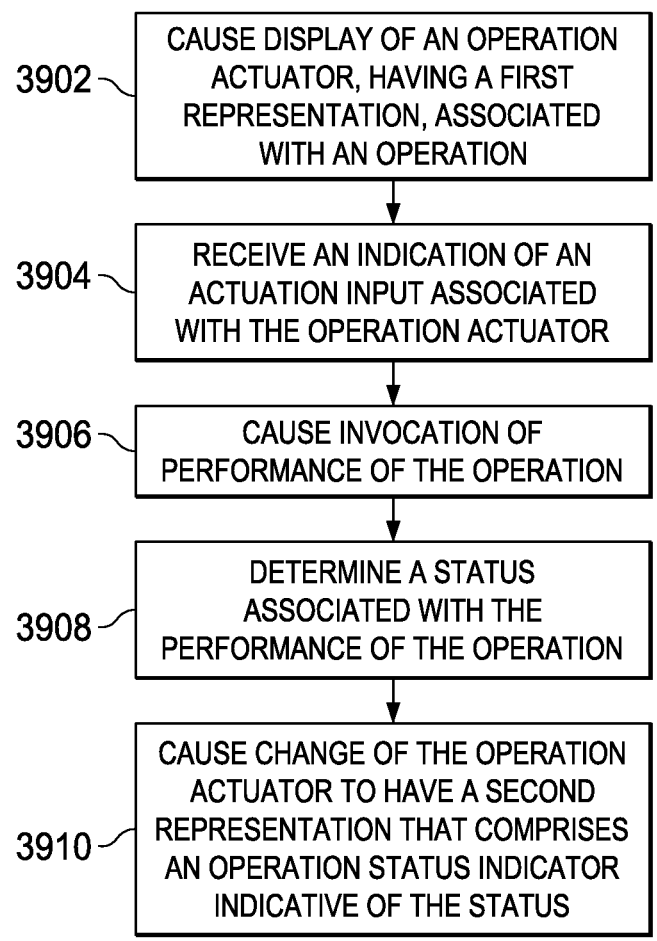
FIG. 39 is a flow diagram illustrating activities associated with display of operation actuator status indication according to at least one example embodiment.

FIG. 39 is a flow diagram illustrating activities associated with display of operation actuator status indication according to at least one example embodiment. In at least one example embodiment, there is a set of operations that corresponds the activities of FIG. 39. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 39. At block 3902, the apparatus causes display of an operation actuator associated with an operation, the operation actuator having a first representation. The causation of display of the operation actuator and the first representation may be similar as described regarding block 1406 of FIG. 14 and FIGS. 38A-38E. At block 3904, the apparatus receives an indication of an actuation input associated with the operation actuator, similarly as described regarding block 1408 of FIG. 14. At block 3906, the apparatus causes invocation of performance of the operation, similarly as described regarding block 1410 of FIG. 14, and FIGS. 38A-38E. At block 3908, the apparatus determines a status associated with the performance of the operation. The status and the determination may be similar as described regarding FIGS. 38A-38E. At block 3910, the apparatus causes change of the operation actuator to have a second representation, the second representation comprising an operation status indicator indicative of the status associated with the performance of the operation. The change, the status indicator, and the second representation may be similar as described regarding FIGS. 38A-38E.

Figure 40:
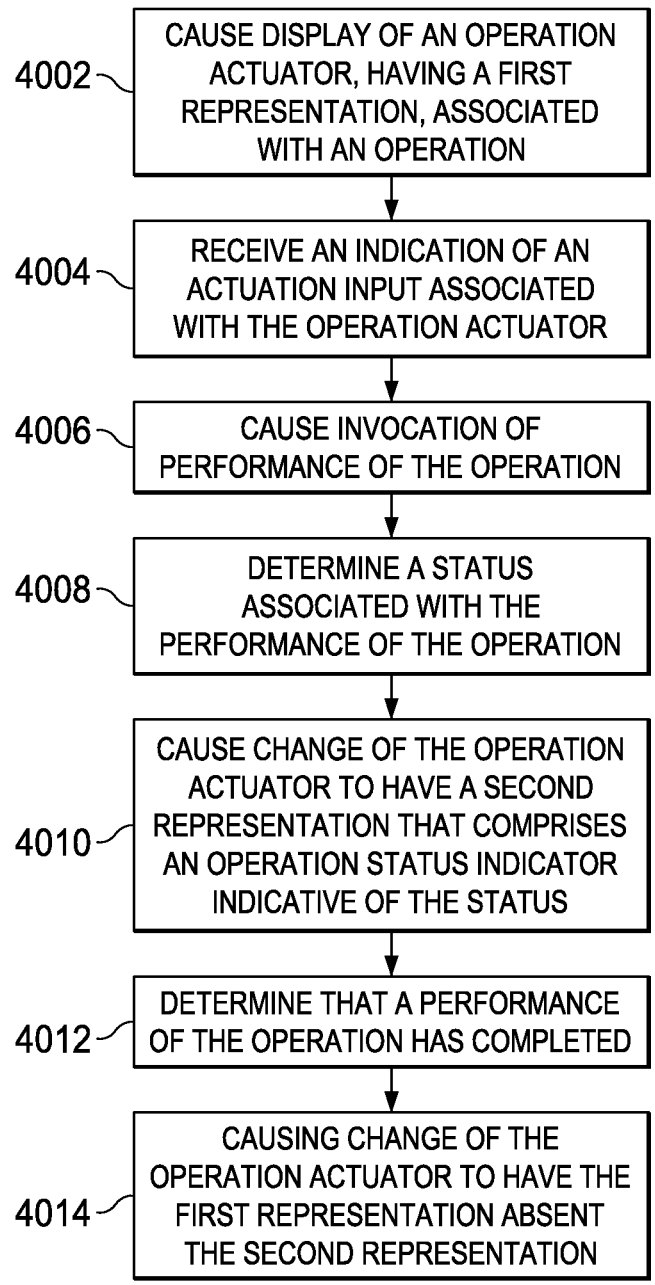
FIG. 40 is a flow diagram illustrating activities associated with display of operation actuator status indication according to at least one example embodiment.

FIG. 40 is a flow diagram illustrating activities associated with display of operation actuator status indication according to at least one example embodiment. In at least one example embodiment, there is a set of operations that corresponds the activities of FIG. 40. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 40.

At block 4002, the apparatus causes display of an operation actuator associated with an operation, the operation actuator having a first representation, similarly as described regarding block 3902 of FIG. 39. At block 4004, the apparatus receives an indication of an actuation input associated with the operation actuator, similarly as described regarding block 1408 of FIG. 14. At block 4006, the apparatus causes invocation of performance of the operation, similarly as described regarding block 3906 of FIG. 39. At block 4008, the apparatus determines a status associated with the performance of the operation, similarly as described regarding block 3908 of FIG. 39. At block 4010, the apparatus causes change of the operation actuator to have a second representation, the second representation comprising an operation status indicator indicative of the status associated with the performance of the operation, similarly as described regarding block 3910 of FIG. 39. At block 4012, the apparatus determines that a performance of the operation has completed. The determination that the performance of the operation has completed may be similar as described regarding FIGS. 38A-38E. At block 4014, the apparatus causes a change of the operation actuator to have the first representation absent the second representation based, at least in part, on the determination that the performance of the operation has completed. The change of the operation actuator may be similar as described regarding FIGS. 38A-38E.

Figure 41:
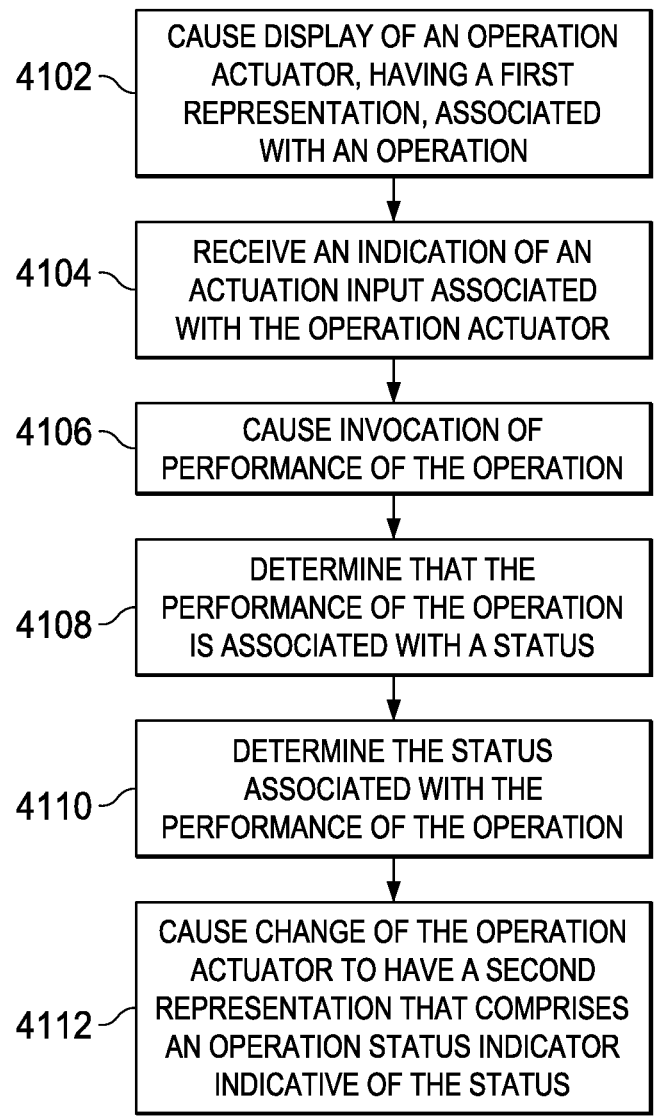
FIG. 41 is a flow diagram illustrating activities associated with display of operation actuator status indication according to at least one example embodiment.

FIG. 41 is a flow diagram illustrating activities associated with display of operation actuator status indication according to at least one example embodiment. In at least one example embodiment, there is a set of operations that corresponds the activities of FIG. 41. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 41.

At block 4102, the apparatus causes display of an operation actuator associated with an operation, the operation actuator having a first representation, similarly as described regarding block 3902 of FIG. 39. At block 4104, the apparatus receives an indication of an actuation input associated with the operation actuator, similarly as described regarding block 1408 of FIG. 14. At block 4106, the apparatus causes invocation of performance of the operation, similarly as described regarding block 3906 of FIG. 39. At block 4108, the apparatus determines that the performance of the operation is associated with the status. The determination and the performance of the operation being associated with the status may be similar as described regarding FIGS. 38A-38E. At block 4110, the apparatus determines a status associated with the performance of the operation, similarly as described regarding block 3908 of FIG. 39. At block 4112, the apparatus causes change of the operation actuator to have a second representation, the second representation comprising an operation status indicator indicative of the status associated with the performance of the operation, similarly as described regarding block 3910 of FIG. 39.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1404 of FIG. 14 may be performed after block 1406. Furthermore, if desired, one or more of the above-described functions may be optional or may be combined. For example, blocks 1202 and 1204 of FIG. 12 may be optional and/or combined with block 1002 of FIG. 10.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor;
    at least one memory including computer program code, the memory and the computer program code configured to, working with the processor, cause the apparatus to perform at least the following:
    causation of display of an operation actuator relating to an operation that is associated with one or more settings, the operation being at least one of an image capture operation, a video capture operation, or a high dynamic range image capture operation;
    causation of display of one or more curvilinear slider interface elements, wherein each of the one or more curvilinear slider interface elements relates to a value of a different one of the one or more settings;
    receipt of an indication of a first drag input associated with the operation actuator, the first drag input having a terminus within a default setting zone and an origin outside of the default setting zone; and
    causation of the value of each of the one or more settings related to the one or more displayed curvilinear slider interface elements to be set to a default value based, at least in part, on the first drag input,
    wherein at least one of the displayed one or more curvilinear slider interface elements at least partially overlaps with the default setting zone.

2. The apparatus of claim 1, wherein the default setting zone is confined to a half of a display region that comprises the operation actuator.

3. The apparatus of claim 2, wherein the memory includes computer program code configured to, working with the processor, cause the apparatus to perform causation of display of an indication of the default setting zone.

4. The apparatus of claim 2, wherein the memory includes computer program code configured to, working with the processor, cause the apparatus to perform:
    causation of display of a first one of the one or more curvilinear slider interface elements that relates to a value of a first one of the one or more settings;
    causation of display of a second one of the one or more curvilinear slider interface elements that relates to a value of a second one of the one or more settings associated with the operation actuator;
    receipt of an indication of a second drag input indicative of a non-adjustment movement of the first curvilinear slider interface element; and
    causation of non-adjustment movement of the first curvilinear slider interface element based, at least in part, on the second drag input.

5. The apparatus of claim 4, wherein the non-adjustment movement causes at least one of: an increase in distance between the first curvilinear slider interface element and the second curvilinear slider interface element, or a decrease in distance between the first curvilinear slider interface element and the second curvilinear slider interface element.

6. The apparatus of claim 4, wherein the memory includes computer program code configured to, working with the processor, cause the apparatus to perform causation of non-adjustment movement of the second curvilinear slider interface element in correspondence with the non-adjustment movement of the first curvilinear slider interface element, such that a distance between the first curvilinear slider interface element and the second curvilinear slider interface element is retained.

7. The apparatus of claim 4, wherein the non-adjustment movement relates to at
least one of: curvilinear expansion, or curvilinear contraction.

8. The apparatus of claim 4, wherein the memory includes computer program
code configured to, working with the processor, cause the apparatus to perform:
receipt of an indication of a third drag input associated with the operation actuator; and
causation of non-adjustment movement of the first curvilinear slider interface element and
the operation actuator based, at least in part, on the third drag input.

9. The apparatus of claim 1, wherein the apparatus comprises a display, and the
causation of display of the operation actuator comprises displaying of the operation actuator on
the display.

10. A method comprising:
causing display of an operation actuator relating to an operation that is associated with one or more settings, the operation being at least one of an image capture operation, a video capture operation, or a high dynamic range image capture operation;
displaying one or more curvilinear slider interface elements, wherein each of the one or more curvilinear slider interface elements relates to a value of a different one of the one or more settings;
receiving an indication of a first drag input associated with the operation actuator, the first drag input having a terminus within a default setting zone and an origin outside of the default setting zone; and
causing the value of each of the one or more settings related to the one or more displayed curvilinear slider interface elements to be set to a default value based, at least in part, on the first drag input,
wherein at least one of the displayed one or more curvilinear slider interface elements at least partially overlaps with the default setting zone.

11. The method of claim 10, wherein the default setting zone is confined to a half of a display region that comprises the operation actuator.

12. The method of claim 11, further comprising causation of display of an indication of the default setting zone.

13. The method of claim 11, further comprising:
causing display of a first one of the one or more curvilinear slider interface element that relates to a value of a first one of the one or more settings;
causing display of a second one of the one or more curvilinear slider interface elements that relates to a value of a second one of the one or more settings associated with the operation actuator;
receiving an indication of a second drag input indicative of a non-adjustment movement of the first curvilinear slider interface element; and
causing non-adjustment movement of the first curvilinear slider interface element based, at least in part, on the second drag input.

14. The method of claim 13, wherein the non-adjustment movement causes at least one of: an increase in distance between the first curvilinear slider interface element and the second curvilinear slider interface element, or a decrease in distance between the first curvilinear slider interface element and the second curvilinear slider interface element.

15. The method of claim 13, further comprising causing non-adjustment movement of the second curvilinear slider interface element in correspondence with the non-adjustment movement of the first curvilinear slider interface element, such that a distance between the first curvilinear slider interface element and the second curvilinear slider interface element is retained.

16. The method of claim 13, wherein the non-adjustment movement relates to at least one of: curvilinear expansion, or curvilinear contraction.

17. At least one non-transitory computer-readable medium encoded with instructions that, when executed by a processor, perform:
causation of display of an operation actuator relating to an operation that is associated with one or more settings, the operation being at least one of an image capture operation, a video capture operation, or a high dynamic range image capture operation;
causation of display of one or more curvilinear slider interface elements, wherein each of the one or more curvilinear slider interface elements relates to a value of a different one of the one or more settings;
receipt of an indication of a first drag input associated with the operation actuator, the first drag input having a terminus within a default setting zone and an origin outside of the default setting zone; and
causation of the value of each of the one or more settings associated with related to the one or more displayed curvilinear slider interface elements to be set to a default value based, at least in part, on the first drag input,
wherein at least one of the displayed one or more curvilinear slider interface elements at least partially overlaps with the default setting zone.

18. The non-transitory computer-readable medium of claim 17, wherein the default setting zone is confined to a half of a display region that comprises the operation actuator.

19. The non-transitory computer-readable medium of claim 18, further encoded with instructions that, when executed by a processor, perform causation of display of an indication of the default setting zone.

20. The non-transitory computer-readable medium of claim 19, further encoded with instructions that, when executed by a processor, perform:
causation of display of a first one of the one or more curvilinear slider interface element that relates to a value of a first one of the one or more settings;
causation of display of a second one of the one or more curvilinear slider interface elements that relates to a value of a second one of the one or more settings associated with the operation actuator;

receipt of an indication of a second drag input indicative of a non-adjustment movement of the first curvilinear slider interface element; and
causation of non-adjustment movement of the first curvilinear slider interface element based, at least in part, on the second drag input.

* * * * *

UNITED STATES PATENT AND TRADEMARK OFFICE
CERTIFICATE OF CORRECTION

PATENT NO. : 9,760,267 B2
APPLICATION NO. : 14/168837
DATED : September 12, 2017
INVENTOR(S) : Tomi Petri Tarvainen et al.

Page 1 of 1

It is certified that error appears in the above-identified patent and that said Letters Patent is hereby corrected as shown below:

In the Claims

In Claim 17:
Column 62, Line 43, "associated with" should be deleted.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*